(12) United States Patent
Zhou et al.

(10) Patent No.: US 11,073,385 B2
(45) Date of Patent: Jul. 27, 2021

(54) DEVICES AND METHODS RELATING TO FRAGMENTED CARBON NANOTUBE SENSORS

(71) Applicant: King Abdullah University of Science and Technology, Thuwal (SA)

(72) Inventors: Jian Zhou, Thuwal (SA); Xuezhu Xu, Thuwal (SA); Gilles Lubineau, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 162 days.

(21) Appl. No.: 16/461,961

(22) PCT Filed: Nov. 17, 2017

(86) PCT No.: PCT/IB2017/057227
§ 371 (c)(1),
(2) Date: May 17, 2019

(87) PCT Pub. No.: WO2018/092091
PCT Pub. Date: May 24, 2018

(65) Prior Publication Data
US 2020/0271445 A1    Aug. 27, 2020

Related U.S. Application Data

(60) Provisional application No. 62/423,245, filed on Nov. 17, 2016.

(51) Int. Cl.
*G01L 1/22*     (2006.01)
*G01B 21/32*    (2006.01)
*B82Y 15/00*    (2011.01)

(52) U.S. Cl.
CPC ............... *G01B 21/32* (2013.01); *G01L 1/22* (2013.01); *B82Y 15/00* (2013.01)

(58) Field of Classification Search
CPC ............ G01B 21/32; G01L 1/22; B82Y 15/00
See application file for complete search history.

(56) References Cited

U.S. PATENT DOCUMENTS 5,238,729 A * 8/1993 Debe ............... G01N 27/127
                                              428/142
10,722,174 B2 * 7/2020 Pang ................. A61B 5/0002
(Continued)

FOREIGN PATENT DOCUMENTS

EP      2801549 A1    11/2014
WO   2011024539 A1     3/2011

OTHER PUBLICATIONS

Notification of Transmittal of the International Search Report and the Written Opinion of the International Searching Authority, or the Declaration for PCT/IB2017/057227 dated Mar. 1, 2018.
(Continued)

*Primary Examiner* — Max H Noori
(74) *Attorney, Agent, or Firm* — Billion & Armitage

(57) ABSTRACT

Embodiments provide a sensor including a substrate, one or more fragmented carbon nanotube compositions embedded in the substrate, wherein the carbon nanotube compositions include one or more carbon nanotubes, and one or more conductive devices affixed to one or more sides of the fragmented carbon nanotube compositions with an affixation agent. Embodiments further provide a method of fabricating a sensor including embedding a carbon nanotube composition in a substrate, wherein the carbon nanotube composition includes one or more carbon nanotubes, and fragmenting the carbon nanotube composition.

15 Claims, 63 Drawing Sheets

(56) References Cited

U.S. PATENT DOCUMENTS

| | | | |
|---|---|---|---|
| 10,739,209 B2* | 8/2020 | Duchesne | G01L 1/2287 |
| 2013/0104665 A1* | 5/2013 | Biris | G01B 7/18 73/774 |
| 2018/0059051 A1* | 3/2018 | Yang | G01N 33/5438 |
| 2018/0067000 A1* | 3/2018 | Kenry | G01L 1/22 |
| 2019/0214351 A1* | 7/2019 | Cabral, Jr. | H01L 23/585 |
| 2019/0310222 A1* | 10/2019 | Boock | C12Q 1/006 |

OTHER PUBLICATIONS

Liu, et al., "Thickness-Gradient Films for High Guage Factor Stretchable Strain Sensors", Advanced Materials, , vol. 27, No. 40, Oct. 1, 2015, 6230-6237.

Ryu, et al., "Extremely Elastic Wearable Carbon Nanotube Fiber Strain Sensor for Monitoring of Human Motion", ACS Nano, vol. 9, No. 6, Jun. 23, 2015, 5929-5936.

Yamada, et al., "A Stretchable Carbon Nanotube Strain Sensor for Human-Motion Detection", Nature Nanotechnology, vol. 6, No. 5, Mar. 27, 2011, 296-301.

Amjadi, et al., "Highly Stretchable and Sensitive Strain Sensor Based on Silver Nanowire-Elastomer Nanocomposite", ACS Nano, vol. 8, No. 5, Apr. 21, 2014, pp. 5154-5163.

Amjadi, et al., "Stretchable, Skin-Mountable, and Wearable Strain Sensors and Their Potential Applications: A Review", Advanced Functional Materials, vol. 26, 2016, pp. 1678-1698.

Arteiro, et al., "Micro-Mechanical Analysis of the Effect of Ply Thickness on the Transverse Compressive Strength of Polymer Composites", Composites: Part A, vol. 79, 2015, pp. 127-137.

Arteiro, et al., "Micro-Mechanical Analysis of the in Situ Effect in Polymer Composite Laminates", Composite Structures, vol. 116, 2014, pp. 827-840.

Cao, et al., "Ultrathin Films of Single-Walled Carbon Nanotubes for Electronics and Sensors: A Review of Fundamental and Applied Aspects", Advanced Materials, vol. 21, 2009, pp. 29-53.

Cheng, et al., "A Stretchable and Highly Sensitive Graphene-Based Fiber for Sensing Tensile Strain, Bending, and Torsion", Advanced Materials, vol. 27, 2015, pp. 7365-7371.

Ge, et al., "A Stretchable Electronic Fabric Artificial Skin with Pressure-, Lateral Strain-, and Flexion-Sensitive Properties", Advanced Materials, vol. 28, 2016, pp. 722-728.

Jeong, et al., "Highly Stretchable and Sensitive Strain Sensors Using Fragmentized Graphene Foam", Advanced Functional Materials, vol. 25, 2015, pp. 4228-4236.

Kang, et al., "Microencapsulated Carbon Black Suspensions for Restoration of Electrical Conductivity", Advanced Functional Materials, vol. 24, 2014, pp. 2947-2956.

Kim, et al., "Highly Sensitive and Stretchable Multidimensional Strain Sensor With Prestrained Anisotropic Metal Nanowire Percolation Networks", Nano Letters, vol. 15, Jul. 7, 2015, pp. 5240-5247.

Lee, et al., "A Stretchable Strain Sensor Based on a Metal Nanoparticle Thin Film for Human Motion Detection", Nanoscale, vol. 6, Aug. 13, 2014, pp. 11932-11939.

Liao, et al. "Flexible and Highly Sensitive Strain Sensors Fabricated by Pencil Drawn for Wearable Monitor", Advanced Functional Materials, vol. 25, 2015, pp. 2395-2401.

Lipomi, et al., "Skin-Like Pressure and Strain Sensors Based on Transparent Elastic Films of Carbon Nanotubes", Nature Nanotechnology, vol. 6, Dec. 2011, pp. 788-792.

Obitayo, et al., "A Review: Carbon Nanotube-Based Piezoresistive Strain Sensors", Journal of Sensors, vol. 2012, No. 652438, 2012, pp. 1-15.

Pang, et al., "A Flexible and Highly Sensitive Strain-Gauge Sensor Using Reversible Interlocking of Nanofibres", Nature Materials, vol. 11, Sep. 2012, pp. 795-801.

Park, et al., "Material Approaches to Stretchable Strain Sensors", ChemPhysChem, vol. 16, 2015, pp. 1155-1163.

Rahimi, et al., "Highly Stretchable and Sensitive Unidirectional Strain Sensor via Laser Carbonization", ACS Applied Materials Interfaces, vol. 7, Feb. 16, 2015, pp. 4463-4470.

Roh, et al., "Stretchable, Transparent, Ultrasensitive, and Patchable Strain Sensor for Human-Machine Interfaces Comprising a Nanohybrid of Carbon Nanotubes and Conductive Elastomers", ACS Nano, vol. 9, No. 6, Apr. 13, 2015, pp. 6252-6261.

Ryu, et al., "Direct Insulation-to-Conduction Transformation of Adhesive Catecholamine for Simultaneous Increases of Electrical Conductivity and Mechanical Strength of CNT Fibers", Advanced Materials, vol. 27, 2015, pp. 3250-3255.

Sangeeth, et al., "Equivalent Circuits of a Self-Assembled Monolayer-Based Tunnel Junction Determined by Impedance Spectroscopy", Journal of the American Chemical Society, vol. 136, Jul. 18, 2014, pp. 11134-11144.

Seo, et al., "A Highly Sensitive and Reliable Strain Sensor Using a Hierarchical 3D and Ordered Network of Carbon Nanotubes", Small, vol. 11, No. 25, 2015, pp. 2990-2994.

Trung, et al., "Flexible and Stretchable Physical Sensor Integrated Platforms for Wearable Human-Activity Monitoring and Personal Healthcare", Advanced Materials, vol. 28, 2016, pp. 4338-4372.

Ventura, et al., "Investigating the Inter-Tube Conduction Mechanism in Polycarbonate Nanocomposites Prepared with Conductive Polymer-Coated Carbon Nanotubes", Nanoscale Research Letters, vol. 10, No. 485, 2015, pp. 1-5.

Wu, et al., "Reversible Sliding in Networks of Nanowires", Nano Letters, vol. 13, May 1, 2013, pp. 2381-2386.

Xie, et al., "Mechanics of Carbon Nanotube Networks: Microstructural Evolution and Optimal Design", Soft Matter, vol. 7, Sep. 7, 2011, pp. 10039-10047.

Zhao, et al., "Carbon Nanotube Yarn Strain Sensors", Nanotechnology, vol. 21, 305502, Jul. 8, 2010, pp. 1-5.

Zhou, et al., "Semi-Metallic, Strong and Stretchable Wet-Spun Conjugated Polymer Microfibers", Journal of Materials Chemistry C, vol. 3, Jan. 21, 2015, pp. 2528-2538.

\* cited by examiner

| Sample number | Dispersion weight (g) | Surface density (g cm$^{-2}$) | Average thickness (μm) | Initial resistance [a] (W) | Resistance after fragmentation and relaxation (W) |
|---|---|---|---|---|---|
| 1 | 1.5 | 0.16 | 15 ± 2 | 28 | 33 |
| 2 | 3 | 0.31 | 30 ± 3 | 23 | 26 |
| 3 | 6 | 0.62 | 45 ± 5 | 12 | 12.5 |
| 4 | 9 | 0.94 | 55 ± 6 | 6 | 6.5 |
| 5 | 12 | 1.25 | 70 ± 8 | 5.5 | 5.8 |
| 6 | 15 | 1.56 | 90 ± 10 | 5 | 5.2 |

[a] The sample was 3 < 30 mm$^2$

FIG. 8

| Materials | Methods | Electrical conductivity (S cm$^{-1}$) | Tensile stress (MPa) | Young's modulus (GPa) | Elongation at break (%) | Ref. |
|---|---|---|---|---|---|---|
| SWCNT films | Vacuum filtration | - | 22 | 1.8 | 1.2 | - |
| 4-aethoxybenzoic acid functionalized FWCNT[a] films | Vacuum filtration | 294 | 80 | 15 | 0.8 | - |
| FWCNT films | Dry spinning | 350 | 2000 | 90 | 3 | - |
| CNT films | Vacuum filtration | 100 | 7.5 | 0.785 | 0.1 | - |
| Short-CNT buckypaper | Dry spinning and Microcombing | 1800 | 3288 | 172 | - | - |
| SWCNT films | HNO$_3$ oxidization and filtration and Microcombing | 120 | 73 | 5 | - | - |
| High-Density SWCNT Buckypaper | Vacuum filtration | - | 94 | 8.35 | 1.4 | - |
| MWCNT Buckypaper | Dry spinning | 400 | 75.6 | - | - | - |
| MWCNT Buckypaper | Pressurized filtration | 86.3 | 4.9 | 0.45 | 1.4 | - |
| SWCNT paper | Vacuum filtration | 100-500 | 15-7 | 0.4-1.4 | 0.3-3 | This study |

[a] Few-walled carbon nanotubes

FIG. 11

| Materials | Initial electrical properties | $\Delta R/R_0$ | Maximum strain | Gauge factor | Ref. |
|---|---|---|---|---|---|
| CNT yarn | $R_0^{(a)} = 3.4\Omega$ | 0.016 | 3.5% | 0.45 | 12 |
| Random SWCNT film on PDMS | $\sigma^{(b)} = 2200 S cm^{-1}$ | 5 | 150% | 3.4 | 13 |
| Random MWCNT film in Ecoflex | | 2.5 | 100% | 1 | 14 |
| Thickness gradient SWCNT film on PDMS | $\sigma = 2200 S cm^{-1}$ | 3.2 | 2% | 161 | 15 |
| Aligned SWCNT film on PDMS | | 3.28 | 40% | 0.82 | 16 |
| Aligned SWCNT film on PDMS | | 0.12 | 200% | 0.06 | 16 |
| 3D SWCNT network in PDMS | | 0.35 | 1% | 35 | 17 |
| (PLI-PEDOT:PSS)/SWCNT/(PLI-PEDOT:PSS) on a PDMS | | 62 | 100% | 62 | 18 |
| Aligned micro/nano carbon particles in PDMS | $R_s^{(c)} = 60 k\Omega^{-1}$ | 20000 | 100% | 20000 | 19 |
| CNT fiber on prestrained Ecoflex substrate | $\sigma = 0.257 S cm^{-1}$ | 358 | 960% | 64 | 20 |
| AgNW film in PDMS | $R_0 = 7.5 - 246\Omega$ | 9.8 | 70% | 14 | 21 |
| AgNW arrays in pre-strained PDMS | $R_0 = 5.3\Omega$ | 7 | 35% | 20 | 22 |
| Graphene on PE fiber in PDMS | $\sigma = 0.012 - 0.136 S cm^{-1}$ | 1.8 | 50% | 3.7 | 23 |
| Graphene foam on PDMS | $R_0 = 1000\Omega$ | 30 | 70% | 29 | 24 |
| Graphene on PET | $R_0 = 15 k\Omega$ | 0.8 | 2% | 15 | 24 |
| Nanoscale crack based metal/Polyurethane acrylate | | 35 | 2% | 6 | 25 |
| Fragmented SWCNT paper in PDMS | $R_0 = 5 - 28\Omega$ | $10^6$ | 50% | 107 | This study |

$^{a)}$initial resistance, $^{b)}$electrical conductivity, and $^{c)}$sheet resistance

FIG. 13

| Sample name | Abbreviation | Needle gauge | wire width | Resistance ($\Omega cm^{-1}$) |
|---|---|---|---|---|
| Large SWCNT wire in PDMS | 60 μm-SWCNT | 23G | 60 ± 8 | 90 ± 10 |
| Small SWCNT wire in PDMS | 32 μm-SWCNT | 34G | 32 ± 4 | 2500 ± 200 |

FIG. 24

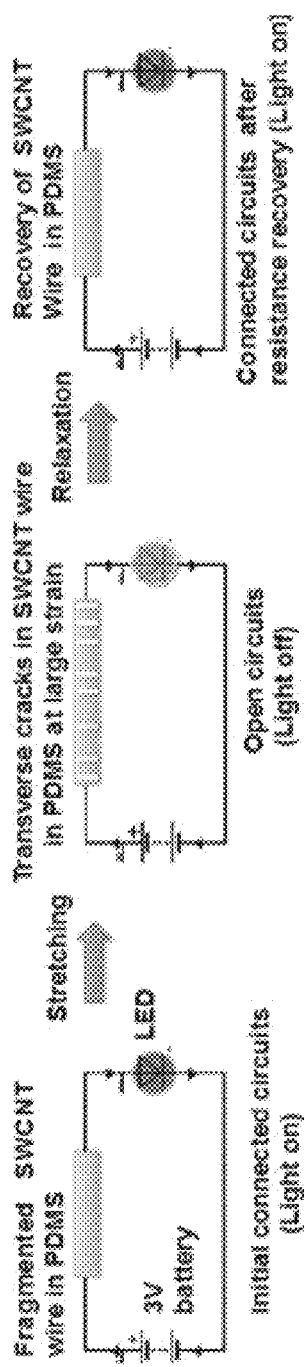
FIG. 29A
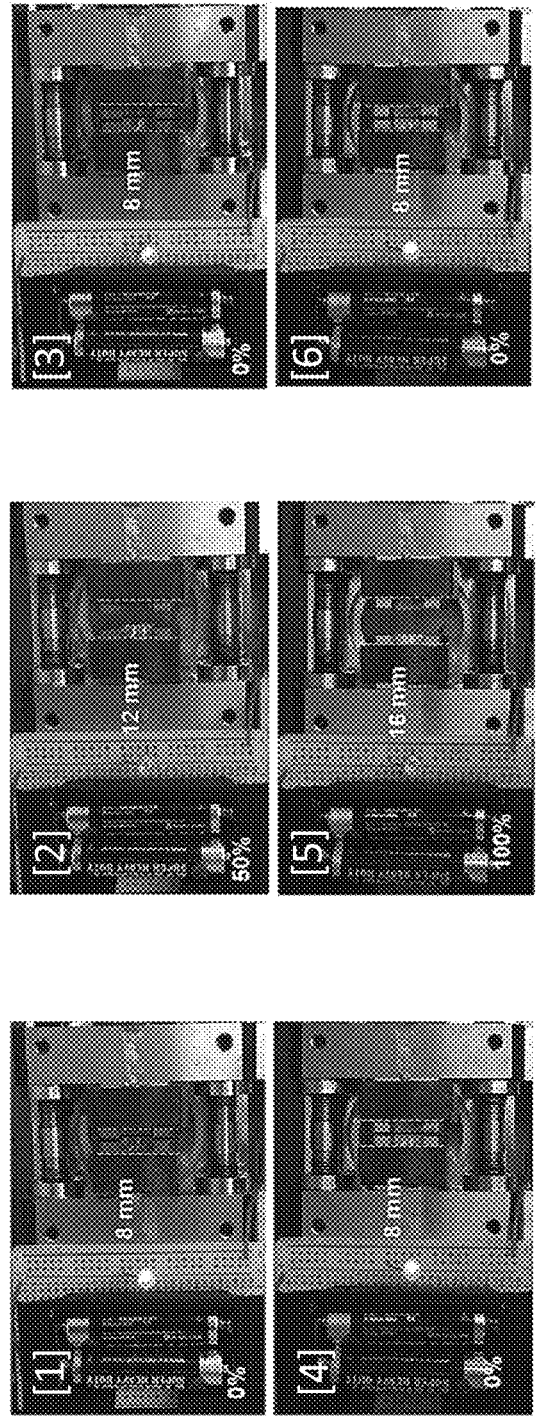
FIGs. 29B[1]-29B[6]

| Materials | Gauge factor at $\varepsilon_M$ | Pressure sensitivity at $P_M$ | Torsion sensitivity at $\phi_M$ | Bending sensitivity at $\theta_M$ | Ref. |
|---|---|---|---|---|---|
| Random SWCNT film on PDMS | 3.4 at 150% | 0.22 MPa$^{-1}$ at 0.9 MPa | - | - | 3 |
| Interlocking of Pt-coated nanofibers | 2.1 at 2% | 11.5 at 0.5 MPa | 8.53 at 0.002 N·m | - | 15 |
| Cracked silver nanoparticle film on PDMS | 5×6.6 at 0.6% | 200 MPa$^{-1}$ at 3kPa | - | - | 16 |
| Pencil trace on paper | 1.5 at 200% | GF=150.5 at -0.6% | - | - | 17 |
| Graphene-based fiber | 0.7 at 100% | 0.45 N$^{-1}$ at 2N | 1.7/800rad/m at 800rad/m | 0.002 deg$^{-1}$ at 90 deg | 12 |
| AgNW coated fabric with stretchable sensor arrays | 30000 at 15% | 4000 MPa$^{-1}$ at 0.3MPa | - | 0.0133 deg$^{-1}$ at 60 deg | 18 |
| SWCNT wire in PDMS | | | | 10$^{-4}$ degree$^{-1}$ at 130 degree | This study |

FIG. 30

CNT Structure/Composition   Conductive Structure

Substrate
Affixation Agent

FIG. 31

Conductive Structure

DEVICES AND METHODS RELATING TO FRAGMENTED CARBON NANOTUBE SENSORS

TECHNICAL FIELD

The present disclosure generally relates to devices and methods of sensors containing carbon nanotubes.

BACKGROUND

Wearable mechanical sensors are important devices for direct and indirect capture and monitor of various human activities. These sensors have continued to grab great attention due to the considerable development of stretchable electronics. Conventional mechanical gauges based on metallic foils or semiconductors have been used in these devices, however these materials can only be used in a range of limited deformations (<5%). Moreover, sensors with these materials are easily damaged when removed from measured targets and they cannot be re-used as a result. Additionally, current conventional commercial mechanical sensors are usually designed to sense only one deformation mode. Uniaxial strain, pressure, or torsion are among the most common deformation modalities measured. A complicated and sophisticated sensor design is required to capture two or more deformation modalities while maintaining high sensitivity and conserving the integrity of the sensor when it experiences large transformations.

Nanomaterials such as metal nanoparticles and nanowires, carbon nanotubes (CNT), and graphene-based materials have excellent flexibility when deposited into thin films and superior electrical properties compared to conventional materials. They bring new opportunities to the design and manufacture of smart mechanical sensors for human activity monitoring.

For example, mechanical sensors have been previously developed based on interlocking of conductive nanofibers, which can measure three different loading modes (pressure, shear and torsion) with high sensitivity. However, these sensors have a limited working range. To increase the operational strain, another technique is to fabricate graphene-based composite fiber with a "compression ring" architecture. Sensors with this architecture possess excellent stretching, bending, and twisting-sensitive properties due to the microstructure variation under different mechanical stimuli. However, the design of the system is very complex and gauge factor (GF) of the sensor to some mechanical stimuli is low. A skin-like pressure and strain sensor based on CNT films on PDMS was also previously developed, however the pressure sensitivity and gauge factor are extremely low due to the high initial resistance. Moreover, the resistance recoverability at larger mechanical deformation (after electrical disconnection) of these sensors is not realized in the above-mentioned studies. Combining resistance recoverability and high sensitivity at multiple mechanical deformation modalities remains a challenge. Accordingly, there is a need to address the aforementioned deficiencies and inadequacies.

SUMMARY

In general, embodiments of the present disclosure describe sensors and methods of fabricating sensors.

Accordingly, embodiments of the present disclosure describe a sensor comprising a substrate, one or more fragmented carbon nanotube compositions embedded in the substrate, wherein the carbon nanotube compositions include one or more carbon nanotubes, and one or more conductive devices affixed to one or more sides of the fragmented carbon nanotube compositions with an affixation agent.

Embodiments of the present disclosure further describe a method of fabricating a sensor comprising embedding a carbon nanotube composition in a substrate, wherein the carbon nanotube composition includes one or more carbon nanotubes, and fragmenting the carbon nanotube composition.

Embodiments of the present disclosure also describe a method of fabricating a sensor comprises preparing an a CNT composition; forming one or more CNT structures; curing a first substrate layer; transferring the one or more CNT structures onto a surface of the first substrate layer; affixing one or more conductive devices to the one or more CNT structures with an affixation agent; preparing a substrate composition; transferring the substrate composition onto the side of the substrate with the one or more CNT structures; curing the substrate composition to form a second substrate layer and to form a second structure, wherein the second structure comprises the first and second substrate layers, one or more CNT structures, the affixation agent, and one or more conductive devices; cutting the second structure with a cutting device to form a sensor; and straining the sensor to introduce cracks in the one or more CNT structures of the sensor.

The details of one or more examples are set forth in the description below. Other features, objects, and advantages will be apparent from the description and from the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 8 is a table showing properties of SWCNT papers made from 0.5 wt % $SWCNT/CH_3SO_3H$ dispersion via vacuum filtration.

FIG. 11 is a summary table of mechanical properties of freestanding carbon nanotube papers and films from the literature.

FIG. 13 is a summary of strain sensing properties based on nanomaterial-enabled stretchable sensors.

FIG. 24 is a table showing sample information for embodiments of materials used in the present disclosure.

FIG. 29A is an illustration demonstrating the resistance recovery process of an embodiment of fragmented SWCNT wires in an electronic circuit.

FIGS. 29B1-29B6 are photos demonstrating the resistance recovery process of an embodiment of fragmented SWCNT wires in an electronic circuit. The SWCNT wire was stretched to 50% and 100%, which is beyond the limit of the maximum strain at 15%. The resistance of the wire can recover and lit up an LED.

FIG. 30 is a summary of sensing properties to multiple deformation modes based on nanomaterial-enabled stretchable conductors.

FIG. 31 is an embodiment of a sensor as described herein showing components of a sensor.

DETAILED DESCRIPTION

Figure 1A:
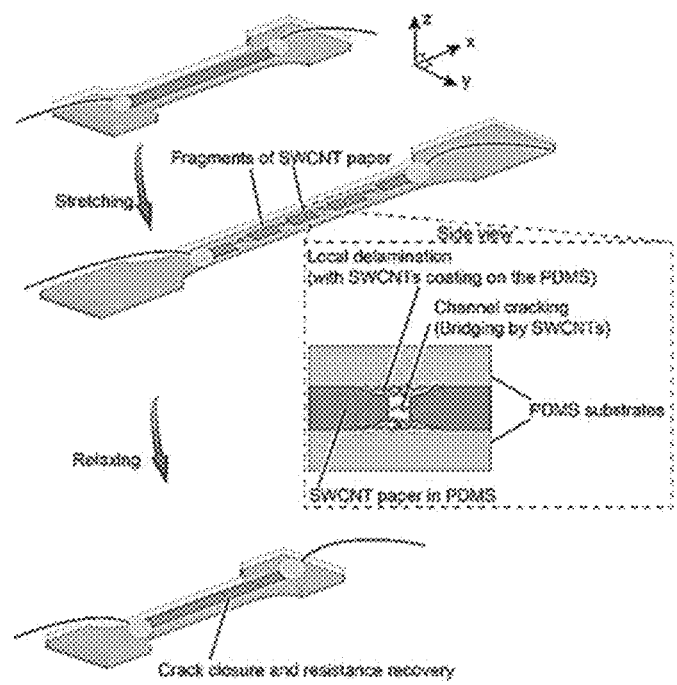
FIG. 1A is a schematic presenting how single-walled carbon nanotube (SWCNT) paper can be fragmented in elastic substrates. The inset image shows the x-y cross section of the stretched sample. Stress concentration at crack tips can promote the development of local delamination between the SWCNT paper and polydimethylsiloxane (PDMS) substrate.

Described below are various embodiments of mechanical sensing devices comprising carbon nanotubes and methods of manufacture. Although particular embodiments are described, those embodiments are mere exemplary implementations of the system and method. One skilled in the art will recognize other embodiments are possible. All such embodiments are intended to fall within the scope of this disclosure. Moreover, all references cited herein are intended to be and are hereby incorporated by reference into this disclosure as if fully set forth herein. While the disclosure will now be described in reference to the above drawings, there is no intent to limit it to the embodiment or embodiments disclosed herein. On the contrary, the intent is to cover all alternatives, modifications and equivalents included within the spirit and scope of the disclosure.

Discussion

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure.

Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, materials science, manufacturing, carbon nanotube compositions, sensors and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is in bar. Standard temperature and pressure are defined as 0° C. and 1 bar.

It is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

DESCRIPTION

The present disclosure is directed to devices for sensing aspects of mechanics. Without intending to be limiting, aspects of mechanics can be or can include properties such as velocity, momentum, magnitude, displacement, distance, deformation, acceleration, duration, speed, time, pressure, touch, contact, strain, torsion, temperature and the like. Properties of mechanics can be measured linearly, angularly, or combinations thereof. Described herein are devices that allow for ultrasensitive mechanical sensation relating to aspects of mechanics.

Devices as described herein can comprise carbon nanotubes (CNTs). Carbon nanotubes can be single-walled carbon nanotubes (SWCNT), double-walled carbon nanotubes (DWCNT), multi-walled carbon nanotubes (MWCNT), or others, individually or in combination.

CNTs can be native CNTs or can be functionalized (ie doped). Functionalization of CNTs can include modifications of CNTs, to CNT surface or other aspects of CNT structure. Functionalization can include non-covalent and covalent modifications to the CNTs. In certain embodiments, CNTs are functionalized with carboxyl groups, —OH groups, —NH groups, or —O groups, individually or in combination. In an embodiment, CNTs are functionalized with 2.7% carboxyl groups.

Compositions of CNTs as described herein can be prepared as an aqueous suspension. As used herein, an aqueous suspension can be an ink, and can comprise CNTs and a solvent. An ink can comprise CNTs, a dispersant, and a solvent. Compositions of CNTs as described herein can be prepared as an aqueous solution with a dispersant. In an embodiment, the dispersant can be a mild acid, for example $MeSO_3H$. In an embodiment, the dispersant can be $MeSO_3H$. In other embodiments, other dispersants (such as dimethylformamide, N-methyl-2-pyrrolidone, methanol, ethanol, water, etc) can be used. In an embodiment, 0.2 g of SWCNT can be dispersed into 9.8 g of $CH_3SO_3H$ for our experiment. In another embodiment, 0.2 g of SWCNT can be dispersed into 9.8 g of dimethylformamide for example. CNTs, the dispersant, and/or a solvent can be mixed to form an aqueous suspension. The aqueous suspension can be stirred, sonicated, and/or filtered, individually or in combination depending on the application and intended use of the aqueous suspension.

Compositions of CNTs as described herein can take various structural forms. CNTs as described herein can be a film, paper, wire, torus, bud, or other structure comprising a composition of CNTs. CNT structures can be film-like and can be used in 2D sensors, or can be wire-like and be used in 1D sensors. CNT compositions can take on other structures, such as CNT fibers, an array of CNT fiber or wire, or an array of CNT strips made from CNT paper, for example. Compositions of CNTs as described herein can be formed with various weights of CNTs and the compositions can form a structure that can have thicknesses ranging from about 0.1 µm to about 100 µm. In an embodiment, a CNT composition is a SWCNT paper having a thickness of about 15 µm to about 90 µm. In an embodiment, a CNT composition is a SWCNT wire having a diameter of about 30 µm to about 150 µm. In an embodiment, CNT compositions as described herein can be comprised of a plurality of CNTs, and each individual SWCNT of the plurality can have a diameter of about 1 nm to about 2 nm. In an embodiment, a CNT composition can have a longest dimension that corresponds to a loading direction. Thickness of the CNT composition can dictate physical properties of the CNT composition, such as fragmentation behavior, crack density, gauge factor (GF), and relative changes in resistance. A CNT composition can be one that is easy to fragment, such as a paper or a wire with low tensile strength and Young's modulus.

Sensors as described herein can comprise a composition of CNTs in or on a substrate. A substrate can be an organic polymer or a silicon-based organic polymer, and can comprise a base and a curing agent (for example PDMS or thermoplastic elastomers). The substrate can be optically transmissive. In an embodiment, the substrate is polydimethylsiloxane (PDMS). PDMS is made of two parts (by mixing with base and curing agent, the PDMS will crosslink and cure, this will make the CNT embedding process easier). A composition of CNTs can be embedded in the substrate. A substrate can be about 0.5 mm thick or more.

In embodiments, one or more conductive structures can be affixed to the CNT composition, and the CNT composition can be embedded in the substrate with the conductive structure wholly or partially embedded in the substrate (ie the conductive structure can protrude out of one or more surfaces of the substrate). A conductive structure can be a copper wire, and can be affixed to the CNT composition with silver epoxy (or silver paste or liquid metal). In embodiments, a conductive structure can be affixed to the CNT composition, and the CNT composition with one or more conductive structures affixed can be affixed to the surface of a substrate.

CNT compositions of the sensor can be fragmented, or cracked. Fragmentation or cracking of the CNTs of the CNT compositions can be accomplished by putting strain on the composition, and the CNT composition can have one or more cracks. Strain can be applied by stretching, and a CNT composition can be cracked by stretching the CNT composition above a crack onset strain, that is the amount of strain required to develop cracking. A crack can comprise fragmentation of the CNT composition as well as delamination of the CNT composition from a substrate. In an embodiment, cracks can be formed by subjecting the CNT composition to a strain of about 50%. In an embodiment, a CNT composition in or on a substrate can have a crack density of about 0.1 cracks/mm to about 3 cracks/mm. In an embodiment, a CNT composition in or on a substrate can have a crack density of about $0.1$ mm$^{-1}$ to about $3$ mm$^{-1}$. In an embodiment, a CNT composition can have an average crack opening distance ($L_C$, μm) of about 0.1 μm to about 35 μm. In an embodiment, crack density can be a function of applied strain.

Sensors as described herein can be comprised of a CNT composition, a substrate, and one or more conductive structures affixed to the CNT composition. The CNT composition can be fragmented or cracked. Perturbations of the crack opening displacements can generate perturbation in the electrical resistance. Fragments or cracks can also impart flexibility to the sensor. The sensors can be part of an electric circuit or have an electrical connection. Sensors as described herein can be part of an electric circuit configured to sense mechanical deformation.

Figure 32:
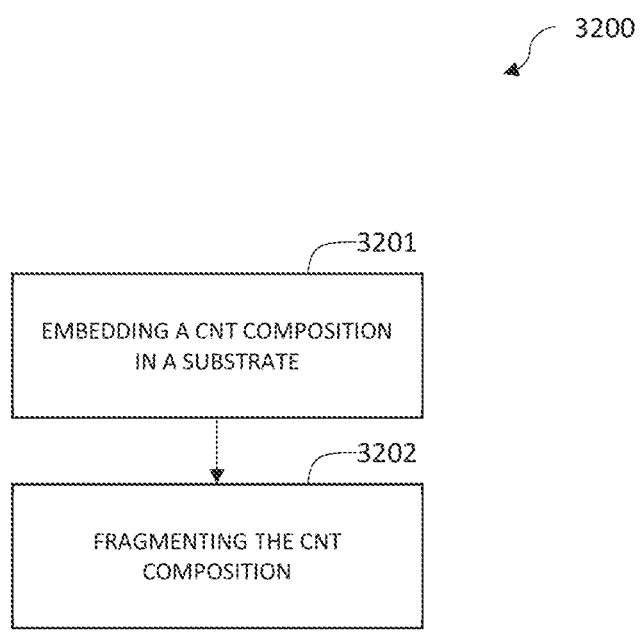
FIGS. 32-33 are embodiments of methods as described herein.

Sensors as described herein can have a variety of shapes, and one skilled in the art would be able to tailor the size and shape of a sensor as described herein for a desired application. As shown in FIG. 31, not intending to be limiting, the sensor can have two approximate end segments and an approximate middle segment. Segments are shown in FIG. 31 are only exemplary and are not intended to be limiting. One skilled in the art would readily recognize "middle" and "end" in the context of the present figures and disclosure. The width of the ends can be greater than the middle. The CNT composition can reside in or on the middle segment, with or without conductive structures or an affixation agent. FIG. 32 shows an example of a sensor according to the present disclosure. An electrical connection can be made with the conductive structures. The shape of the sensor can be dictated by a sample die. In an embodiment, a sensor is cut with an ISO 527-2 Type 1 BA specimen die and has a "dog bone"-like shape. Sensors can be longer than they are wide, and can have two ends of similar sizes that are wider than the portion connecting the ends.

Sensors can be affixed to a variety of substrates for the purpose of sensing aspects of mechanics. Sensors as described herein can be used as stretchable strain sensors, resistance recoverable electrodes, or deformable mechanical sensors. A sensor can be affixed to a planar or curved surface, smooth or rough, and can be deformable. A surface can be inorganic or organic. A surface can be mammalian skin, for example human skin.

Also described herein are methods of fabricating fragmented carbon-nanotube based sensors. See, for example, FIG. 32. The method 3200 may comprise embedding 3201 a carbon nanotube composition in a substrate and fragmenting 3202 the carbon nanotube composition. The embodiments described above are hereby incorporated by reference in its entirety. For example, the carbon nanotube composition may include one or more of SWCNTs and MWCNTs in the form of a structure, such as paper or wire. Embedding may include transferring a carbon nanotube composition to a substrate and/or forming a carbon nanotube composition in and/or on a substrate. The carbon nanotube composition may be fully or partially embedded in the substrate. In embodiments where a carbon nanotube composition is partially embedded in the substrate, the carbon nanotube composition may have a surface or part of a surface exposed to (e.g., in contact with) a non-substrate material (e.g., surrounding environment, etc.). Fragmenting may include applying a crack onset strain sufficient to crack and/or fragment the carbon nanotube composition, as well as delaminate (e.g., local delamination) the carbon nanotube composition from the substrate. For example, fragmenting may include applying up to and/or about a 50% strain sufficient to crack, fragment, and/or delaminate the carbon nanotube composition. In other embodiments, fragmenting may include applying greater than a 50% strain. In some embodiments, fragmenting may include one or more of stretching, bending, twisting, pulling, etc. More details regarding fragmenting are described elsewhere herein. In many embodiments, one or more fragments of the fragmented carbon nanotube composition may be bridged by the one or more carbon nanotubes. In some embodiments, the method may further comprise affixing one or more conductive devices to one or more sides of the carbon nanotube compositions.

Figure 33:
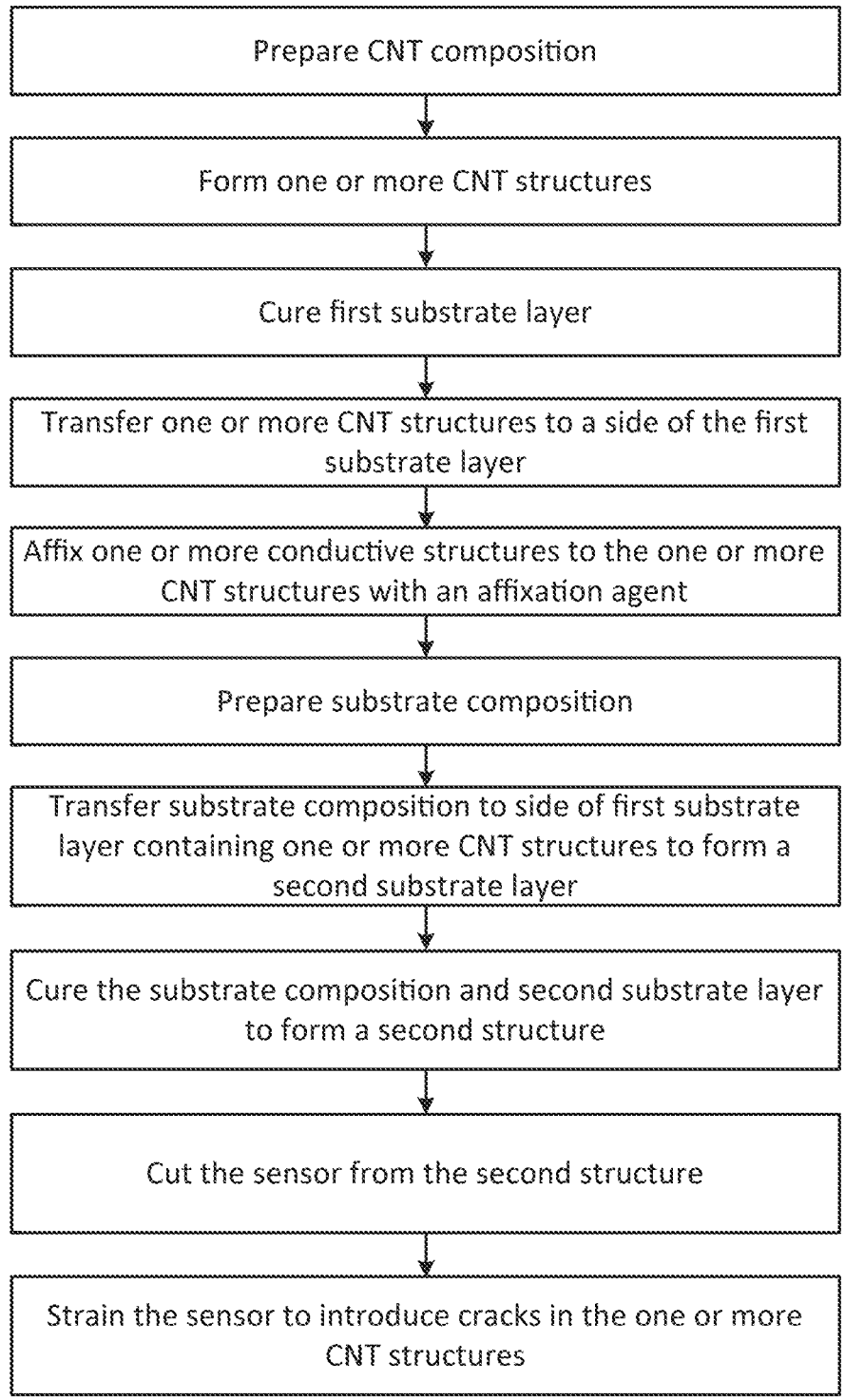

In some embodiments, one or more CNT structures can be formed from aqueous CNT compositions (or CNT inks) by methods such as vacuum filtration and wet spinning. In certain embodiments, aqueous CNT compositions can be formed by mixing CNTs, a dispersant, and a solvent together along with further mixing and sonicating. In certain embodiments the dispersant can be the solvent. In an embodiment, CNT paper is formed by vacuum filtration. In another embodiment CNT wire is formed by wet spinning. After the CNT structure is formed, the structure can be transferred to a first layer of substrate. The first substrate layer can be formed by mixing the substrate and a curing agent and curing. The first layer of substrate can be PDMS. After transfer of the CNT structure to the first substrate layer, conductive devices (in an embodiment copper wire) can be affixed to the CNT structure with an affixation agent. Multiple configurations can be realized, and one skilled in the art could choose a desired configuration for a desired application. A second layer of substrate of equal weight to the first layer can then be prepared and poured over the first layer, the CNT composition, the conductive devices, and the affixation agent and cured. In an embodiment, curing can take place at around 70° C. In an embodiment, the first and the second substrate layers can have about the same thicknesses. In an embodiment, the first substrate layer can have a thickness of about 0.5 mm. After the second layer has cured, the sensor can be cut to a desired shape using an instrument such as a die (for example an ISO 527-2 Type 1BA specimen die). After the sensor has been cut, the sensor can be subjected to strain to fragment or crack the CNT structure. The steps as described herein are not intended to be performed in any particular order or intended to be limited, and it would immediately be apparent to one skilled in the art how to fabricate a sensor as described herein according to the methods herein. An embodiment of a method as described herein is shown in FIG. 33.

In an embodiment, a method of fabricating a sensor comprises preparing an a CNT composition; forming one or more CNT structures; curing a first substrate layer; transferring the one or more CNT structures onto a surface of the first substrate layer; affixing one or more conductive devices to the one or more CNT structures with an affixation agent; preparing a substrate composition; transferring the substrate composition onto the side of the substrate with the one or more CNT structures; curing the substrate composition to form a second substrate layer and to form a second structure, wherein the second structure comprises the first and second substrate layers, one or more CNT structures, the affixation agent, and one or more conductive devices; cutting the second structure with a cutting device to form a sensor; and straining the sensor to introduce cracks the one or more CNT structures of the sensor. In some embodiments, the composition may further comprise a dispersant. In some embodiments, forming may comprise vacuum filtration or wet spinning, or both. In some embodiments, the one or more CNT structures may be paper structures, wire structures, or both. In some embodiments, the first substrate layer has a thickness of about 0.1 μm to about 100 μm. In some embodiments, the substrate layer may further comprise PDMS. In some embodiments, the one or more conductive devices may be copper wire. In some embodiments, the affixation agent may be silver epoxy. In some embodiments, the cutting device is an ISO 527-2 type 1 BA specimen die. In some embodiments, straining is to a level of about 50% strain. In some embodiments, the first substrate layer and the second substrate layer have about equal weight of substrate or about equal thickness.

Example 1

Described in this example or embodiment are fragmented carbon nanotube papers for ultrasensitive, stretchable strain sensors. The development of strain sensors featuring both ultra-high sensitivity and high stretchability is still a challenge. It is demonstrated herein that strain sensors based on fragmented single-walled carbon nanotube (SWCNT) paper embedded in poly (dimethylsiloxane, aka PDMS) can sustain their sensitivity even at very high strain levels (with a gauge factor of over 10,000,000 at 50% strain). This record sensitivity can be ascribed to the low initial resistance (5-28Ω) of the SWCNT paper and wide range of resistance change (up to 1 MΩ) governed by percolation of SWCNT networks in the crack region. The sensor response can remain nearly unchanged after 10000 strain cycles at 20% demonstrating the robustness of this technology. The fragmentation based sensory system brings opportunities to engineer the stretchability of nanomaterial assemblies while maintaining a high sensitivity.

It is now common to design flexible strain sensors using metallic nanoparticles and nanowires, carbon nanotubes (CNTs) and graphene-based materials. However, the pursuit to design reliable strain sensors that feature high stretchability (up to 50%), high sensitivity and durability continues. The sensitivity of a strain sensor is usually quantified by its gauge factor (GF), which is the relative change in resistance ($\Delta R/R_0$) per unit applied strain (c), in which $\Delta R$ and $R_0$ are the resistance change and the initial resistance, respectively. CNT-based strain sensors (films or fibers) have been shown to have moderate sensitivity, with the highest GF approaching 360. Their sensitivity can be improved by either reducing the initial resistance or by increasing the change in resistance. This latter point is more challenging and a novel method is needed to amplify the change in resistance.

CNTs are highly conductive fillers, with volume conductivity ranging from $7 \times 10^{-5}$ to $4 \times 10^{-3}$ Ωcm. Despite the additional resistance introduced by the CNT/CNT interface, the resistance of CNT assemblies is low enough to qualify them as candidate material for designing strain sensors when embedded in stretchable materials. Stampfer et al. demonstrated the potential of individual single-walled CNTs (SWCNTs) to sense displacement at the nanoscale, with a GF up to 2900. CNTs are also used to create piezoresistive networks, in which the main sensing mechanism is the change in resistance at the CNT/CNT junctions when the network is stretched. Certainly, the sensitivity of the electron tunneling mechanism plays a major role; however, such studies are usually limited to small perturbations (a strain below 5%) because fibrous CNT assemblies have little elongation upon breakage. Here, a strain sensor with high sensitivity and high stretchability is designed by introducing cracks into the SWCNT paper using the unique morphology of SWCNT networks between the crack tips as the main sensing components.

Cracks are normally considered detrimental to the overall mechanical and electrical properties of materials. For example, channel crack propagation in indium-tin-oxide (ITO) coatings due to stretching or bending leads to degradation of the electrical properties of ITO-coated flexible electronics. Similarly, microcracks appearing on conductive polymer-coated fabrics during deformation results in variation of electrical resistance. However, if these cracks can be controlled, they also have the potential for use in mechanical sensing applications. Strain sensors made of cracked silver nanoparticle thin film coated on PDMS substrates can be stretched to 20% with GF=7. This change in resistance is attributed to the opening and closing of microcracks. Ultrasensitive (GF>2000) strain sensors based on the formation of nanocracks in a brittle platinum thin film deposited on the top of stretchable layers have been reported; however, they had only 2% stretchability. This mechanism was based on the disconnection-reconnection process of nanoscale crack junctions under strain or vibration at the nanoscale. Alternatively, aligned CNT film can be stretched perpendicular to the direction of alignment, fracturing the films to sustain strains up to 280%. However, poor transverse interparticle conductivity of aligned CNT films coupled with high initial resistance results in sensors with very low sensitivity (GF=0.04). By generating microcracks in the thickness gradient of the CNT film, strain sensing could be greater than 100% of the strain. However, when stretched to 15%, the GF of the sensor decreased from 161 to 0.58, showing large sensitivity deviations in the range of the strain measurement. Sensors made of graphite thin films with short microcracks possess high GF (maximum value of 522.6) and high stretchability (ε>50%), whereas sensors with long microcracks show ultrahigh sensitivity (maximum value of 11344) with limited stretchability (c 50%).

Here, initial fragmentation to papers made of randomly distributed SWCNTs embedded in poly (dimethylsiloxane) (PDMS) is introduced by stretching them above their crack onset strain. The entangled networks of SWCNTs bridging the fragments throughout the cracks play a key role toward enlarging the change in electrical resistance of the strip (from 5Ω to 30 MΩ). The sensor can measure a strain up to 50%, with a GF of $10^7$. This technology is robust, whereby the performance remains unchanged up to 10000 cycles at 20% strain. Described herein is the sensing strategy that equips the present sensors with ultrahigh sensitivity and high stretchability. Parameters are identified herein that can be used to create an optimized structure by initiating cracks in the SWCNT papers. The strain sensing properties as well as their sensing mechanisms are also shown herein. Devices and methods as described herein can readily be extended to other conductive nanomaterials, paving the way for developing high-performance strain sensors.

Figure 1B:
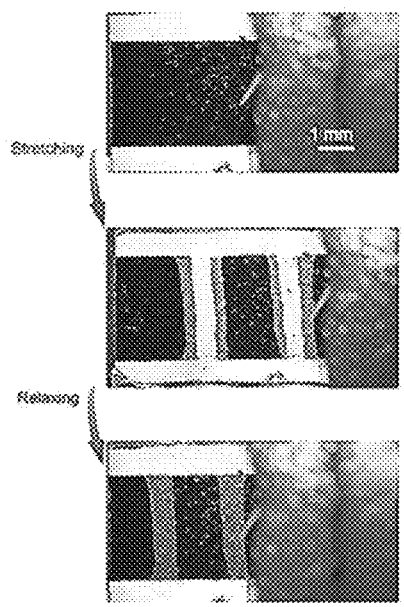
FIG. 1B depicts images of a typical 45 µm-thick SWCNT paper in PDMS being stretched to 50% strain to promote fragmentation, and then relaxed to 0% strain.

CNT papers are not typically stretchable (strain to failure is less than 5%); therefore, to introduce stretchability into the papers they are embedded into a PDMS substrate. FIG. 1A demonstrates how a fragmented SWCNT paper sensor can be fabricated (See the Experimental Section and Supporting Information for further details). When this sample is stretched, the SWCNT paper fragments, while the behavior of the surrounding PDMS remains reversible (FIG. 1B). When the strain is relaxed, cracks close but remain in the paper (FIGS. 1A and 1B). It is these cracks, created during the prestraining of the sample that can become central to the sensing strategy.

The cracking mechanism is very classical of degradation henomenology in laminated structures. A SWCNT paper with a random, porous structure was used because its low strength and toughness make it easy to fragment (FIGS. 10A-10F). The fragility of this paper required a low concentration ink (0.5 wt %) with a mild acid ($CH_3SO_3H$) as the dispersant. When the sample is stretched, a pseudo-periodical pattern can develop channel cracks perpendicular to the principal loading direction (see FIG. 2A). This is similar to the "transverse" cracking mechanism well-known in laminated composites and to the channel cracking mechanisms in thin coatings, for which there are well-established micromechanical models. Thus, the micromechanics will not be redeveloped in entirety here, but reliance can be on the results that are relevant to the present study.

Figure 2A:
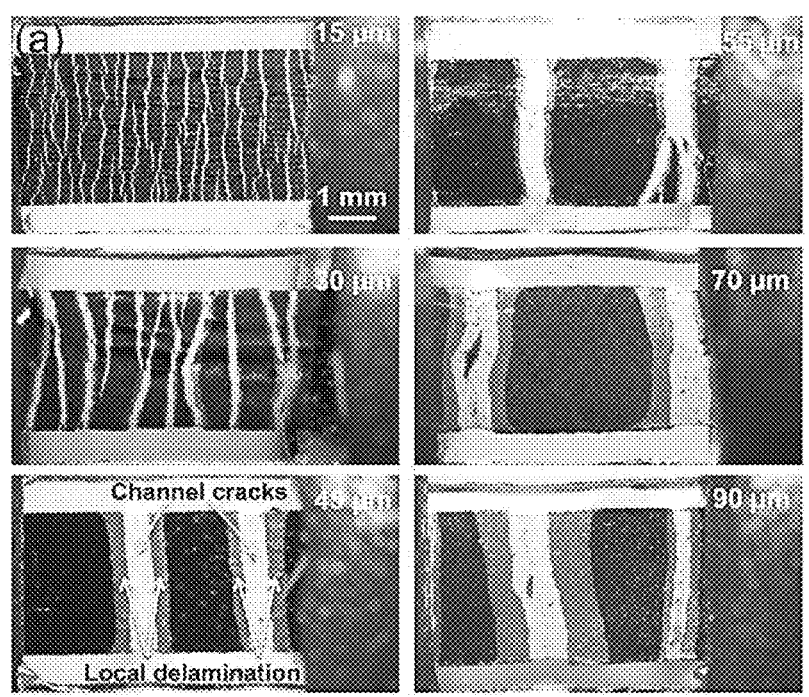
FIG. 2A shows photographs of SWCNT paper of different thicknesses embedded in elastic substrates after stretched to 50% strain.
Figure 2B:
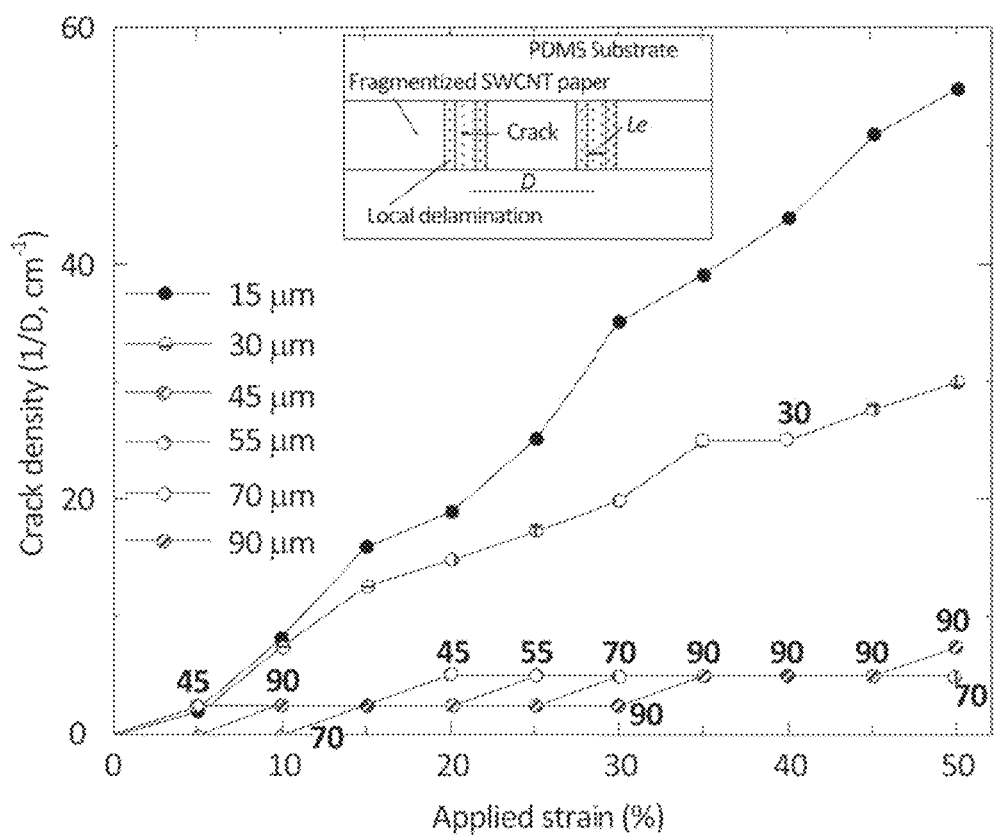
FIG. 2B shows the evolution of crack density with applied strain for samples of different thicknesses. The inset image represents configuration of the sample with a crack distance (D) and average crack opening distance (Lc).

The first stage of the degradation is a fragmentation process that can be strongly dependent on thickness. Crack density as described herein can be defined (i.e., the number of cracks per unit length about the loading direction) as 1/D, where D is the average spacing between the cracks, as shown in the inset image of FIG. 2B. FIG. 2A illustrates the crack patterns at 50% strain for samples with thicknesses of 15, 30, 45, 55, 70 and 90 µm. The evolution of crack density with strain is reported for each sample on FIG. 2. Two regimes can be observed: for "thin" papers (15 and 30 µm), channel cracks generally go only partially through the width and for "thick" papers (45, 55, 70 and 90 µm), very few cracks are observed, but those that do run through the whole width of the sample. This is consistent with the classical micromechanics of channel cracking, where the usual distinction is done between an energy-guided regime for thin plies and a strength-guided regime for thick plies.

The second stage of the degradation can be the development of local delamination between the SWCNT paper and the PDMS substrate. Local delamination can be expected around crack tips because channel cracks cause severe out-of-plane stresses at the interfaces between the tips and the substrate. This process is dependent on the thickness of the plie: delamination is difficult to observe in thin paper but obvious in thick paper (45, 55, 70 and 90 µm). Furthermore, the degree of delamination can depend on the balance between the energy release rate for channel cracking and the energy release rate for local delamination, the latter of which can be more favorable in thick plies.

Figure 2C:
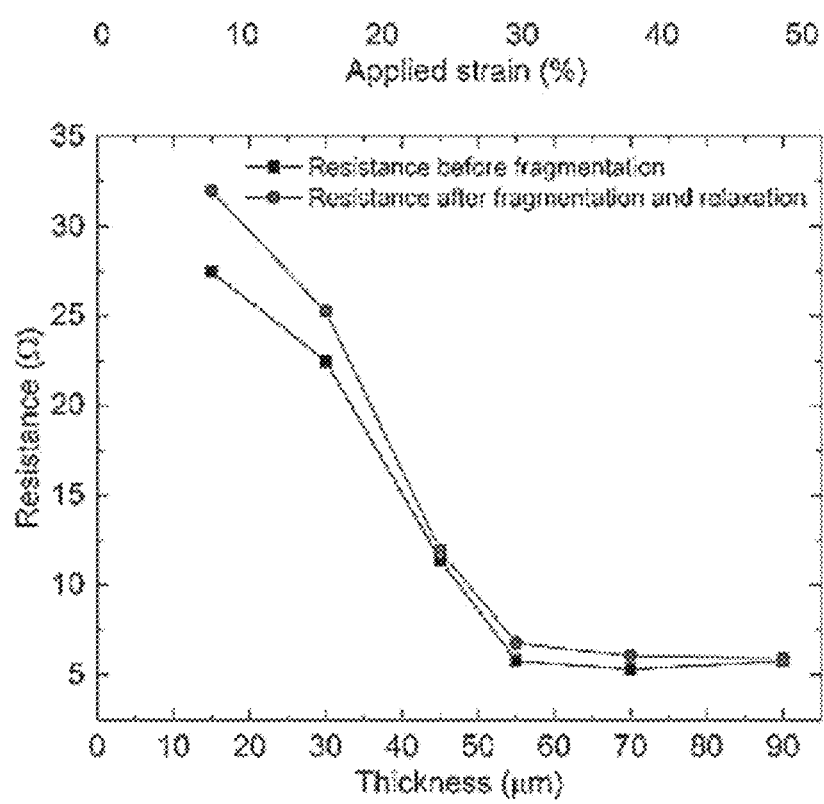
FIG. 2C depicts DC electrical resistance of samples without and with cracks (after relaxation).

FIG. 2C and FIG. 8 show that as paper thickness increases from 15 to 90 µm, the resistance before fragmentation ($R_0$) reduces from 28 to 5Ω in an inversely proportional manner. This result was the expected provided there was no change in morphology with increasing thickness. Thus, film morphology can be similar for all thicknesses. The final resistance after fragmentation and relaxation is similar to the initial resistance (FIG. 2C), indicating that after the fragmentation process, the conductive pathway can be reconnected though the flexible SWCNTs in the crack.

Figure 3A:
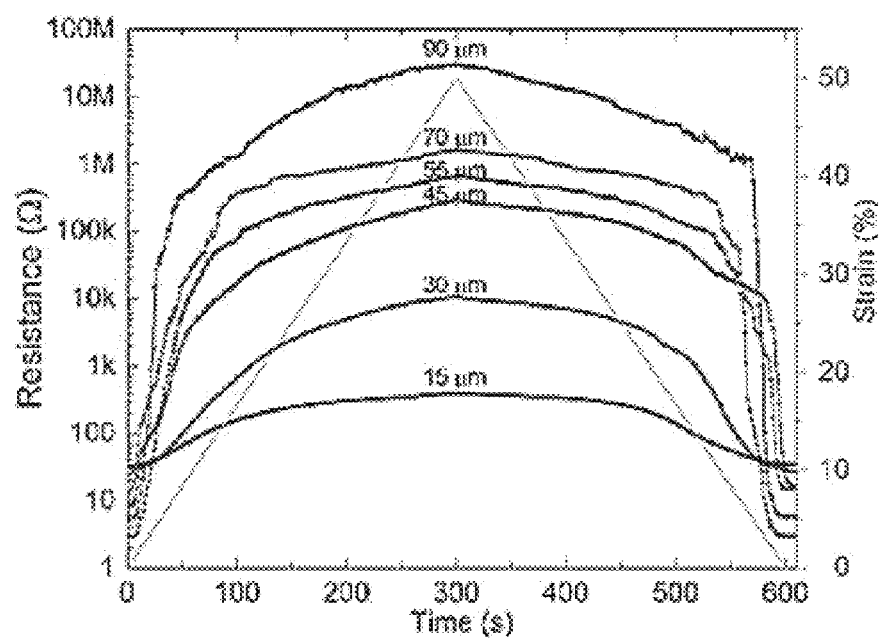
FIG. 3A shows resistance changes of strain sensors (fragmented SWCNT paper in PDMS) by stretching and relaxing.
Figure 3B:
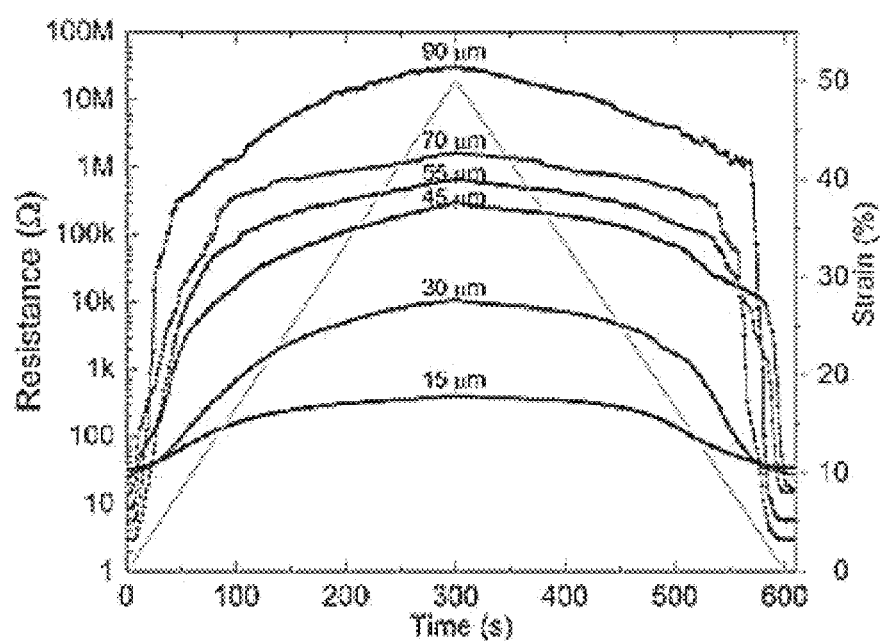
FIG. 3B shows increasing average crack opening distance ($L_C$) with increased applied strain.
Figure 3C:
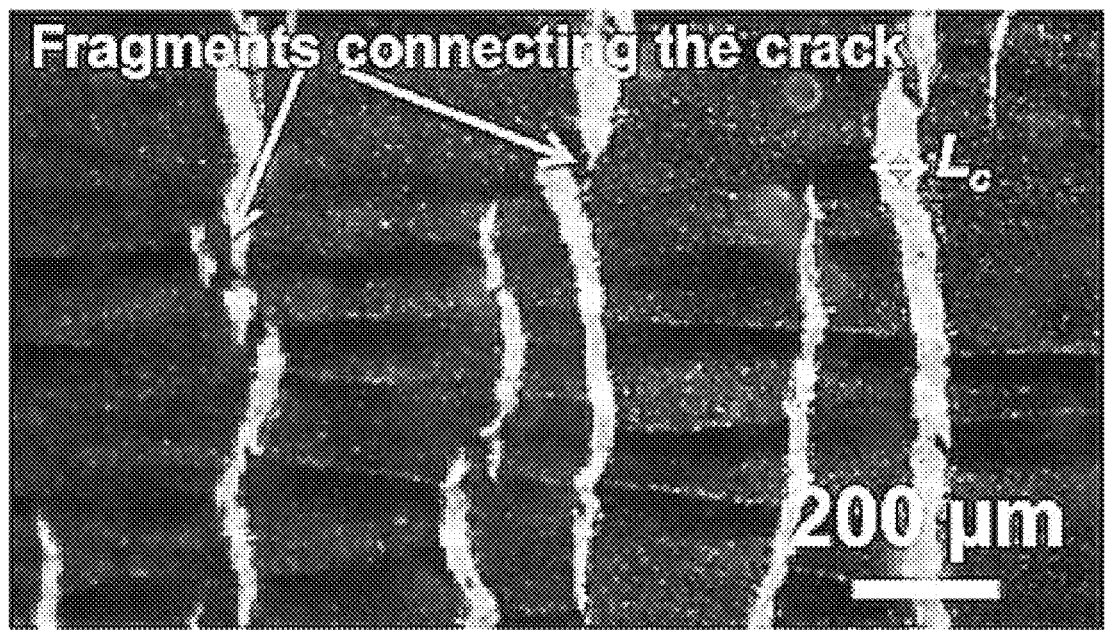
FIG. 3C illustrates crack openings of the SWCNT paper in PDMS by increasing the strain to 50% for a 15 μm-thick sample.
Figure 3D:
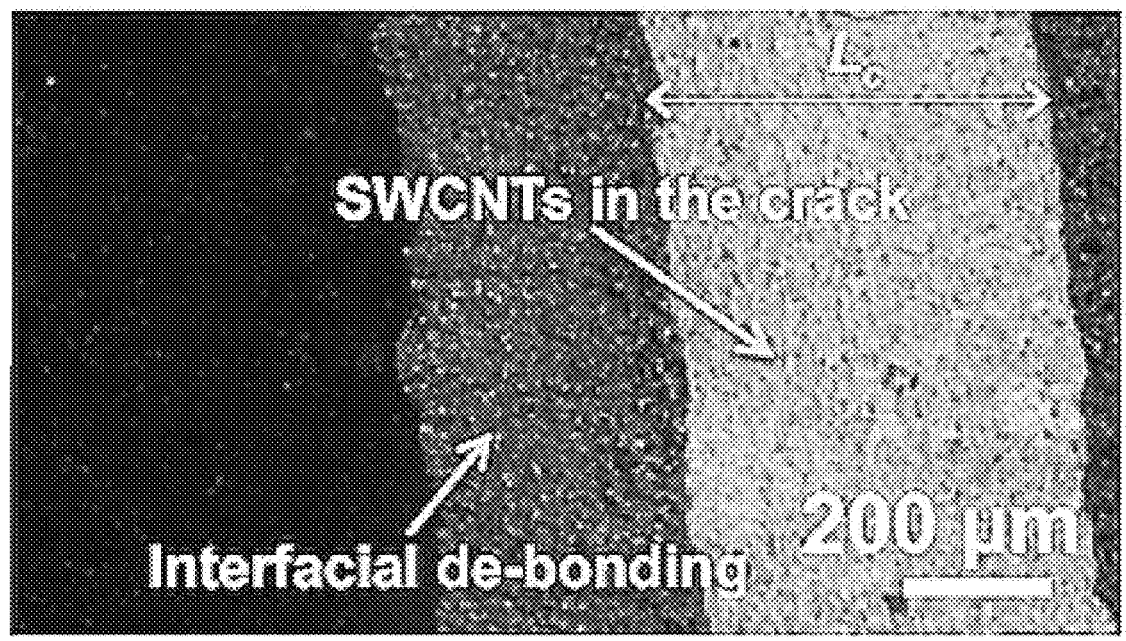
FIG. 3D illustrates crack openings of the SWCNT paper in PDMS by increasing the strain to 50% for a 45 μm-thick sample.

The fragmented structure of SWCNT paper embedded in PDMS can now be used as high performance strain sensors. FIG. 3A presents the strain-sensing behavior of strips of the fragmented paper in PDMS when the strain ranges from 0 to 50%. The resistance of the paper increases with applied strain for all samples. Moreover, the range of relative change in resistance ($\Delta R/R_0$) can be thickness controlled. This can be very important for engineering the sensitivity of the strain sensor. At 50% strain, the increase in resistance ranges from 100Ω to 30 MΩ for 15-µm to 90-µm thick paper. The evolution of average crack opening distance, $L_C$, with strain is almost linear (FIG. 3B), testifying to the overall linear elastic response of the sensor after fragmentation and relaxation. FIGS. 3C-3D show crack openings of the SWCNT paper in PDMS by increasing the strain to 50% for 15-µm and 45-µm samples respectively. As expected, samples with larger opening distances exhibit larger resistance under strain. For example, the resistance at a strain of 50% of 15-µm and 45-µm samples are 400Ω and 300 kΩ, respectively. The relatively small change in resistance of thin samples can be attributed mainly to small fragments connecting the cracks, ensuring residual electronic transport.

Figure 4A:
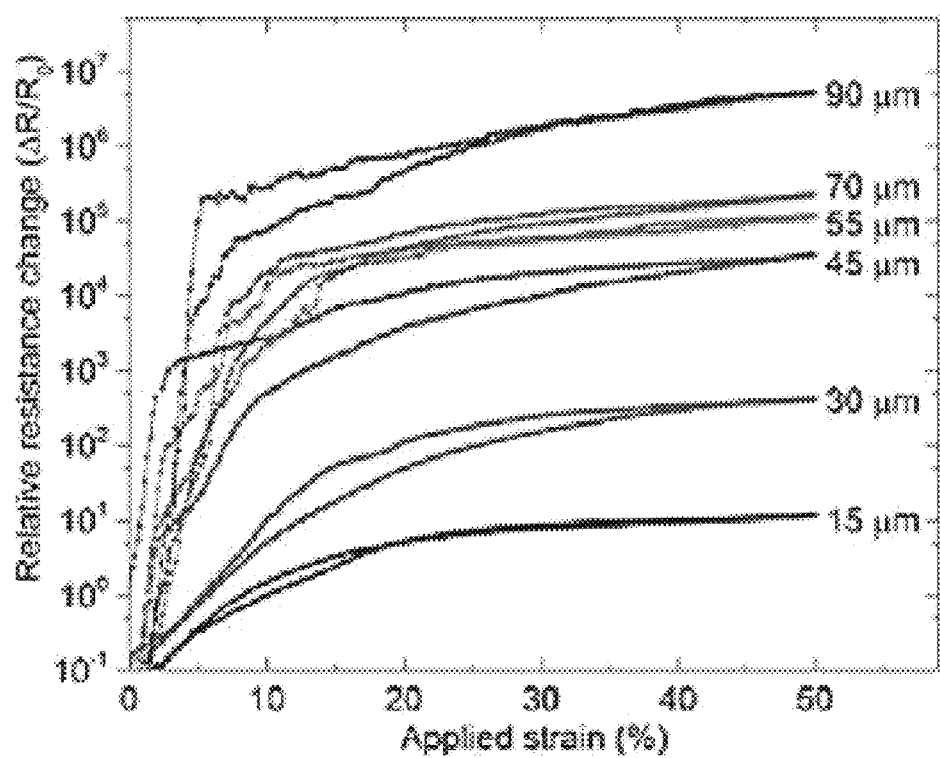
FIG. 4A shows relative resistance change versus applied strain of the SWCNT paper in elastic substrates during loading and unloading with a maximum applied strain of 50%.
Figure 4B:
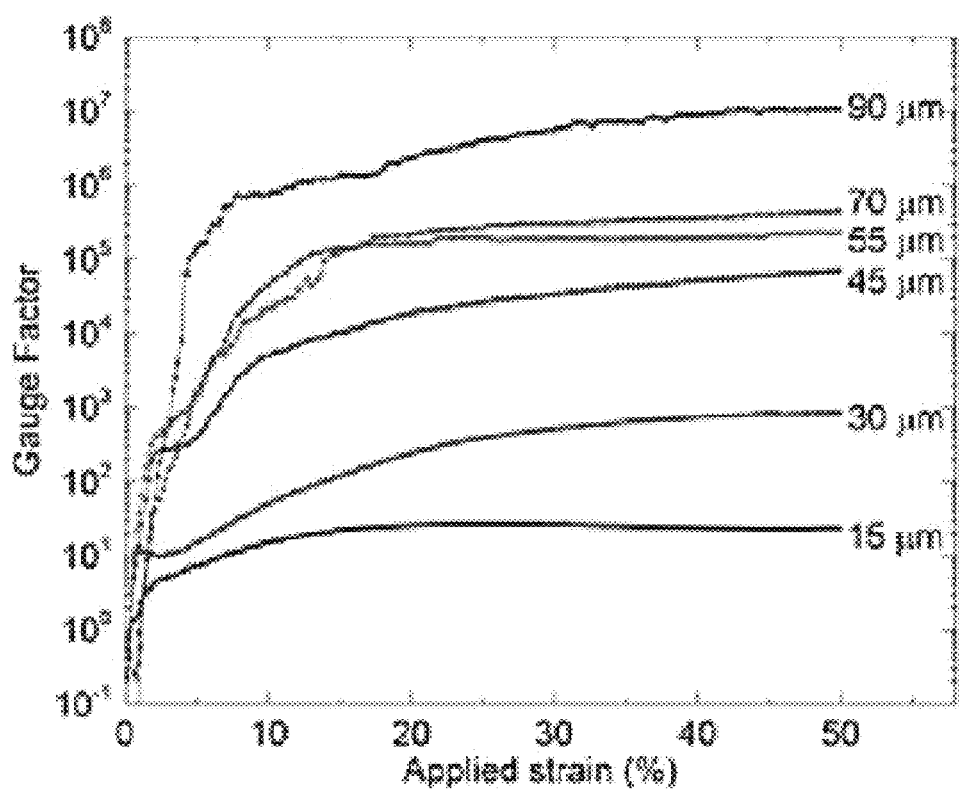
FIG. 4B depicts GF versus applied strain for different samples.
Figure 4C:
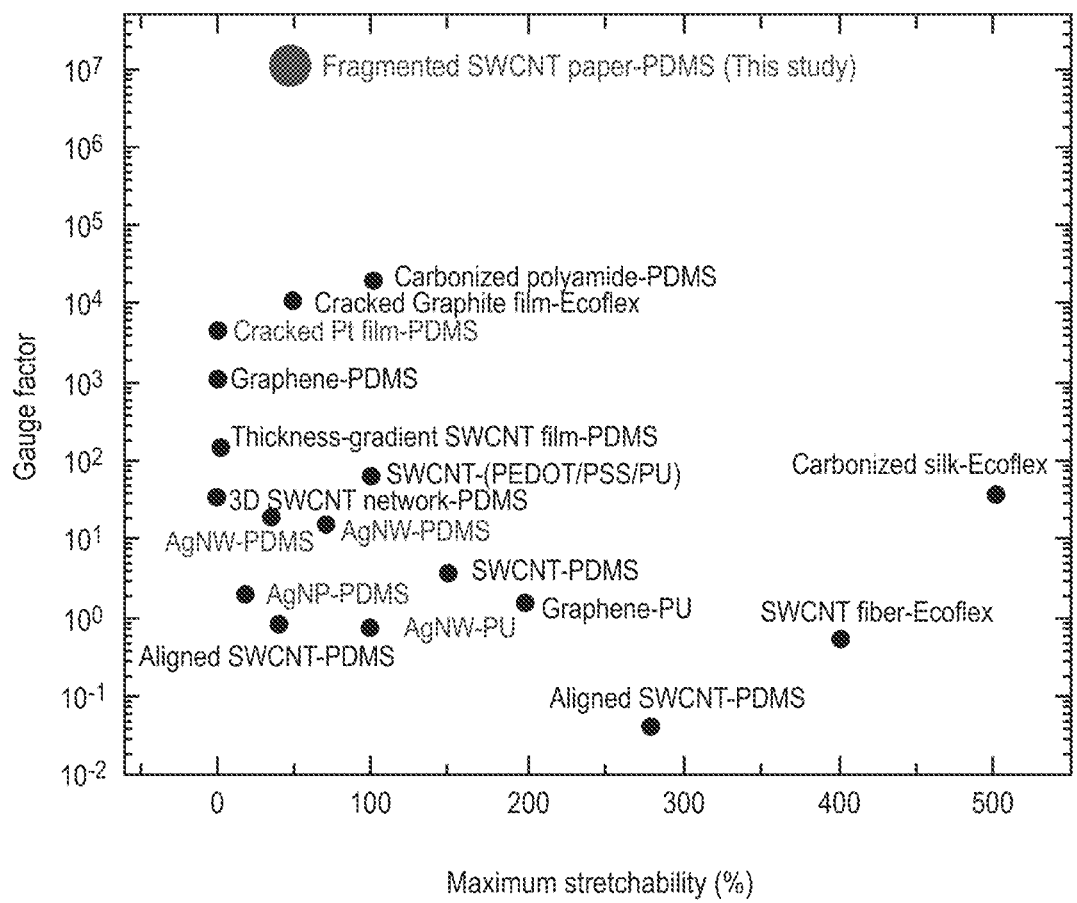
FIG. 4C illustrates GF as a function of maximum stretchability of recently reported carbon-material-based strain sensors.
Figure 4D:
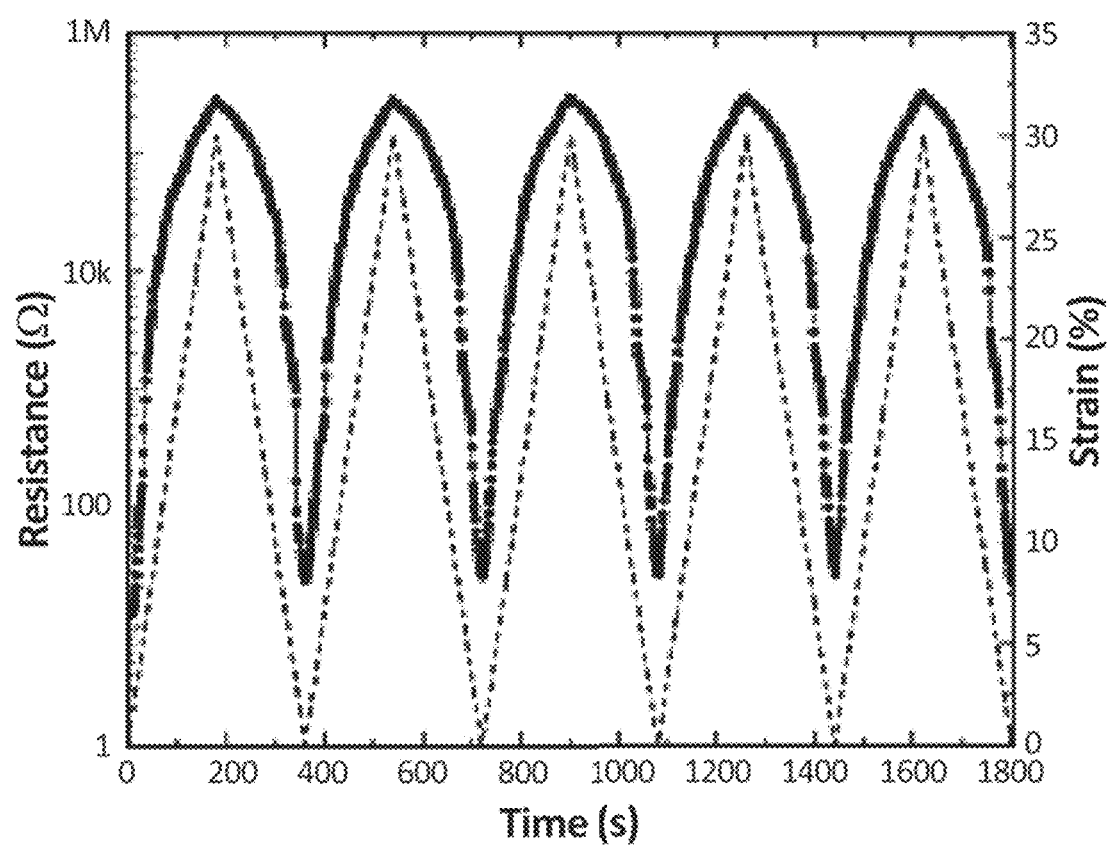
FIG. 4D shows the dynamic response of the strain sensors to stretching/relaxing cycles at 30%.
Figure 4E:
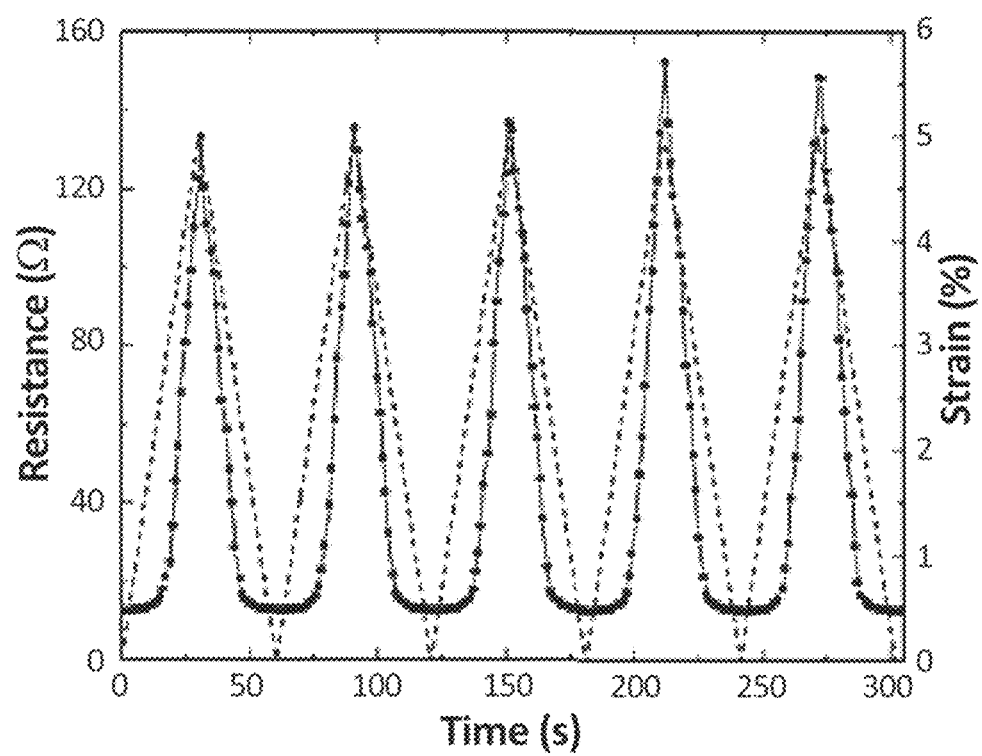
FIG. 4E shows the dynamic response of the strain sensors to stretching/relaxing cycles at 5%
Figure 4F:
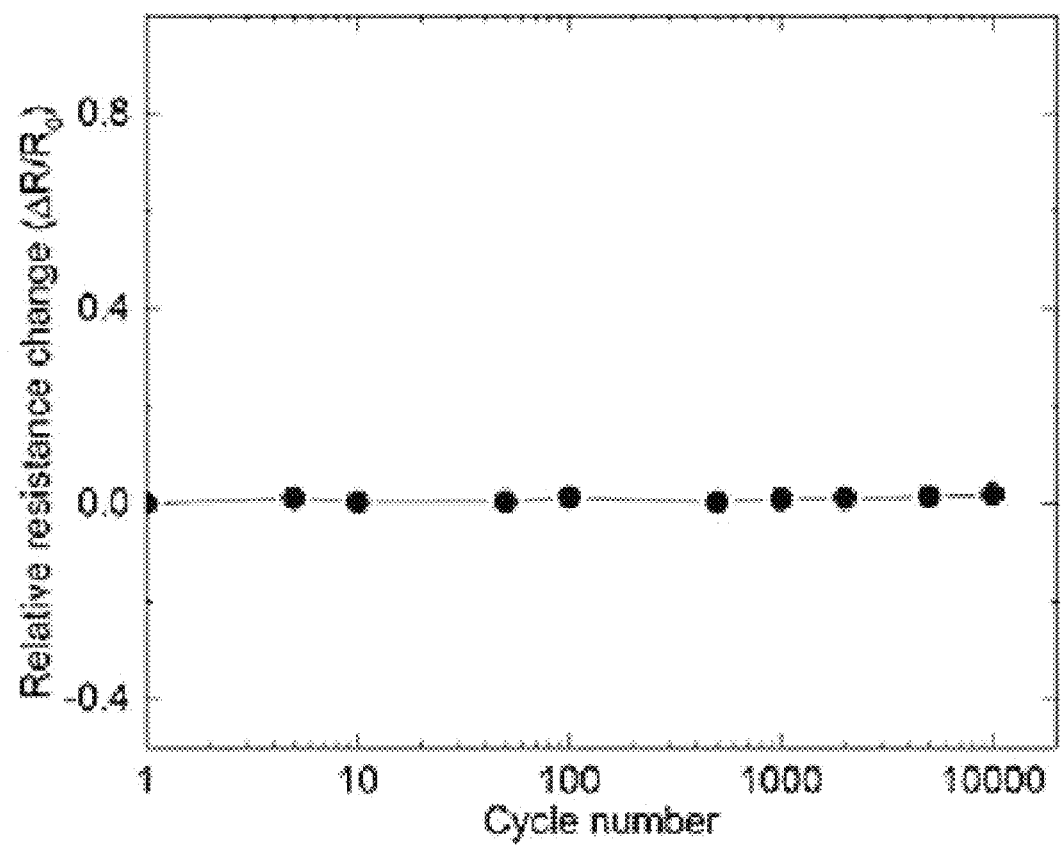
FIG. 4F depicts relative resistance change after relaxation from each cycle for a total of 10000 cycles.
Figure 14:
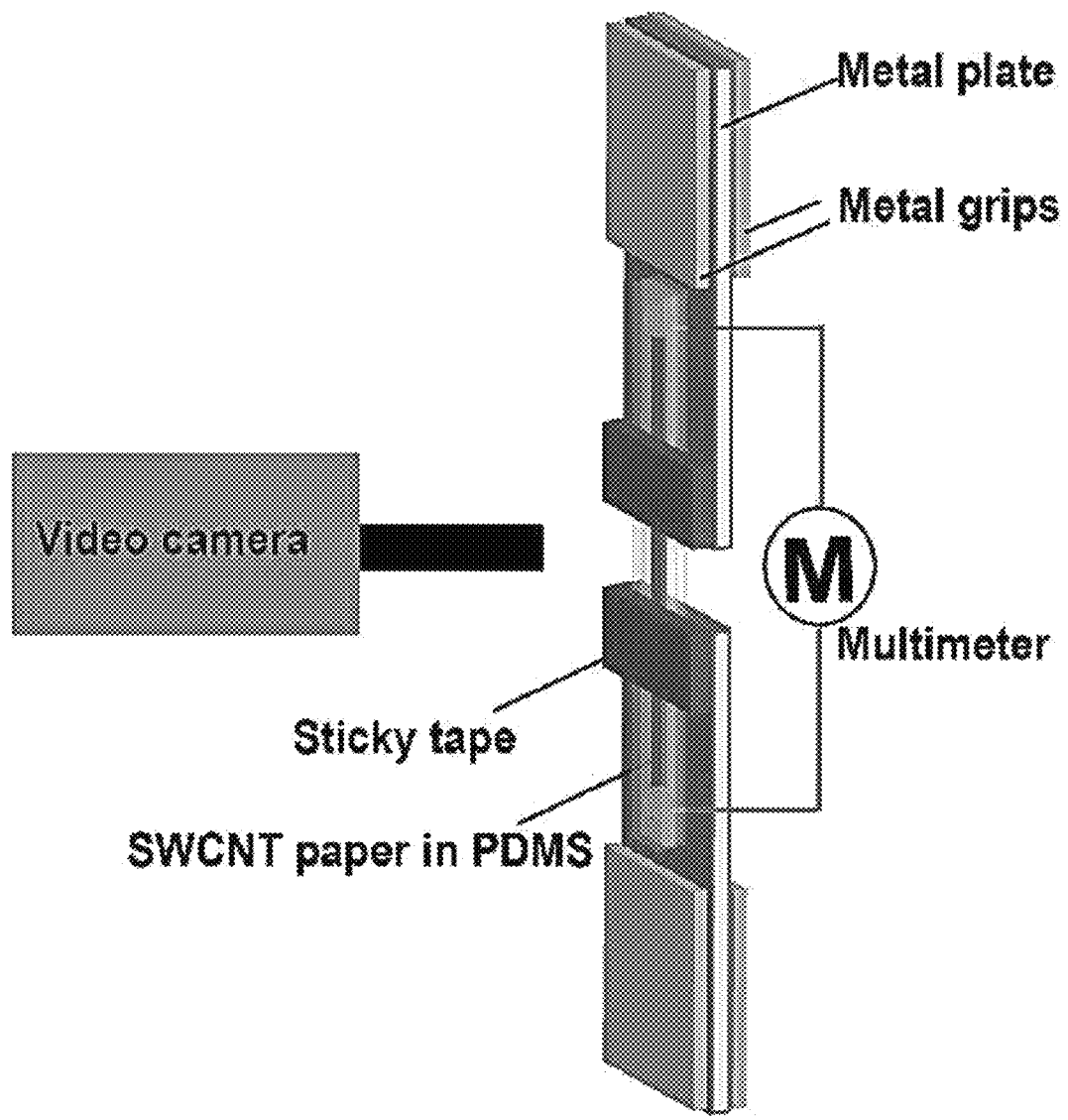
FIG. 14 is an illustration of an embodiment of a setup for sample fragmentation and electromechanical testing.
Figure 16:
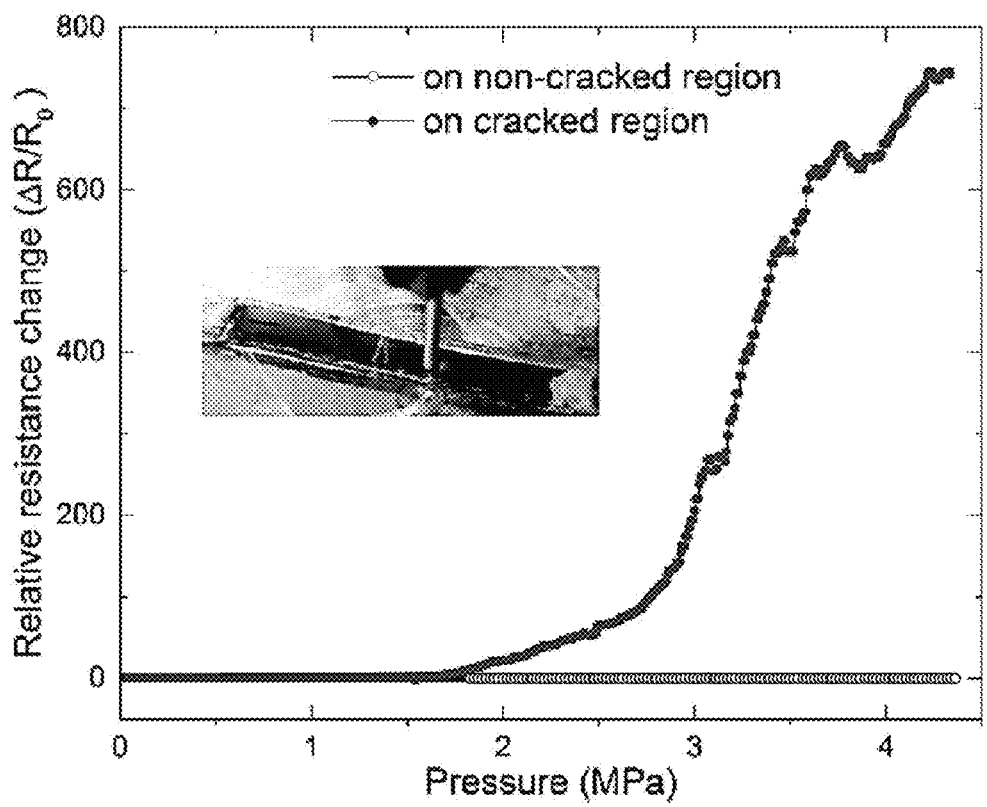
FIG. 16 illustrates relative change in resistance with increasing pressure of a fragmented strain sensor on cracked and noncracked regions. Inset shows compression testing of the sensor.

We then plot the relative change in resistance ($\Delta R/R_0$) and the GF with respect to strain on FIGS. 4A and 4B. The sizeable change in resistance ($\Delta R/R_0 = 10^6$) of 90-mm-thick SWCNT paper in PDMS enables a record GF of $10^7$ at $\varepsilon = 50\%$. In comparison, conventional metal gauges have a GF around 2.0. The GF of the sample is several orders of magnitude larger than was recently reported for stretchable strain sensors at 50% based on CNT, graphene and silver nanomaterials (FIG. 13). The GF value is $10^3$-fold higher than the highest value of strain sensors, as shown in FIG. 4C and FIG. 13, indicating that it could be used as an ultrasensitive strain sensor to detect subtle change in strain. The long-term performance of the sensor when exposed to cyclic stretching/relaxing was also tested. FIG. 4D and FIG. 14 present five cycles of a strain from 0 to 30%, in which the $\Delta R/R_0$ evolved in a very reversible and stable manner; this conclusion can be extended at lower strain levels (0 and 5% tensile strain, FIG. 4E). The effect of channel cracks on the electrical resistance is clear at large strain but can be undetectable when the sample is released, indicating that the crack edges reconnect through SWCNT networks (FIG. 1B). The repeated opening and closing of the cracks led to reversible strain sensing with high sensitivity. After 10000 cycles at 20% strain, the resistance of the strain sensor (SWCNT paper thickness: 90 µm) remained nearly unchanged (FIG. 4F). The strain sensor was also subjected to a transverse compression test while measuring its electrical resistance (FIG. 16). The test was performed above the noncracked and cracked regions using a 1.25-mm-radius pressure head (FIG. 16). FIG. 16 shows the $\Delta R/R_0$ was 0 and 800 on non-cracked and cracked regions, respectively, at compression stress of 4 MPa. Thus, the cracked region of the fragmented paper is suitable for use as highly sensitive pressure sensors.

FIGS. 18A-18F depicts the evolution of the cracks opening in the papers with increasing applied strain to samples of two different thickness (15 and 45 µm). Note that stretching a precracked paper below the maximum "precracking" strain results in no additional cracks or delamination. Thus, sensing can be based on existing cracks/delaminations, which were created during the precracking stage, and their development can modify electron transfer in the fragmented SWCNT paper. There are two ways electrical transport from one side of a crack to the other can be achieved. At low strains, direct conduction occurs between the two sides of a crack when they are in contact. Of course, when increasing the longitudinal strain, the average crack opening distance, $L_C$, increases, also resulting in an increase in electrical resistance (FIGS. 3A-3D). Both sides of a crack can stay electrically connected as long as some CNTs or CNT bundles bridge them together. The cracked section of freestanding SWCNT papers that were observed displayed relatively aligned SWCNT bundles or single tubes that had partially pulled out from the paper. These bundles can be up to tens of micrometers in length (FIGS. 12A and 12B) and can contribute to some electrical transport even once the cracks start to open; however, at larger strains, the limited length of these bridging CNTs may reduce their contribution to transport.

Figure 17:
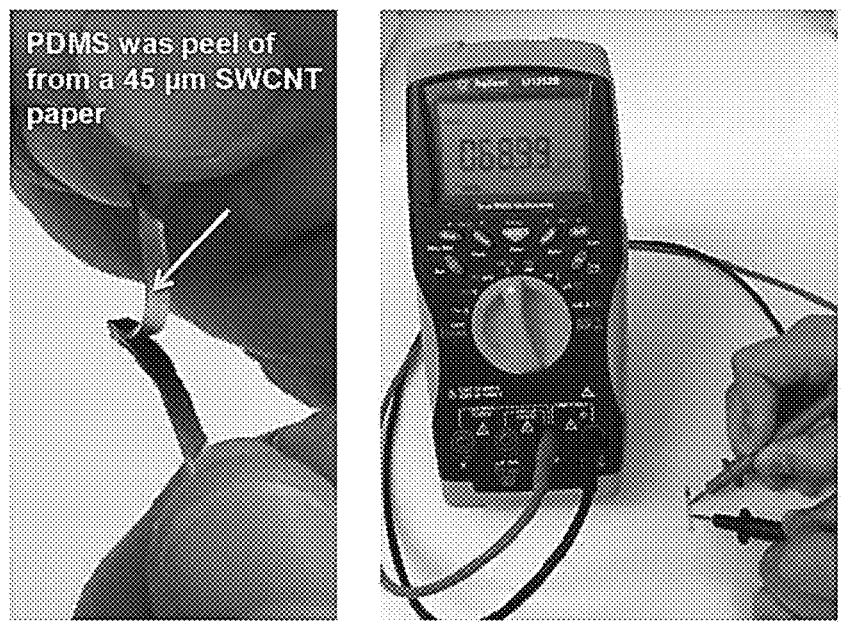
FIG. 17 shows the electrical properties of an embodiment of a thin layer of SWCNT coating on PDMS.
Figures 18A, 18B, 18C, 18D, 18E, 18F:
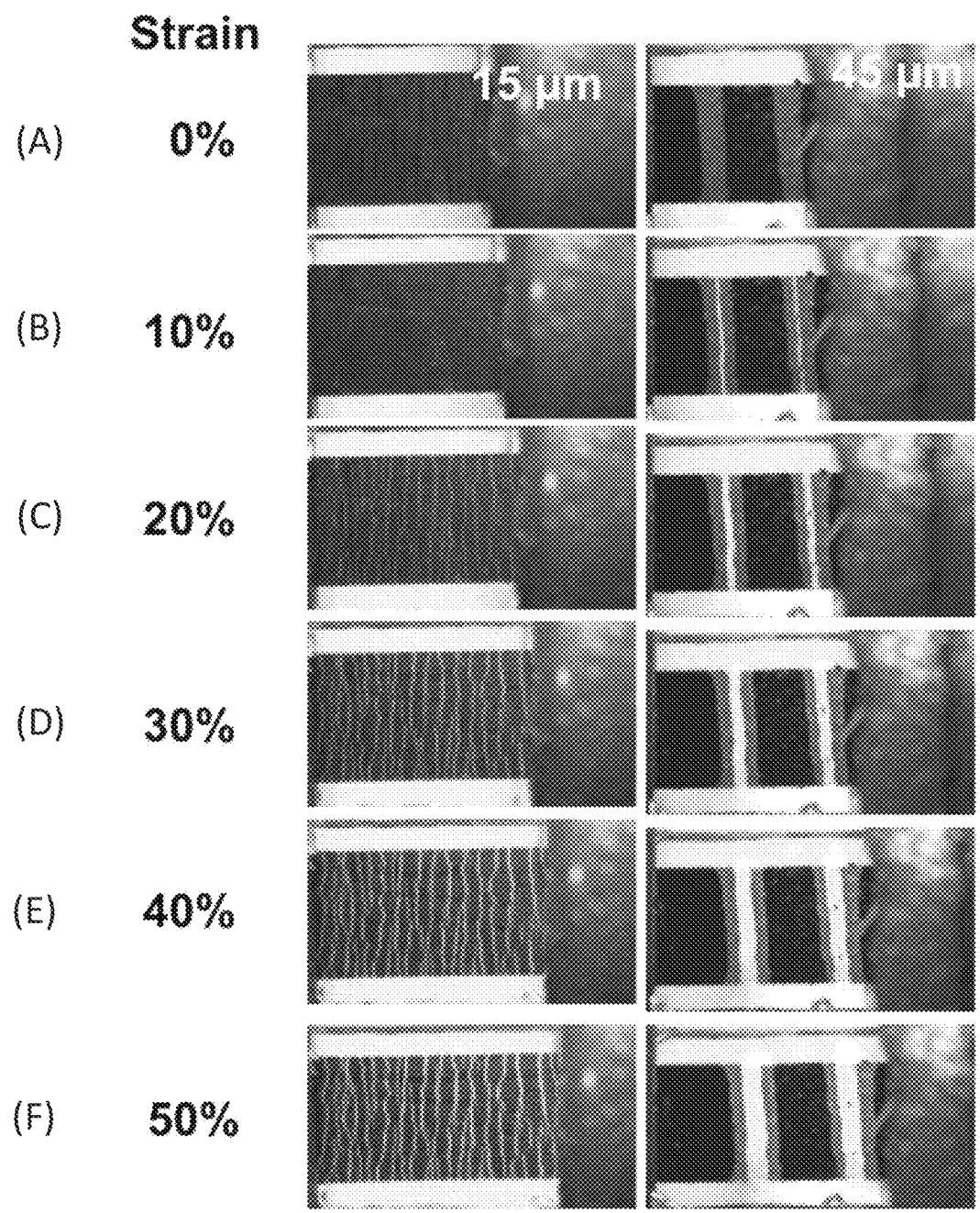
FIG. 18A-18F are images showing embodiments of fragmented SWCNT paper in PDMS at different strains. 15 μm-thick samples and 45 μm-thick samples are shown at 0% (A), 10% (B), 20% (C), 30% (D), 40% (E), and 50% (F) strain.

The other mechanism ensures the electrical transport up to very high strains. For example, in the case of 90-µm-thick sample, the maximum resistance can be very high (20 MΩ at ε=50%) but can remain finite despite the growth of very large gaps ($L_C$=500 µm). This can be attributed to residual conduction at the delaminated interface. Indeed, the upper layer of PDMS peeled from the SWCNT paper was gray in color and the resistance at the interfacial layer was measured to be about 69 kΩ for a 45-µm sample (FIG. 17). These results indicated that the PDMS precursor can infiltrate the SWCNT papers to some extent during encapsulation. When delamination occurs at the PDMS/paper interface, some CNTs can stay attached to the PDMS layer, resulting in a thin conductive film that continues to bridge the fragments, even at very high strains.

Figure 5A:
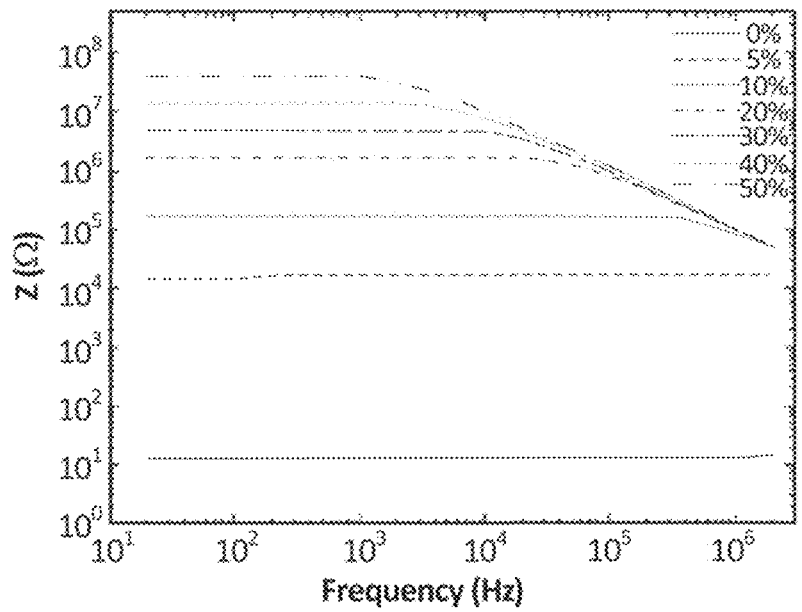
FIG. 5A shows frequency dependency of the modulus of the complex impedance (Z).
Figure 5B:
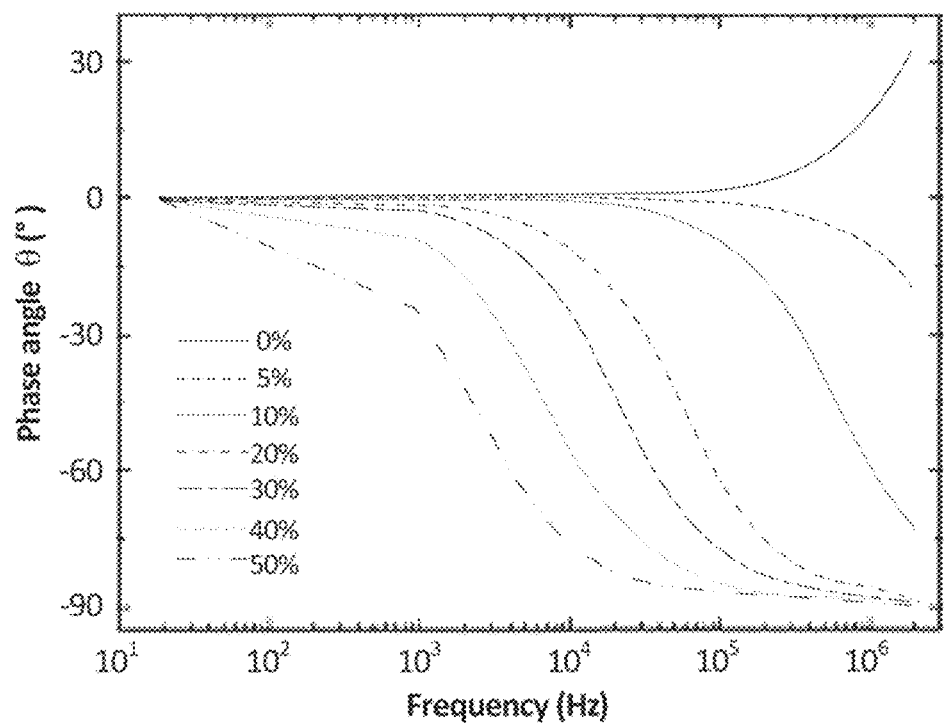
FIG. 5B shows frequency dependency of the modulus of the phase angle (θ).

To identify how electron transport across the bulk and interfaces takes place, characterization of the impedance response over a wide range of frequencies was performed and an equivalent electrical circuit is proposed herein. FIGS. 5A and 5B show the frequency dependency of the modulus of the complex impedance (Z) and phase angle (θ), respectively. At low strains (ε<10%), the impedance is nearly constant and the conduction mechanism can be dominated by the resistive behavior of the SWCNT paper. Many CNT to CNT direct contacts can exist and ensure macroscopic ohmic behavior. However, at higher strains, the electrical conductivity can become considerably more frequency dependent. As strain increases, the CNTs can become increasingly separated until electron tunneling becomes the dominant mechanism of electron transport. As the fragments become increasingly disconnected, the only conduction path that may remain is the CNT-covered delaminated area, where the density of CNTs is less and conduction can only proceed by electron tunneling. This observation can also be consistent with the phase data (FIG. 5B): at larger strains (ε>10%), the capacitive part of the sample can increase with frequency. This can be because the unconnected SWCNT networks can act as a capacitor instead of as a resistor.

Figure 5C:
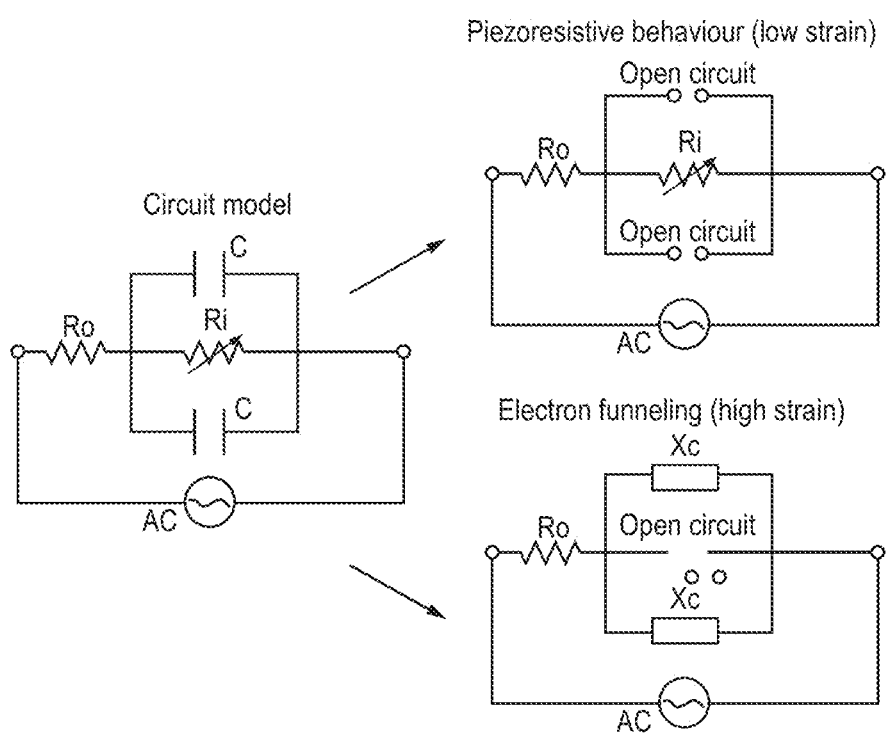
FIG. 5C is an equivalent circuit model of strain sensor response to applied AC stimuli.
Figure 5D:
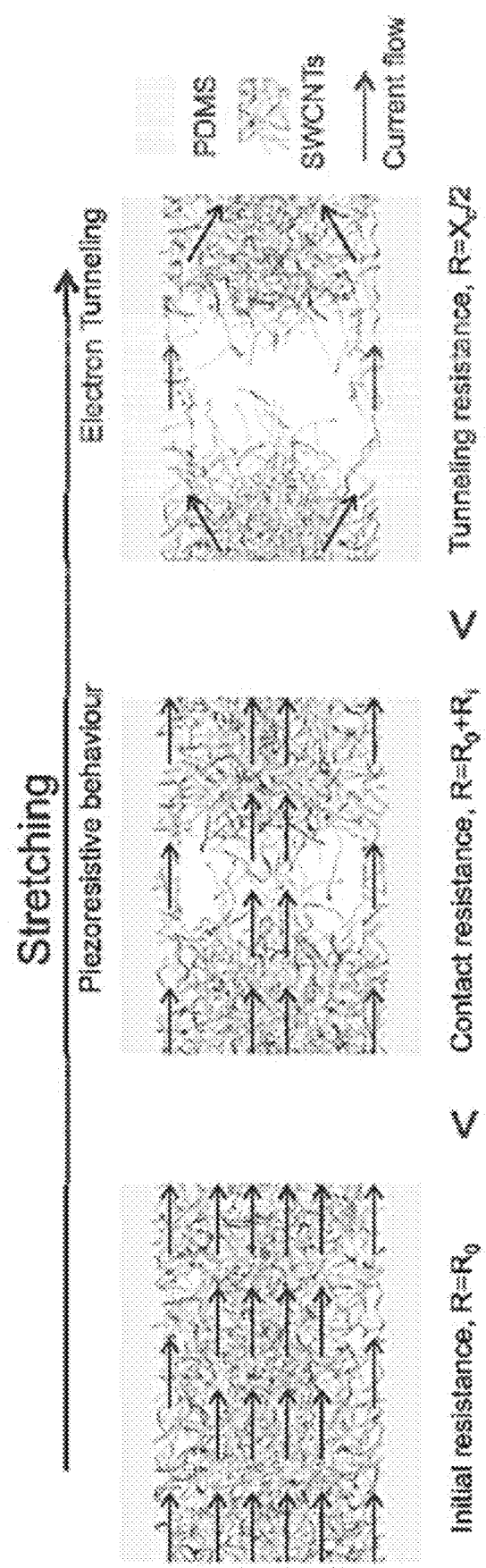
FIG. 5D depicts schematic images showing the evolution of the SWCNT network and the current flow by increasing the applied strain in a fragmented SWCNT paper in PDMS substrate.

FIG. 5C shows an equivalent circuit model that captures the AC behavior of the strain sensor at different strains, devised from the results of the electrical impedance spectroscopy (EIS) shown in FIGS. 5A and 5B. In the circuit, it is assumed that the initial resistance of the SWCNT paper was $R_0$ and that it would be remain constant during stretching. While the crack resistance, $R_i$, was strain variant, such that its resistance increased dramatically with strain due to the sliding of CNTs in the crack. These were considered open circuits because the current did not flow through capacitance in the circuit at low strain levels. When the crack resistance approached infinity, the current flowed through the capacitance due to the electron tunneling effect, as it allows greater charge movement, ultimately, reducing the overall capacitance of the thin paper.

Figure 6:
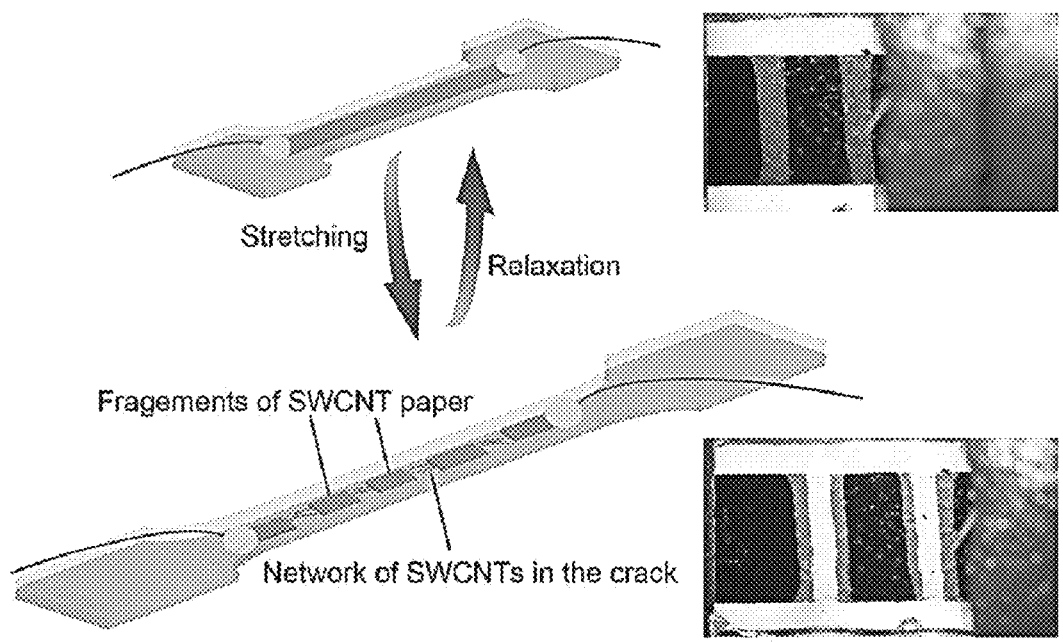
FIG. 6 is a schematic illustration and photos of strain sensors stretching and relaxing according to the present disclosure.

In summary, it is demonstrating herein that fragmented SWCNT paper in PDMS can function as an ultrasensitive and stretchable strain sensor. An overview is illustrated in FIG. 6. Experiments and related results herein suggest a pathway towards the formation of fragmented SWCNT paper sensors with record high GF of $10^7$ at a strain of 50%. The SWCNT network in the crack can play a key role toward enlarging the range of resistance change to $10^6$. The performance of such strain sensors could be tuned by changing the thickness of the SWCNT papers and the crack density. High sensitivity with medium stretchability can be coupled using thick SWCNT papers or medium sensitivity with large stretchability using thin SWCNT papers in PDMS substrates. The tunability of these sensors can rely on the use of two very different strategies based on either intralaminar or interlaminar deformation each of which show different changes in conductivity when stretched. The use of fragmented carbon nanotube paper to achieve both high sensitivity and stretchability is a concept that could be readily extended to other conductive nanomaterials, paving the way for a new family of high-performance strain sensors.

EXPERIMENTAL SECTION

Materials.

SWCNTs with 2.7 wt % COOH groups were purchased from CheapTubes, Inc. at over 90 wt % purity and containing more than 5 wt % multiwalled CNTs (MWCNT). SWCNT length ranged from 5 to 30 mm and their outer diameter ranged from 1 to 2 nm. The true density of these SWCNTs was 2.1 g/cm$^3$. Methanesulfonic acid ($CH_3SO_3H$) and SYLGARD 184 PDMS were purchased from Sigma Aldrich.

Preparation of SWCNT Ink and Paper.

An environmental friendly mild organic acid, $CH_3SO_3H$, was used to disperse SWCNTs to increase the safety of handling the material (compare with superacid like chlorosulfonic acid). Note that if the CNT concentration was too high, alignment of the CNT could be observed and the result was a semicrystalline suspension. Even if the acid used here is different, a low concentration can be preferable. 0.5 wt. % SWCNT dope was prepared by adding 0.2 g of SWCNTs into 40 g of $CH_3SO_3H$, sealed in a glass bottle, stirred for 5 min and bath sonicated using a Brason 8510 sonicator (250 W) (Thomas Scientific) for 60 min. The mixture was then stirred for 12 h at 500 rpm. Different weights of 0.5% SWCNT/$CH_3SO_3H$ dispersion were vacuum filtrated through a ceramic filtration membrane (pore size: 20 nm, Whatman). Any remaining $CH_3SO_3H$ was removed from the sample by washing it with 200 mL of water. The thickness of 0.16, 0.31, 0.62, 0.94, 1.25 and 1.56 g cm$^{-2}$ SWCNT paper were 15, 30, 45, 55, 70 and 90 µm, respectively. The freestanding SWCNT paper was peeled away from the filter and cut into 30×3 mm$^2$ strips for producing the strain sensors. Detailed sample information is listed in FIG. 8.

Preparation of SWCNT Paper-Based Strain Sensor.

The strips of SWCNT paper was transferred onto 0.5-mm-thick PDMS substrates; copper wires were connected to the SWCNT paper strips by silver epoxy. Next, a second layer of PDMS of equal weight was poured onto the sample and cured at 70° C. to fully encapsulate the SWCNT paper. The samples were cut with a standard dog-bone-shaped specimen die (ISO 527-2, FIGS. 9A-9D). Finally the specimen was stretched to initiate fragmentation of the SWCNT paper under a 50% strain and then relaxed to 0% strain using a 5944 Instron universal testing machine (FIG. 14).

Characterizations.

Figure 15:
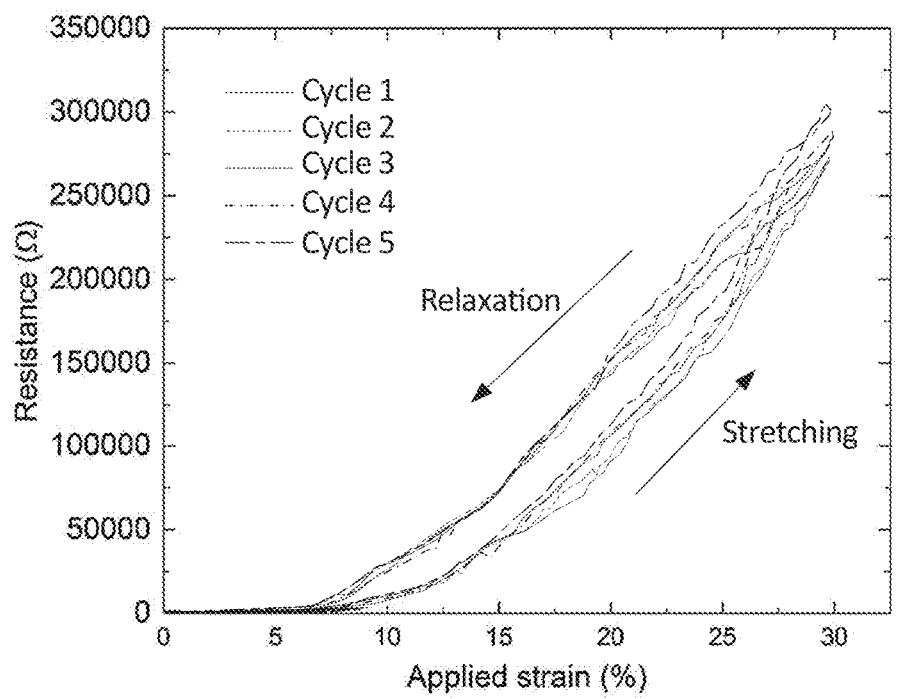
FIG. 15 depicts the dynamic response of an embodiment of a strain sensor at 30% strain.

Scanning electron microscopy (SEM) on SWCNT paper was performed using a Quanta 3D (FEI Company). The mechanical behavior of the SWCNT paper was measured by a 5944 Instron universal testing machine at a strain rate of 0.4 mm min$^{-1}$ by a 5-N load cell. Strips of 20×3 mm$^2$ SWCNT paper were prepared and fixed on a paper card. The tensile strength, Young's modulus and elongation were calculated, and the values were collected from at least 10 tests for each formulation. The setup for electromechanical testing of the specimen is illustrated in FIG. 14. The reversible motion (stretching/relaxing) of the sample was controlled by a 5944 Instron machine. Dynamic response of the strain sensor at 30% strain with stretching and relaxing is shown in FIG. 15. The dog-bone-shaped specimen was glued to two metal plates, clamped by the Instron machine. A 4-mm gap between the metal plates was equivalent to the length of the sample. The change in electrical resistance of the specimen was monitored using a U1252B digital multimeter. Fragmentation of the SWCNT paper creates cracks/voids in the PDMS, leading to little elongation upon breakage at about 60% for thicker samples. To prevent exceeding this limit, the maximum strain applied to any sample was fixed to 50%. Generally, fragmentation was generated on each sample by loading it to 50% strain at a speed of 0.4 mm min$^{-1}$. Thereafter, a cyclic stretching/relaxing program was applied with a maximum strain of 5% and 30% at each cycle. The resistance data was captured every 1 s during the test. The stretching/relaxing process of the SWCNT paper in PDMS was monitored by a video camera. For EIS, the modulus of impedance, Z, and phase angle, θ, were acquired simultaneously with an Agilent E4980A Precision LCR meter in a two-probe configuration using Kelvin clips. The frequency range spanned from 20 Hz to 2 MHz with a step of 1000 Hz and a sweep current of 50 mA. To understand the electron transport mechanism in the cracked samples, we systematically investigated the change of impedance with frequency at different applied strains (0, 10, 20, 30, 40 and 50%).

Additional Information for Example 1

Strong van der Waal attractions that hinder the dissolution of individual single-walled carbon nanotubes (SWNCTs) can be overcome by the direct protonation of the tubes in superacids. More specifically, SWCNTs can be dispersed in a superacid, like chlorosulfonic acid, by stirbar mixing. Raman spectroscopy showed that SWCNTs can maintain their integrity after being dissolved in acid and that no oxidation occurs. Superacids can dissolve SWCNTs by reversibly protonating the surface of the SWCNT with a delocalized positive charge; this charge induces a repulsive force between nanotubes and promotes dispersion by counteracting van der Waals attractions. By replacing OH groups with $CH_3$ groups, methanesulfonic acid ($CH_3SO_3H$) may be considered an intermediate compound between sulfuric acid ($H_2SO_4$) and methylsulfonyl methane (($CH_3)_2SO_2$). Thus, $CH_3SO_3H$ is a not a superacid, with an acidity (PKa=−1.9) lower than that of chlorosulfonic acid (PKa=−6.0) or sulfuric acid (PKa=−3.0).

Figure 7:
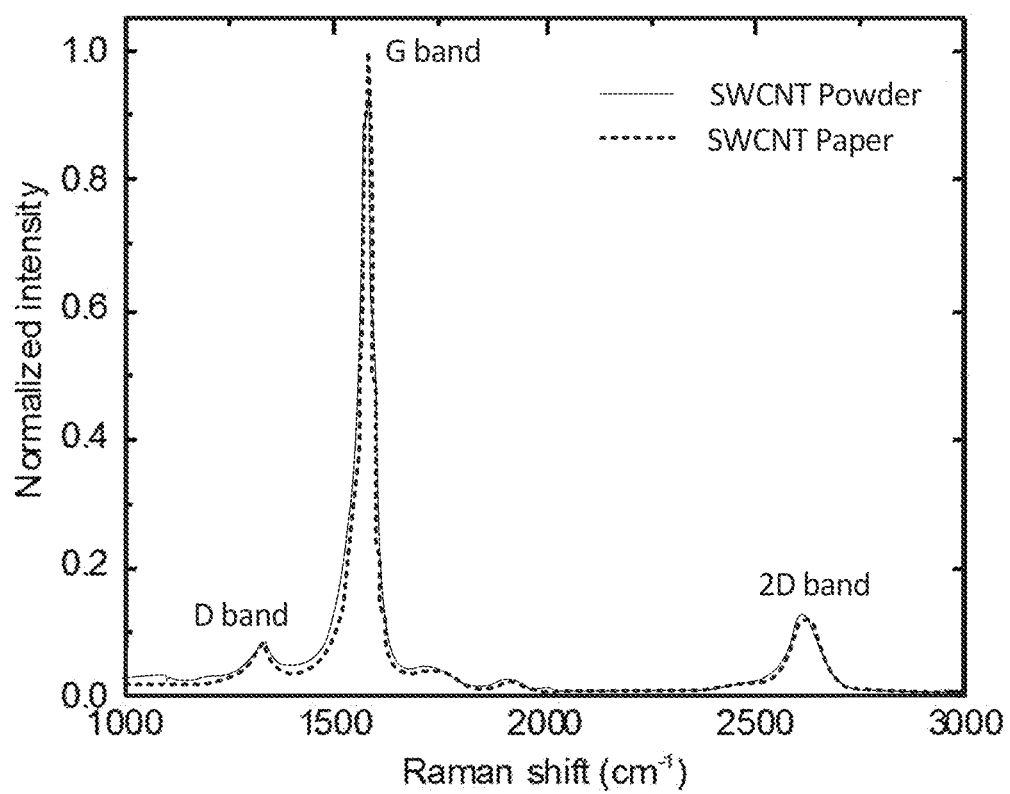
FIG. 7 is a Raman spectra of SWCNT power and paper.

0.5 wt % SWCNTs were well dispersed by direct protonation in $CH_3SO_3H$. From the Raman spectra in FIG. 7, the ratio of graphite-like G band at 1580 cm$^{-1}$ to that of disorder-induced D band at 1350 cm 1 ($I_G/I_D$) for SWCNT paper is 11.9, indistinguishable from that of SWCNT powder (12.1). This indicates that dispersing SWCNTs using $CH_3SO_3H$ does not endanger structural integrity. These high values are also indicative of the high crystal quality of the SWCNTS and the small amount of amorphous carbon.

To achieve the desired low-strength, low-stiffness SWCNT papers, a random network structure of a low concentration of SWCNT inks (0.5 wt %) can be preferred because the tube-to-tube interactions can be insufficient to induce alignment. Moreover, a mild acid, $CH_3SO_3H$, was used to disperse SWCNTs. A porous structure of the SWCNT papers with randomly distributed SWCNT networks can be observed in the SEM images shown in FIGS. 10A-10F. Some SWCNTs bind together and form larger bundles with an average diameter of 50 nm, which can play an important role toward increasing the overall electrical conductivity of the SWCNT paper.

Figure 12A:
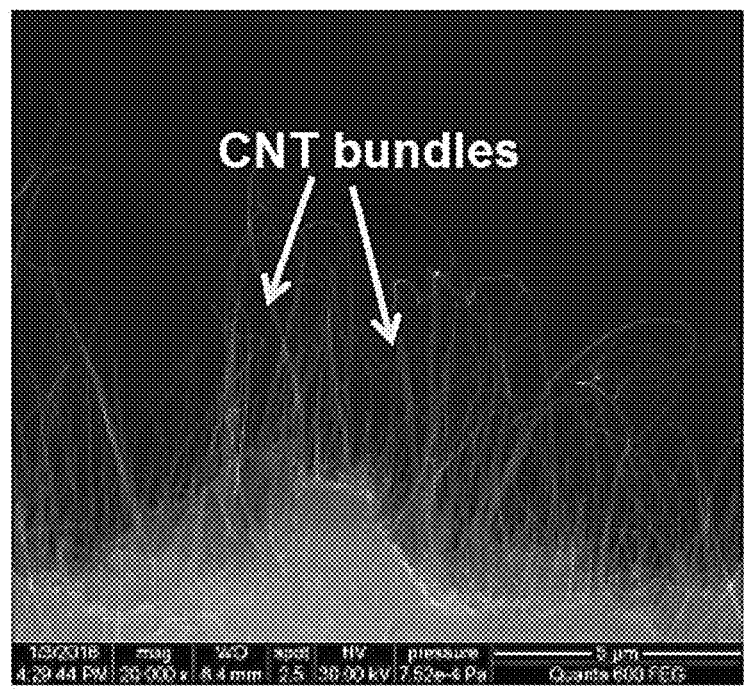
FIGS. 12A-12B are SEM images of SWCNT paper after mechanical failure. CNT bundles are denoted with arrows.
Figure 12B:
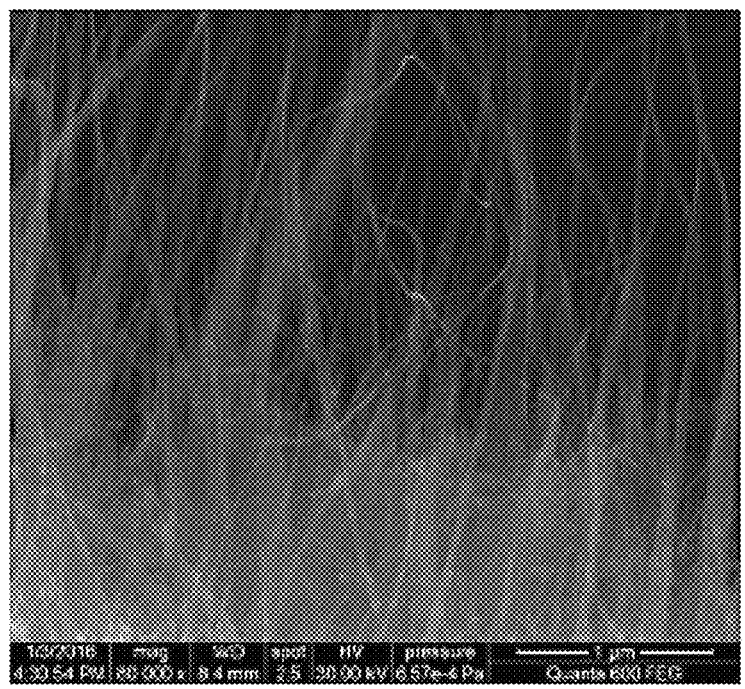

FIG. 11 shows a summary of mechanical properties of freestanding carbon nanotube papers and films from the literature. Compared with these data, SWCNT papers as described herein have lower tensile stress (1.5 to 7 MPa) and lower Young's modulus (0.4 to 1.4 Gpa), which can be attributed to the random nature of the network of SWCNT paper. These results are comparable to those of nonaligned SWCNT papers, which can be expected to have isotropic properties. The deformation and failure mechanism of carbon nanotube assemblies can be different from conventional brittle materials, like metal, where the structure breaks into parts when the stress reaches intrinsic strength. The van der Waals interactions and entanglements of CNTs define the deformation and microstructural evolution. The failure section of SWCNT papers can show isolated SWCNT bundles and single tubes projecting out from the tear edge; bundles can be up to tens of micrometers in length (FIGS. 12A and 12B). This observation suggests that a mechanical failure could have occurred via tube slippage rather than via fracture of individual SWCNTs.

Example 2

Described in this example or embodiment are ultrasensitive and deformable mechanosensors using resistance recoverable carbon nanotube wires. Human joints, such as finger joints, have a remarkable capability to recover mechanical functions after dislocation with proper treatment. This characteristic can provide ideas for the present "bone-skin" inspired mechanosensor which can be capable of detecting multiple mechanical deformations even after recovering from electrical disconnection. The sensor can be realized by embedding low strength, wet-spun single-walled carbon nanotube wire in polydimethylsiloxane. When different mechanical stimuli are applied to the sensor, the resistance of the wire can increase dramatically (from 360Ω to practically infinity) in a reversible, recoverable manner even after the electrical failure/disconnection at large deformations. This characteristic can lead to a high sensitivity of the sensor which can be used for sensing a variety of deformation modes (a gauge factor of 1 as at 15% uniaxial strain, a pressure sensitivity of 10$^5$ as MPa at 0.9 MPa pressure and a torsion sensitivity of 860 at twisting angle of 60 degrees), which are among the highest values compare with recently reported mechanosensors. The present work opens possibilities for wide range of applications in wearable and deformable mechanical sensors.

Introduction

Wearable mechanical sensors are essential devices to capture and monitor various human activities, have continued to grab great attention due to the considerable development of stretchable electronics. Conventional mechanical gauges based on metallic foils or semiconductors can be used only in the range of small deformations (<5%). Moreover, they will be easily damaged when removed from measured targets and thus, they cannot be re-used. Additionally, commercial mechanical sensors are usually designed to sense only one deformation mode. Uniaxial strain, pressure or torsion are among the most common. A complicated and sophisticated sensor design is required to capture two or more deformation modes while maintaining high sensitivity and ensuring the integrity of the sensor when it experiences large transformations.

Nanomaterials such as metal nanoparticles and nanowires, carbon nanotubes (CNT) and graphene based materials have excellent flexibility when deposited into thin films and superior electrical properties. They bring new opportunities to design smart mechanical sensors for human activity monitoring. Pang and coworkers developed a mechanical sensor based on interlocking of conductive nanofibers. It can measure three different loading modes (pressure, shear and torsion) with high sensitivity. However, its working range is limited to 5% strain. To increase the operational strain, another technique is to fabricate graphene-based composite fiber with "compression ring" architecture. The sensor possesses excellent stretching, bending and twisting-sensitive properties due to the microstructure variation under different mechanical stimuli. However, the design of the system is very complex and gauge factor (GF) of the sensor to some mechanical stimuli is low (GF=1.5 at 200% strain). A skin-like pressure and strain sensors based on CNT films on PDMS was developed by Lipomi and coworkers, in which the pressure sensitivity (PS=0.22 MPa at 0.9 MPa) and gauge factor (GF=3.4 at 150%) are extremely low due to the high initial resistance (100 kΩ). Moreover, the resistance recoverability at larger mechanical deformation (after electrical disconnection) is not realized in the above-mentioned studies. Combining resistance recoverability and high sensitivity at multiple mechanical deformation remains a challenge.

Here, a bone-skin inspired mechanical sensor was developed by using low strength, wet-spun SWCNT wire embedded in PDMS. The network of randomly distributed SWCNTs in the wire enables achievement of high sensitivity to stretching, pressing and torsion. Moreover the sensor has a unique resistance recoverability compare with conventional mechanosensors after electrical disconnection due to large deformations. The sensor response was highly repeatable and reproducible up to 5,000 cycles with excellent recoverability. These important characteristics make them a good candidate as "smart" mechanosensors to detect different human motions.

Results and Discussion

SWCNT microwire-based strain sensors. The length of the individual SWCNTs and the mechanical properties of the PDMS could be tuned to engineering the crack density, resistance change behavior, gauge factor of the sensor. In an embodiment, the length of the individual SWCNT is from 5 µm to 30 µm. Moreover, the properties of the PDMS, could be tuned by varying the base to curing agent ratio (could be 20:1, 10:1, 5:1, 2.5:1). In an embodiment, the base to curing agent ratio is 2.5:1.

Figure 9A:
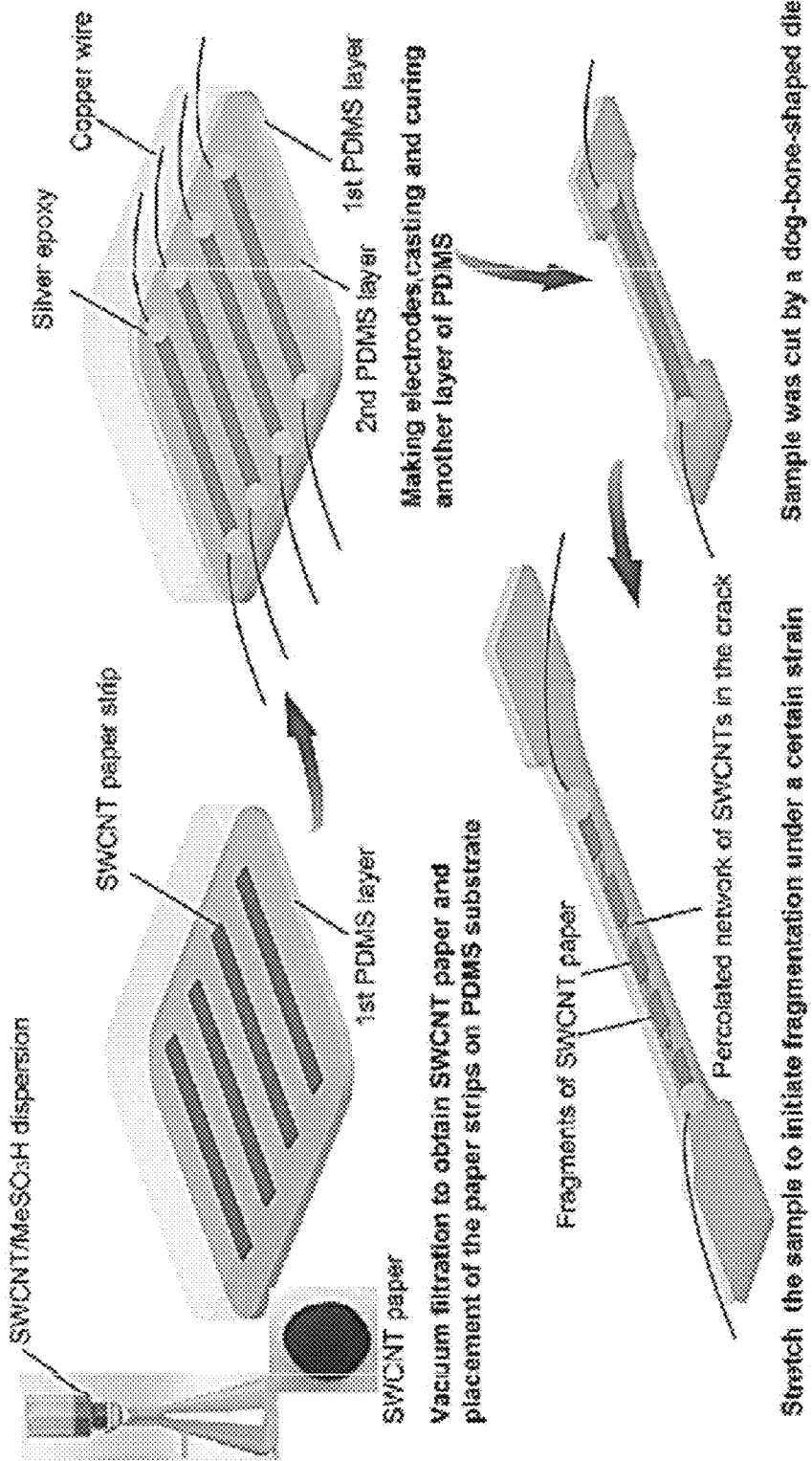
FIG. 9A shows an example of steps of PDMS-encapsulated SWCNT paper sensor fabrication.
Figure 9B:
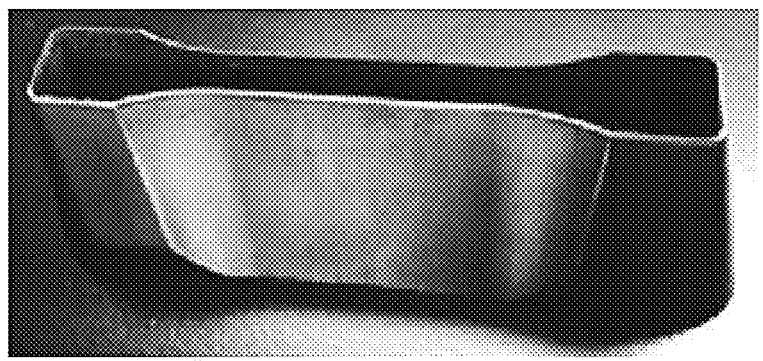
FIG. 9B shows an example of a dog-bone die according to the present disclosure.
Figure 9C:
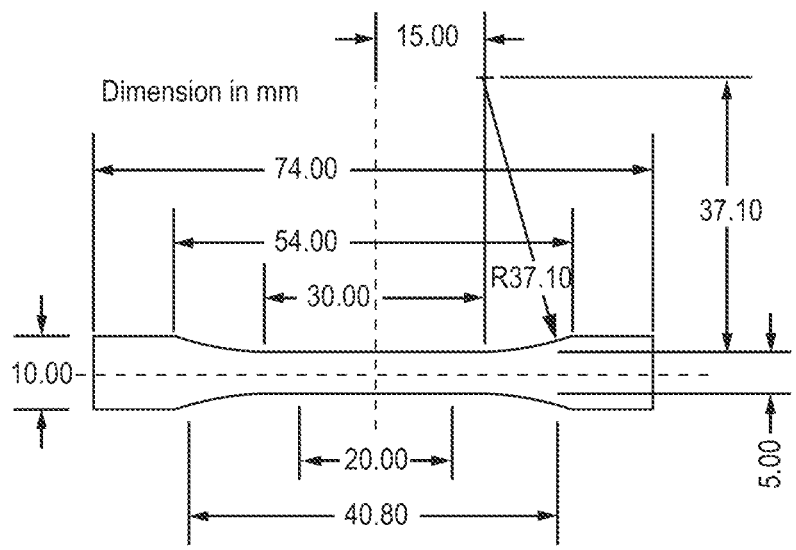
FIG. 9C depicts dimensions of an embodiment of a dog-bone shape according to the present disclosure.
Figure 9D:
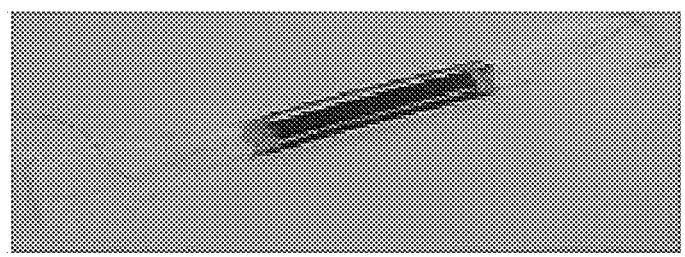
FIG. 9D is a picture of an example of SWCNT paper sensor of dimensions 3 mm×3 mm.
Figures 10A, 10B, 10C:
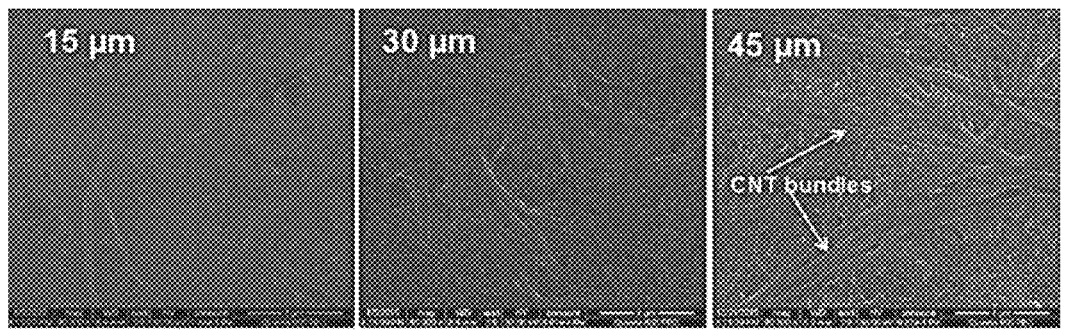
FIGS. 10A-10F are scanning electron microscope (SEM) images showing randomly oriented SWCNT networks in SWCNT papers of different thicknesses: 15 μm (A), 30 μm (B), 45 μm (C), 55 μm (D), 70 μm (E), and 90 μm (F).
Figures 10D, 10E, 10F:
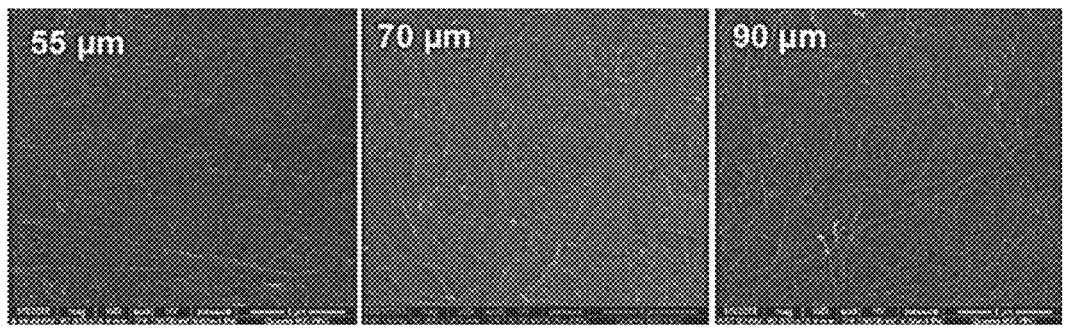
Figure 19A:
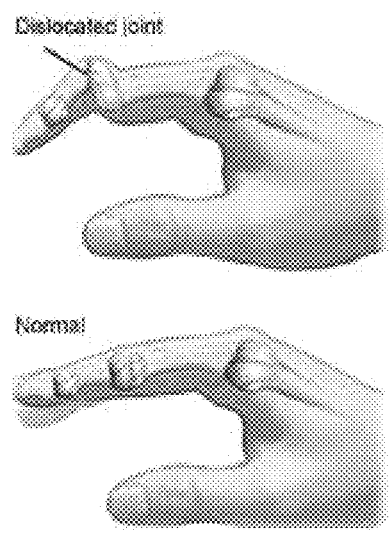
FIG. 19A is an illustration showing a dislocated joint recovering after treatment
Figure 19B:
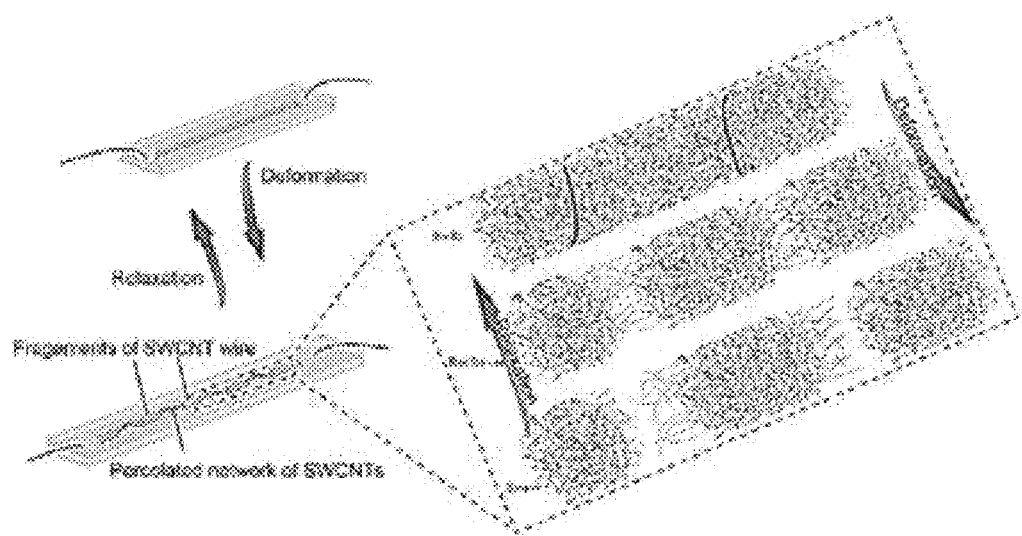
FIG. 19B is an illustration of the structure of an embodiment of a mechanical sensor fabricated from SWCNT wire embedded in PDMS. The illustration demonstrates how SWCNT can be fragmented in elastic substrates. The inset image in the dashed box shows an example of the mechanical sensing mechanism: disconnection and connection of SWCNT networks in the cracks.
Figure 19C:
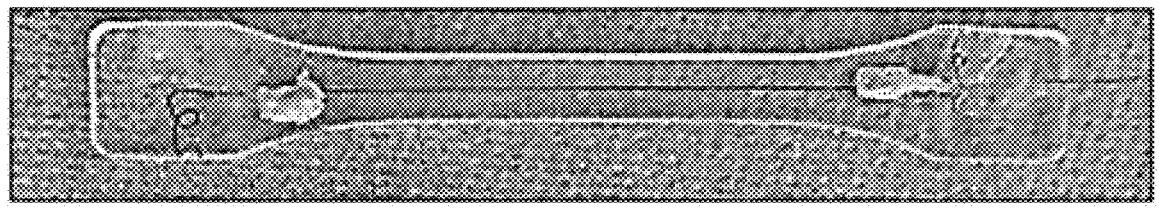
FIG. 19C shows an embodiment of SWCNT wire embedded in PDMS substrate.
Figure 19D:
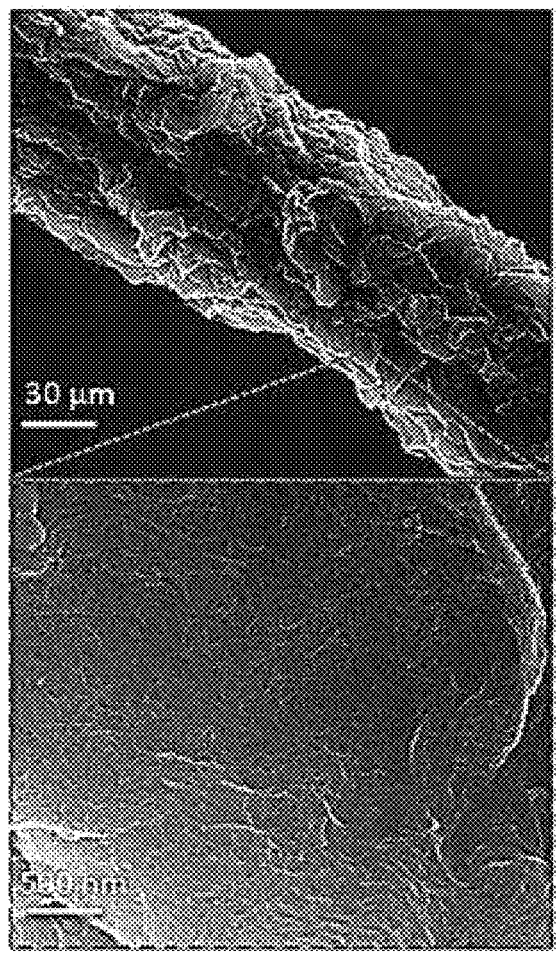
FIG. 19D is an SEM imaging showing random-oriented networks in an embodiment of the SWCNT wire.

FIG. 19A shows a "bone-skin" structure inspired approach for realizing a resistance recoverable mechanical sensor. Finger joints, have remarkable capability to recover their mechanical functions after dislocation with proper treatment (FIG. 19A). This characteristic inspired the development of a mechanical sensor using low-strength SWCNT wire act as the "bone" while elastic PDMS substrate as the "skin". A fragile SWCNT wire is required so that it can be easily fragmented during stretching while disconnection and connection of SWCNT networks in the crack is responsible for the sensing and recovery mechanism of the wire (Inset in FIG. 19B). FIG. 9A shows the detailed schematic illustration of processes in fabricating a SWCNT wire based strain sensor (See the Experimental Section and Supporting Information for details). 2 wt % SWCNT/$CH_3SO_3H$ dispersion was extruded from a movable nozzle into a coagulation water bath. The $CH_3SO_3H$ was extracted by water from the dispersion. By controlling the motor that moves the injection nozzle along the predetermined track, arrays of SWCNT wires on the PDMS substrate could be obtained as shown in FIG. 9A. After removing the water and drying the sample overnight, copper wires were connected to the SWCNT wires by silver epoxy. Then a second layer of PDMS precursor was poured on to the sample and cured at 70° C. to encapsulate the SWCNT wires. The samples were cut with a die to obtain a standard dog-bone-shaped specimen (FIG. 19C). The mild acid, $CH_3SO_3H$, was able to disperse SWCNT and a porous structure of the SWCNT wire with randomly distributed SWCNT networks can be observed in a typical SEM image (FIG. 19D). This random-oriented structure results in a low-strength SWCNT assemblies (FIGS. 26A-26D) will facilitate the breakage of the wire in PDMS.

Figure 19E:
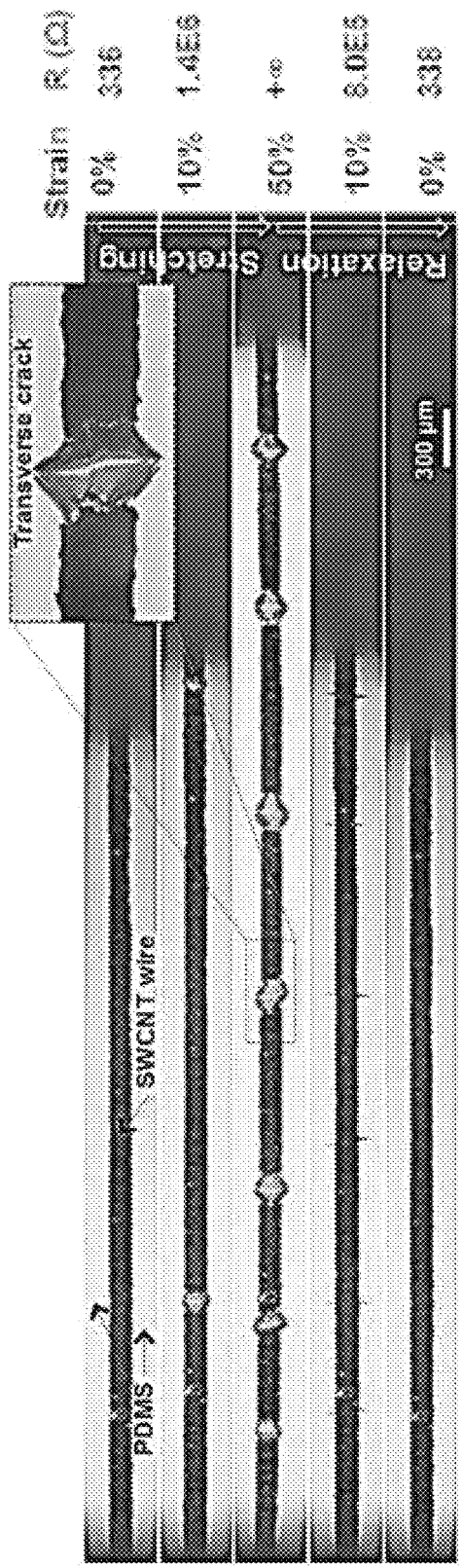
FIG. 19E depicts optical images showing fragmentation and relaxation process of an embodiment of SWCNT wire in PDMS under strain. The enlarged inset demonstrates a transverse crack in the SWCNT wires at 50% strain.

FIG. 19E shows that the specimen in FIG. 19C is pulled up to 50% strain while the deformation of the SWCNT wires is being observed using a video camera. We observed that the wire is initially well bonded to the surrounding PDMS and as the strain increases, the wire break in sequence into fragments. The multiplication of cracks is called fragmentation and results in quasi-random networks of transverse cracks. The resistance of the sample increases up to a non-measurable value with an instrument (that non-measurable value is also referred to herein as "practically infinity") but can recover to the initial value after relaxation (FIG. 19E and FIGS. 25A-25D). FIG. 19E shows the transverse crack initiation and progression while being loaded. It is clear that the recoverability is obtained due to the closing of transverse cracks.

Figure 20A:
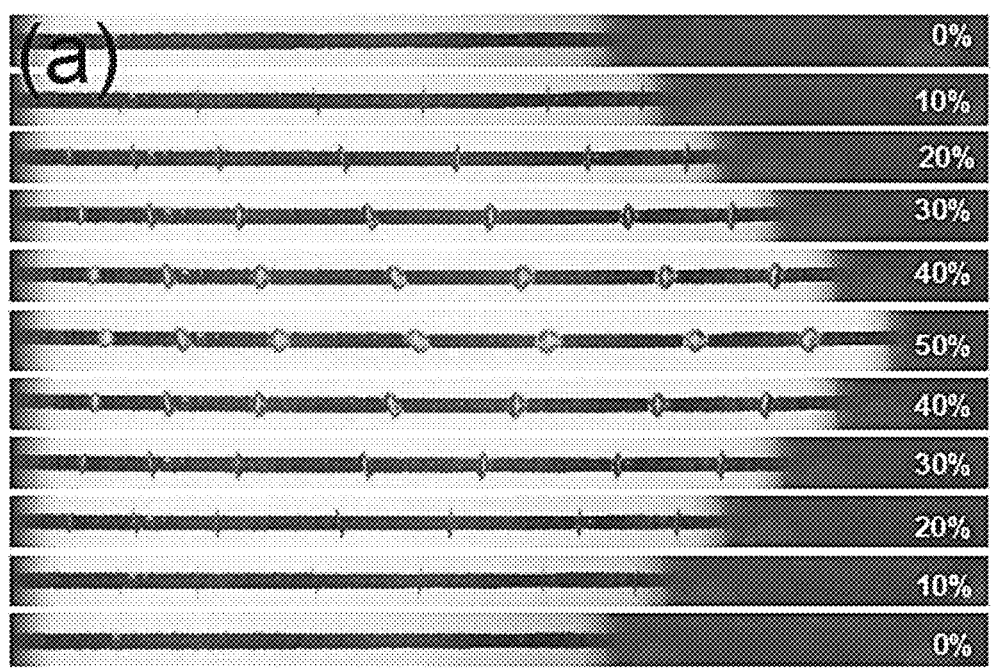
FIG. 20A shows optical images of stretching and relaxation process of an embodiment of fragmented SWCNT wire in PDMS.
Figure 20B:
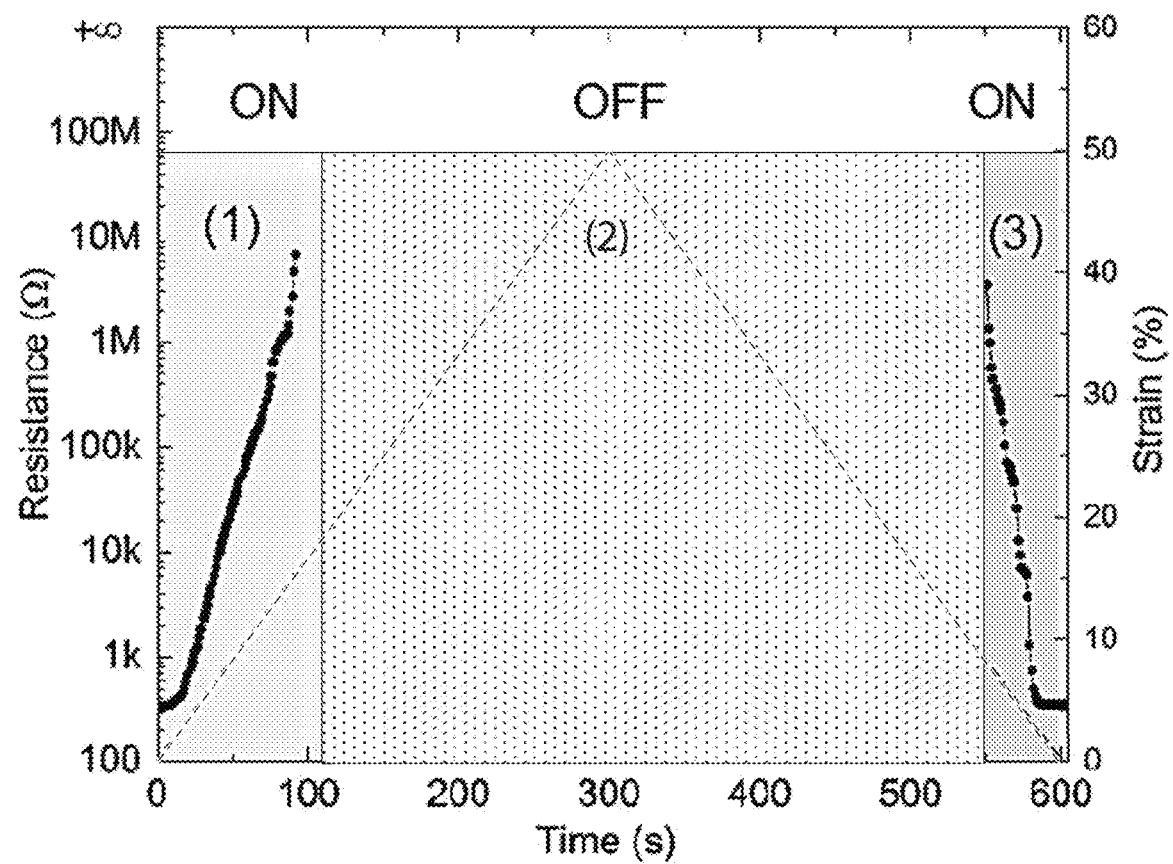
FIG. 20B depicts electrical resistance evolution with strain showing three regimes of the strain sensor: (1) strain sensing regime (blue); (2) Open circuit regime (green); (3) resistance recovery region (orange).

The response observed during the first fragmentation process and the subsequent loading/unloading cycles differed significantly. FIGS. 20A-20I present the strain-sensing behavior of the fragmented SWCNT wires in PDMS. Images in FIG. 20A correspond to each strain and show the evolution of microstructural change of the wire. Generally, new cracks were not created as demonstrated in FIG. 20A. In detail, FIG. 20B shows that the resistance change behavior can be divided to three regimes: (1) Strain sensing regime, $0<\varepsilon<\varepsilon_C$, where $\varepsilon_C$ is the critical strain for which R increase to infinity. In this regime R increases from 336Ω to 10 MΩ before resistance increase to infinity. In this regime, the circuit is in an "ON" state, an increase of crack number may not be observed as the wire has been fragmented. Only the average opening distance of the cracks ($L_C$) will increase with strain, and that is the main reason leading to the increase of resistance. Even though large gaps can be seen at a relative high strain ($\varepsilon=15\%$) in this regime, the resistance of the wire is not infinity (R=10 MΩ). This observation indicates that in the crack there are SWCNTs networks connected to the fragments nearby. (2) Open circuit regime, $\varepsilon>\varepsilon_C$, SWCNTs are completely disconnected from each other. An average crack length ($L_C$) of larger than 50 μm is measured, which is larger than the length of SWCNTs (5-30 μm). The $L_C$ of SWCNT wire can be large enough to result in an "OFF" circuit. (3) Resistance recover regime: the resistance of the SWCNT wire can recover to its initial value after relaxation and the circuit recover to an "ON" state. The $L_C$ between the fragments can reduce with decreasing applied strain. In the completely relaxed state, cracks are not visible any more. In this regime, PDMS can play an important role for the resistance recovery.

Figure 20C:
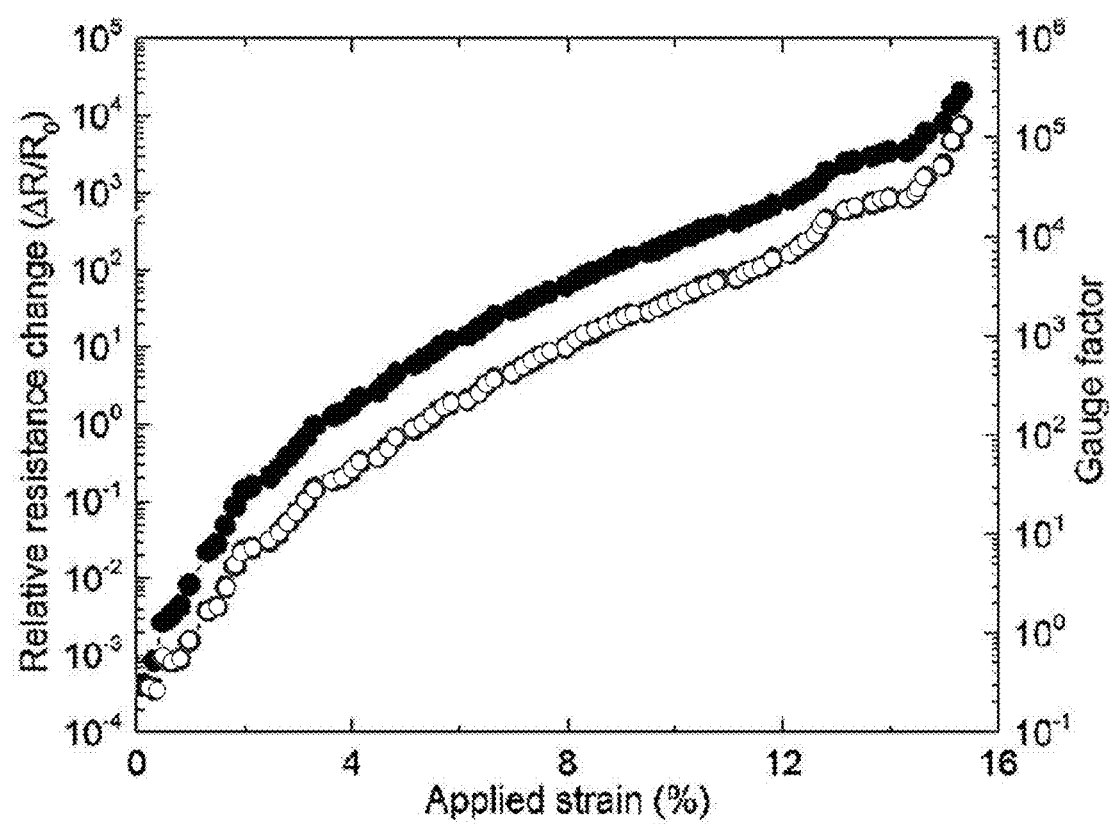
FIG. 20C shows relative resistance change and gauge factor with applied strain.
Figure 20D:
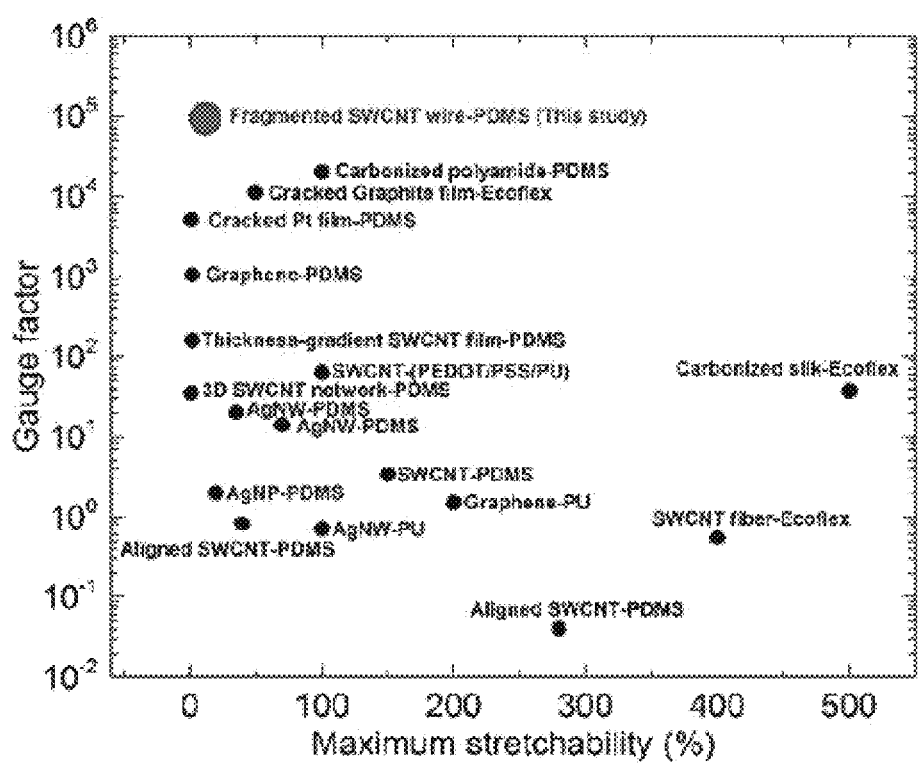
FIG. 20D depicts gauge factor as a function of maximum stretchability of recently reported strain sensors compared with the present disclosure.
Figure 20E:
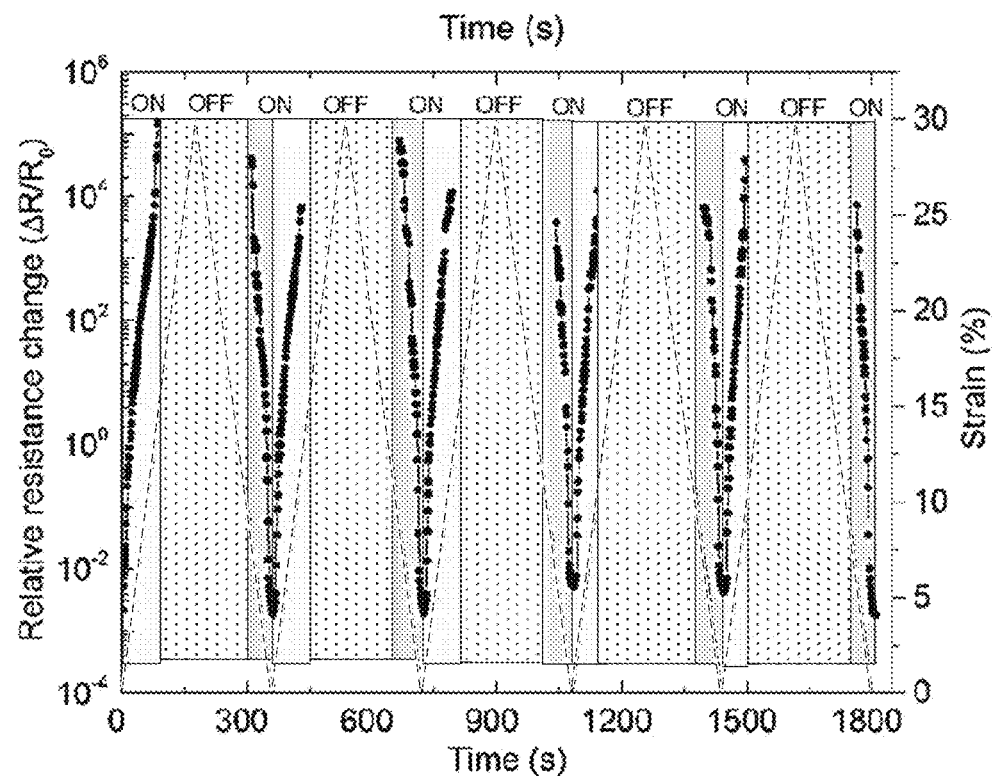
FIG. 20E shows dynamic response of an embodiment of the sensor at loading/unloading cyclic conditions up to 30%.
Figure 20F:
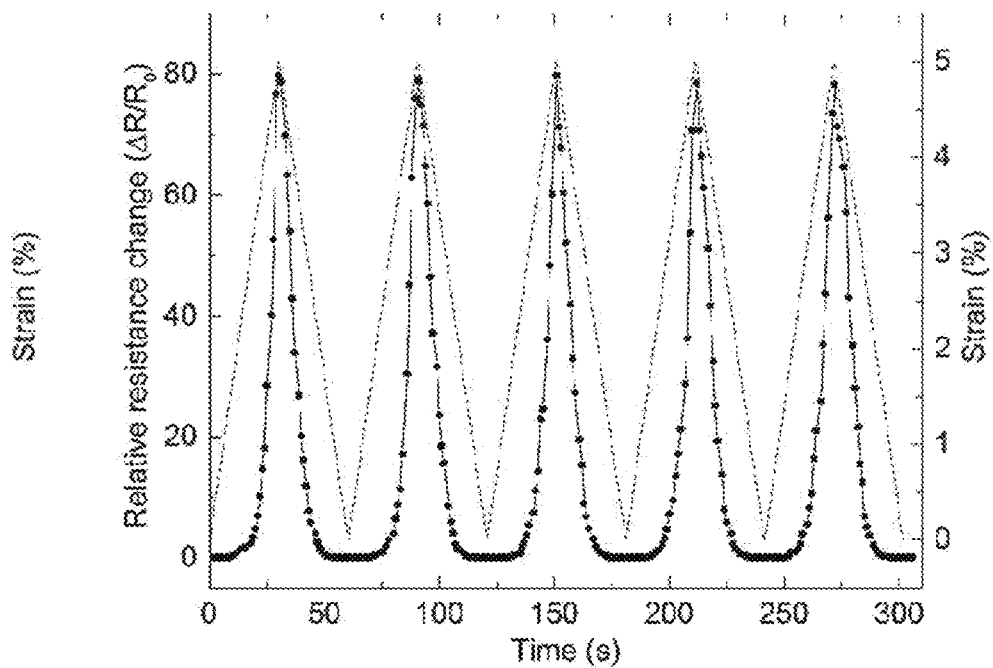
FIG. 20F shows dynamic response of the sensor at loading/unloading cyclic conditions up to 5%.
Figure 20G:
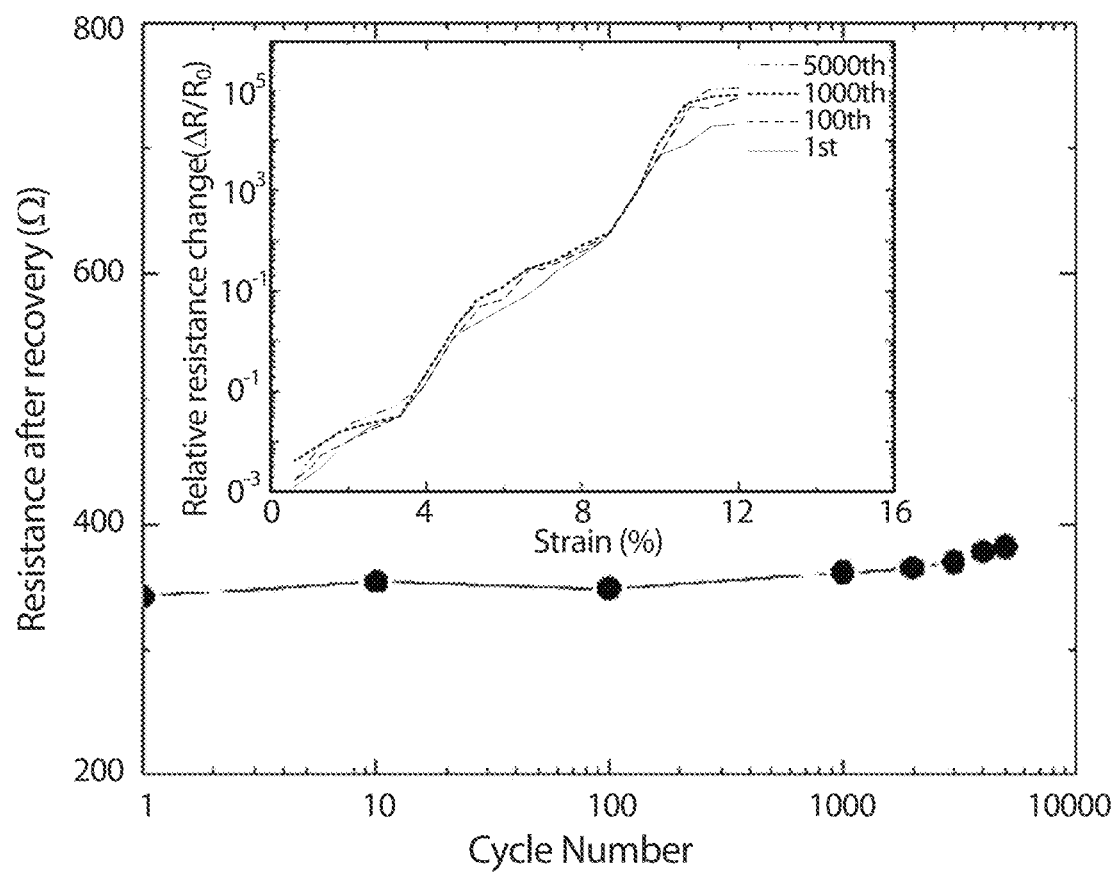
FIG. 20G depicts resistance after recovery versus number of stretch cycles over 5000 cycles of stretching to 12%. Inset image shows the relative resistance change versus strain for multiple-cycle test from 0 to 12% strain: 1st (black), 100th (red), 1,000th (blue) and 5,000th (pink) cycles.
Figure 26A:
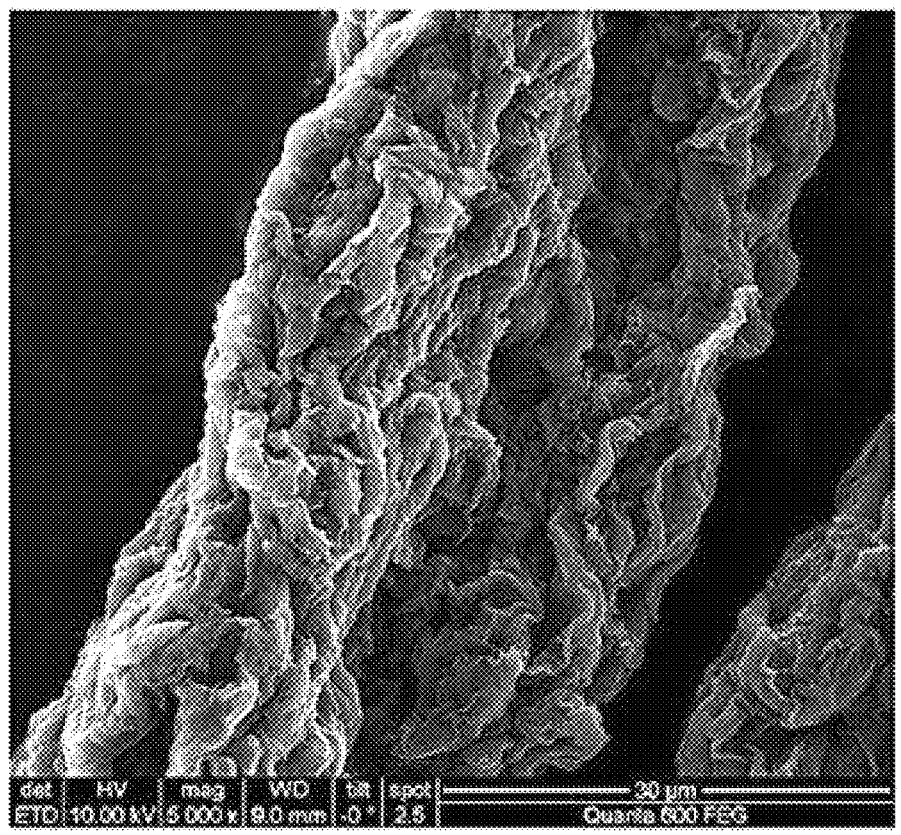
FIGS. 26A and 26B are SEM images of an embodiment of SWCNT fiber at different magnifications (5000× in FIG. 26A and 30000× in FIG. 26B).
Figure 26B:
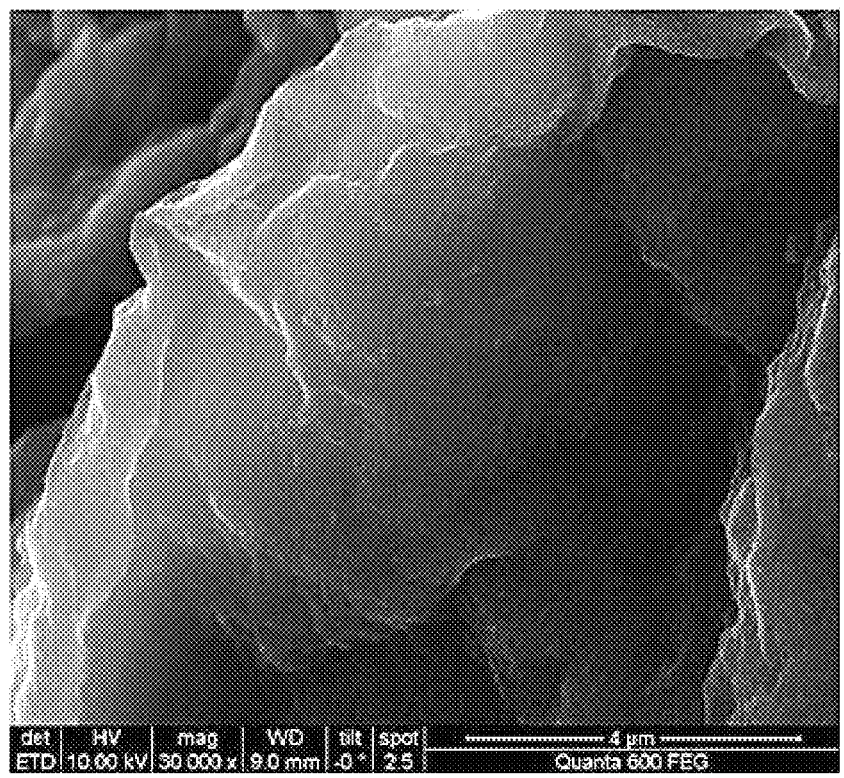
Figure 26C:
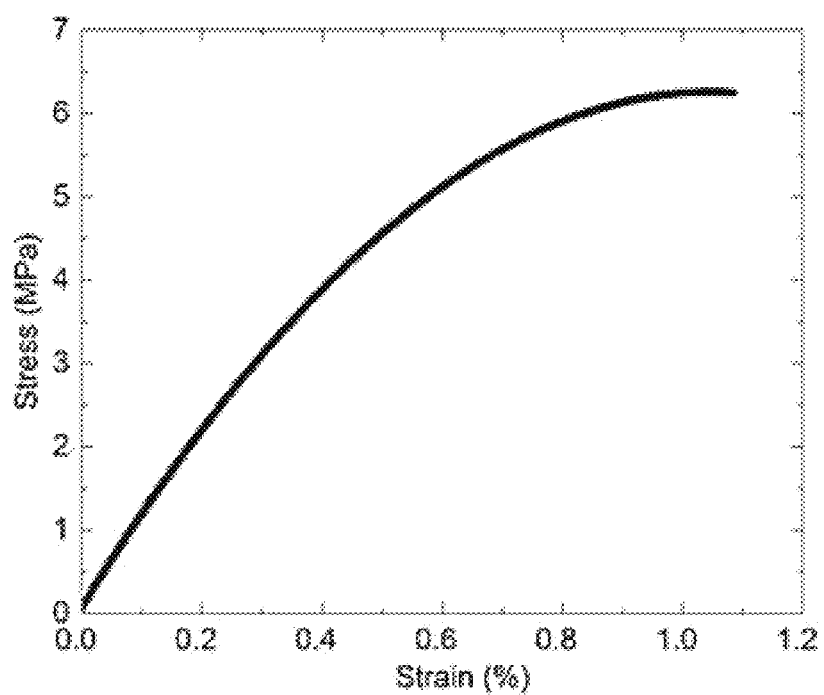
FIG. 26C show a stress/strain curve of an embodiment of SWCNT fiber.
Figure 26D:
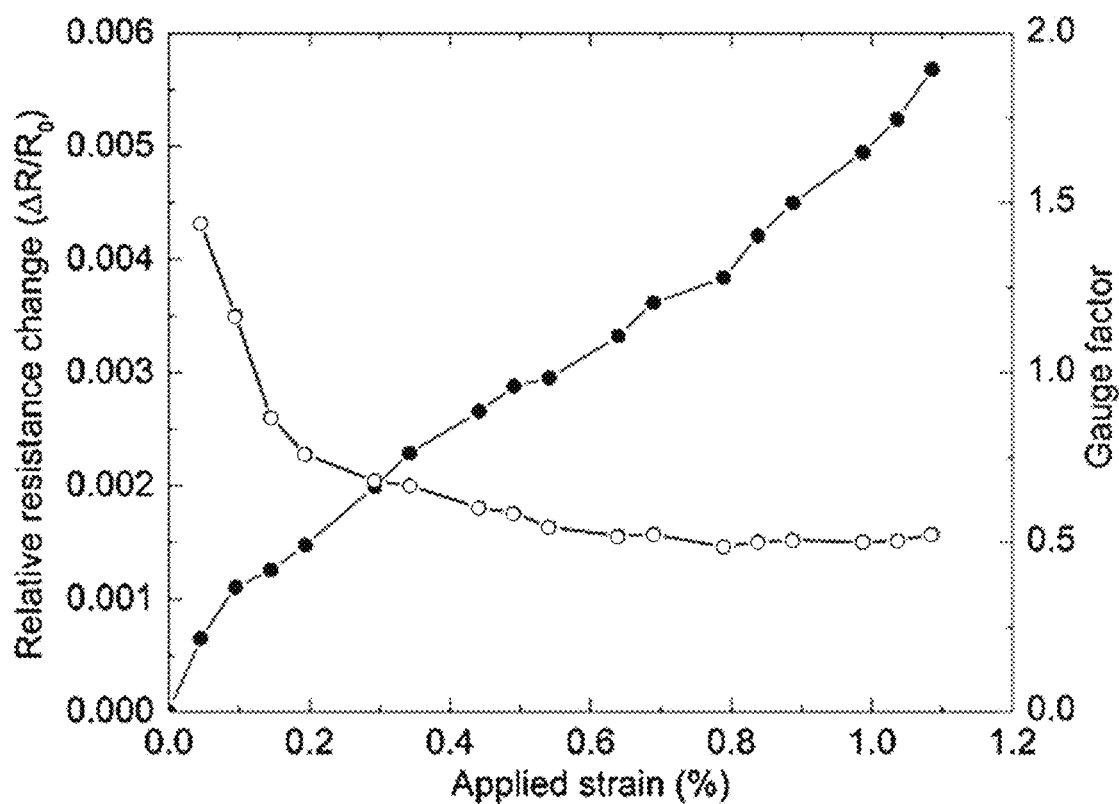
FIG. 26D shows relative resistance change and gauge factor versus applied strain of an embodiment of SWCNT fiber.

$\Delta R/R_0$ and Gauge Factor (GF) can then be plotted with respect to strain on FIG. 20C. The operational strain range and GF can be dramatically improved when compared with that of self-standing SWCNT fibers (FIG. 26D, GF=1 at maximum strain of 1.1%). The dramatic resistance change ($\Delta R/R_0=5\times10^4$) of the 60 μm-SWCNT wire enables obtainment of a GF of $10^5$ at ε=15%. FIG. 20D and FIG. 13 shows that the GF value obtained can be higher compared with recently FIG. 30 shows a summary of sensing properties to multiple to multiple deformation modes based on nanomaterial-enabled stretchable conductors. The reproducibility of the strain sensor can further be tested by a cyclic stretching/relaxation to the specimen. FIG. 20E present five cycles of a strain to 30% and the $\Delta R/R_0$ increased nearly reversibly, even after electrical disconnection. The conversion of "ON-OFF" states occurred almost at the same strain of all cycles. The sensor also features high sensitivity as it can detect subtle changes as small as 0.1% as show in FIG. 20F. Measurement of resistance after recovery from 10% strain over the course of 5,000 cycles of stretching produced the plot in FIG. 20G. The resistance increased 10% during the 5,000 cycles. The sensing performance at the 1st, 100th, 1,000th and 5,000th cycle can remain nearly unchanged, showing excellent durability and repeatability of the strain sensor (Inset in FIG. 20G).

Figure 20H:
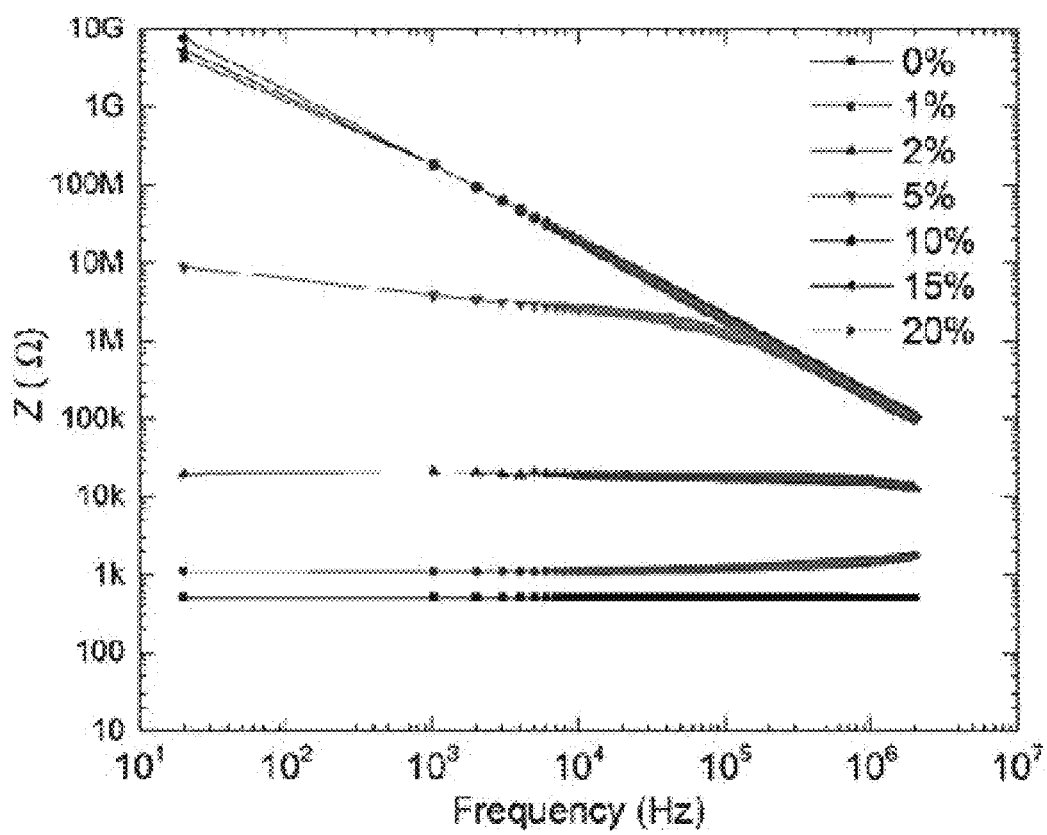
FIG. 20H shows electrical impedance spectroscopy of an embodiment of SWCNT wire based strain sensor at different applied strains: frequency dependency of the modulus of the complex impedance AZ).
Figure 20I:
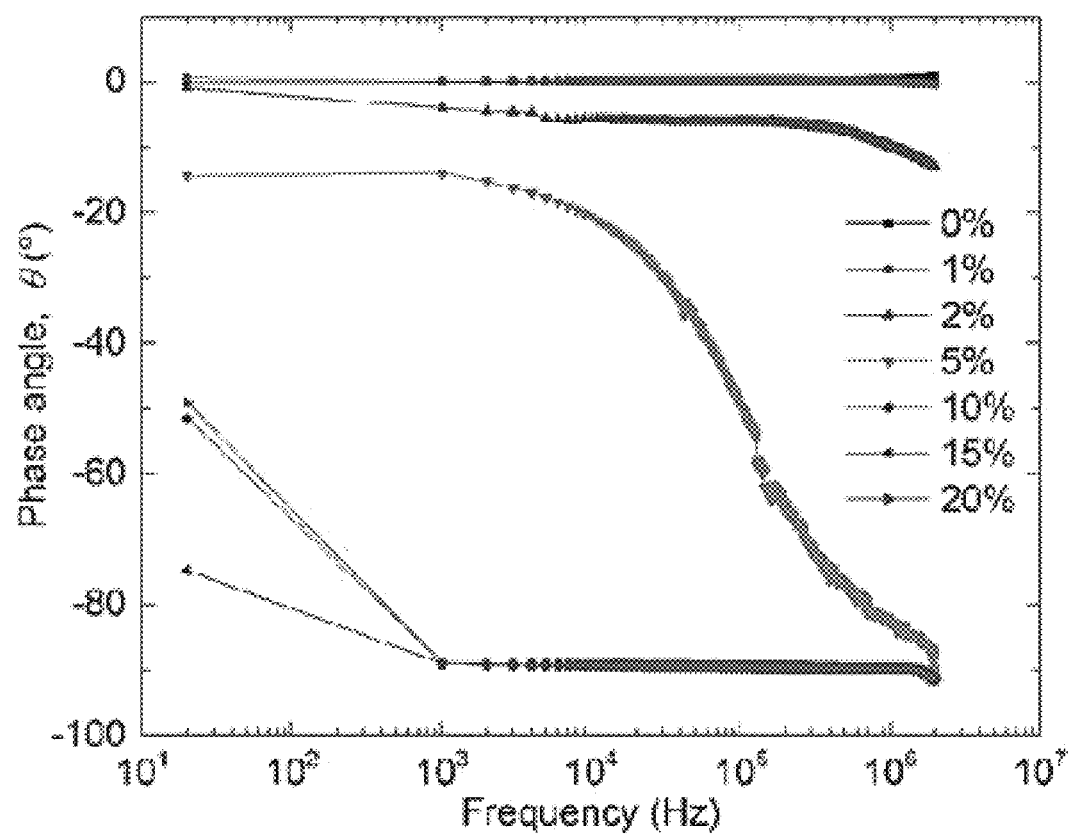
FIG. 20I shows electrical impedance spectroscopy of an embodiment of SWCNT wire based strain sensor at different applied strains: frequency dependency of the modulus of the phase angle (θ).

The strain sensing mechanism can simply be explained through electrical impedance spectroscopy (EIS). EIS can be essential for a clear understanding of the equivalent circuit in terms of the components of the complex impedance, and can give insight into the electron transport mechanism occurring across the bulk and interfaces. FIGS. 20H and 20I show the frequency dependency of the modulus of the complex impedance (Z) and phase angle (θ), respectively. The frequency dependence of Z is nearly constant for a full range at low applied strain (<2%). These observations suggest that for the sample at low strain, the conduction mechanism is dominated by the resistive behavior of the SWCNT wire. However, the sensor shows frequency dependent electrical response at higher strains. With low applied strain, the electron transport through the nanotube networks can be the primary connection-disconnection mechanism (electron transport mechanism). Inter-network electron tunneling of the SWCNT interface between PDMS and SWCNT wire can become dominant at higher strains, when a total disconnection between the nearby fragments occurred. This becomes more clear when looking at the difference in phase angle, θ, at different strains (FIG. 20I). It can be observed that, at larger strain (>5%), the capacitive part can largely increase with frequency. This comes from the unconnected SWCNT networks that acts as a capacitor instead of a resistor.

Figure 21A:
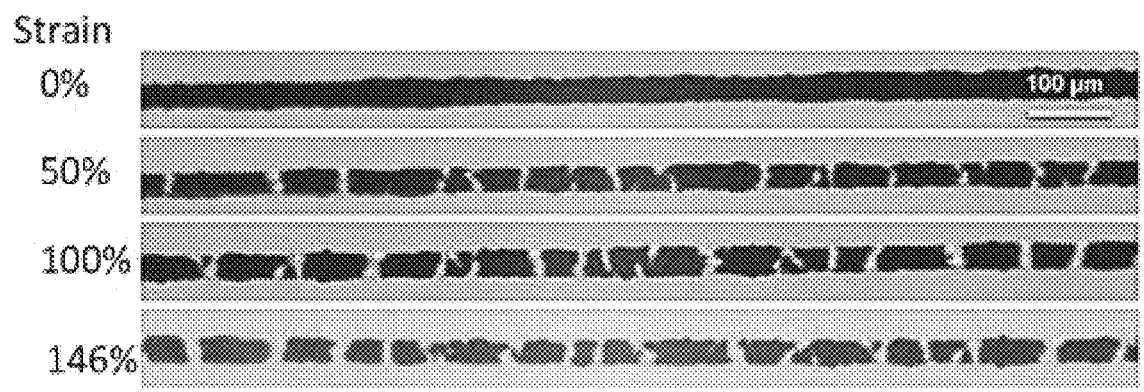
FIG. 21A shows optical images showing how an embodiment of SWCNT wire can get fragmented by stretching in the PDMS.
Figure 21B:
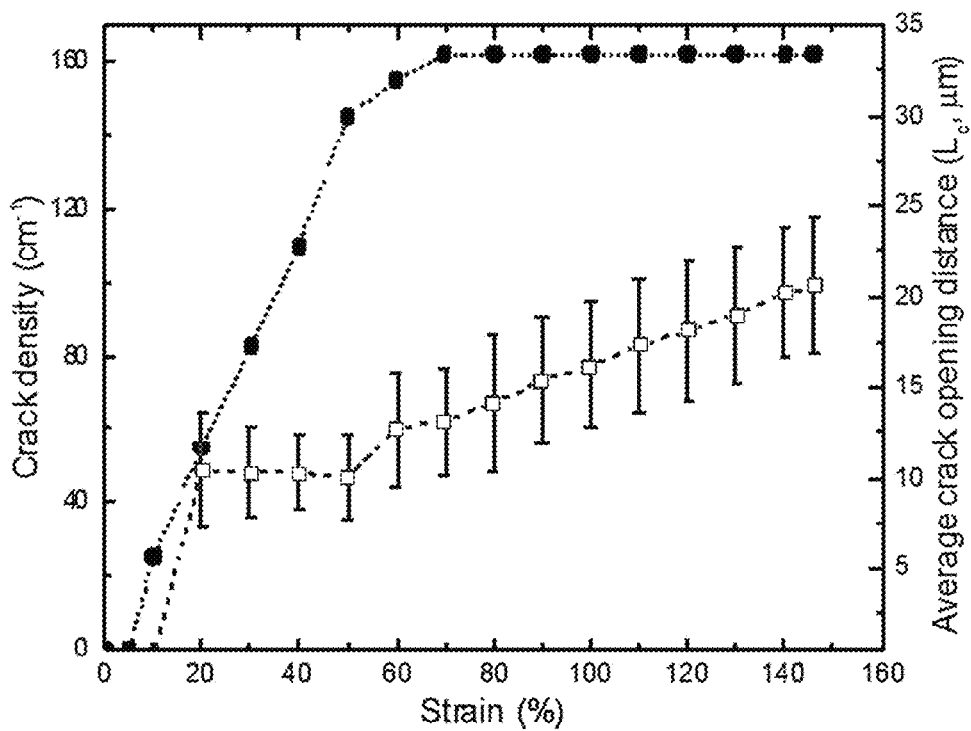
FIG. 21B demonstrates crack density and average crack opening distance of an embodiment with applied strain.
Figure 21C:
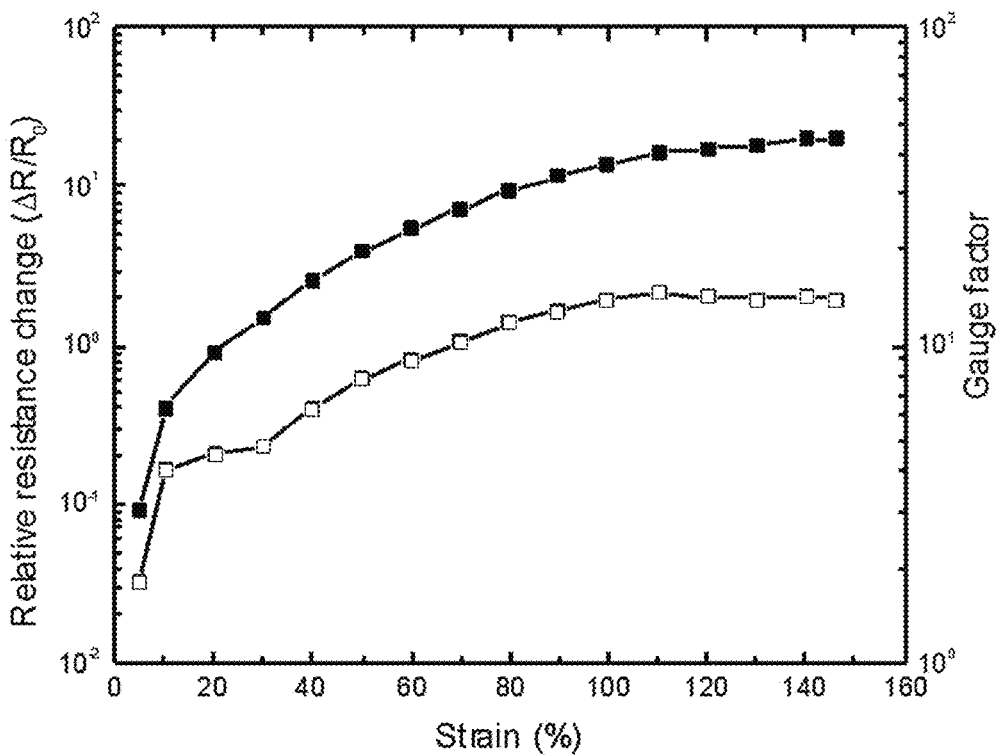
FIG. 21C shows relative resistance change and gauge factor with applied strain of an embodiment of the strain sensor.

Even though the above-mentioned results showed ultra-high GF, the stretchability is limited to 15%. To obtain extra stretchability while maintaining a continuous resistance change in the strain operational range, a possible solution is to increase the crack density in the SWCNT wires. FIG. 21A shows that by reducing the width of the wire from 60 to 32 μm, we were able to obtain a high crack density in the wire. Before the critical strain (60%), the crack density increases with the applied strain. After reaching a critical strain at 60%, the crack density can remain constant, while $L_C$ increased with the applied strain (FIG. 21B). The PDMS substrate break at 146% due to the stress concentration near the cracks, which determine the stretchability of the sensor can be dramatically improved by using smaller SWCNT wires. However, this sensor showed small $\Delta R/R_0$ and low GF of 15 at 146% (FIG. 21C). It can be ascribed to (1) the high initial resistance 32 μm-SWCNT wire (10±0.8 kΩ), is more than one order of magnitude of the 60 μm-SWCNT wires (360Ω) and (2) the maximum $L_C$ is less than 25 μm, indicating that the SWCNT networks are still in a percolated state. The fragmentation strategy can be modified to tune the GF and stretchability of the sensors. It can be realized by (1) adjusting density through using wires with different width and (2) choosing substrates with different stretchability.

Sensing Response to Pressure, Torsion and Bending

Figure 22A:
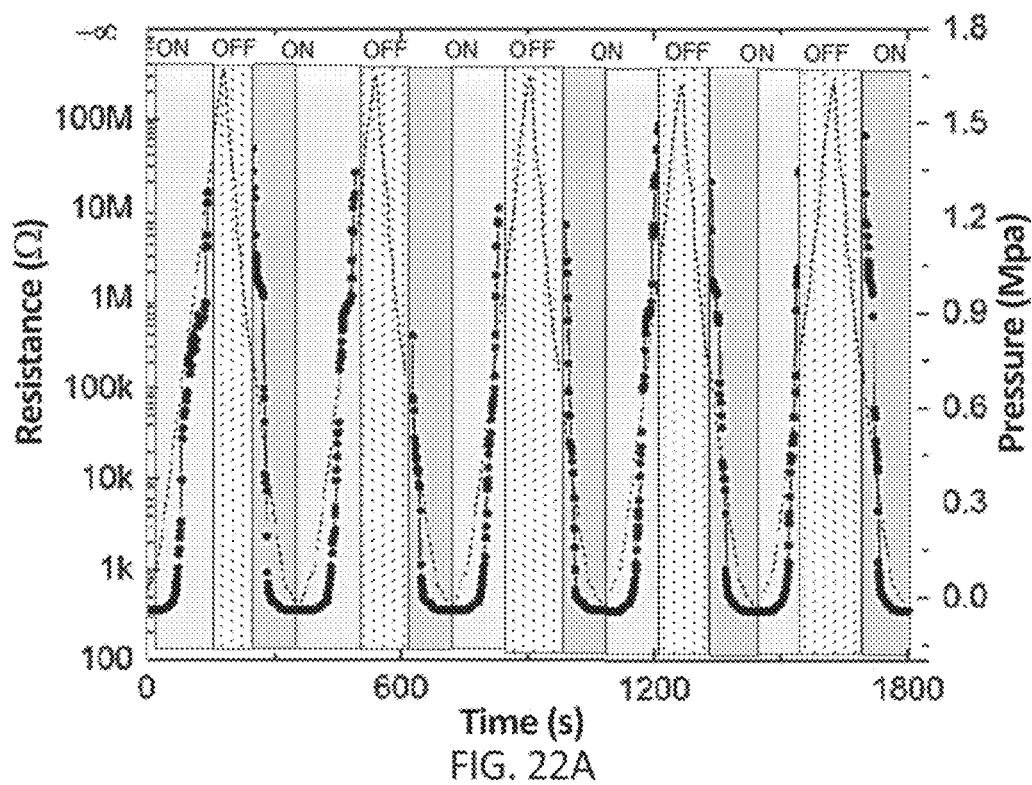
FIG. 22A shows resistance and applied pressure vs time under periodic loading/unloading tests of an embodiment of the present disclosure.
Figure 22B:
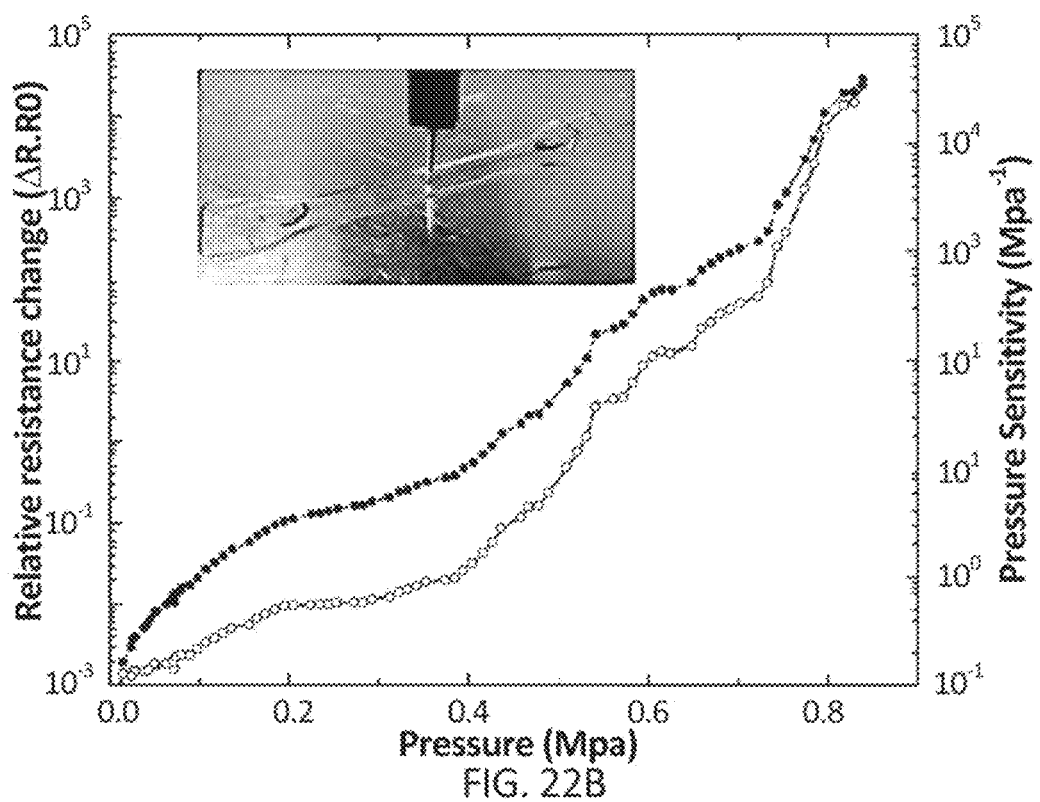
FIG. 22B demonstrates evolution of relative resistance change and pressure sensitivity of an embodiment of the present disclosure with respect to the pressure. The inset image shows the compression test on the wire was carried out by using a 1.25 mm rod.
Figure 22C:
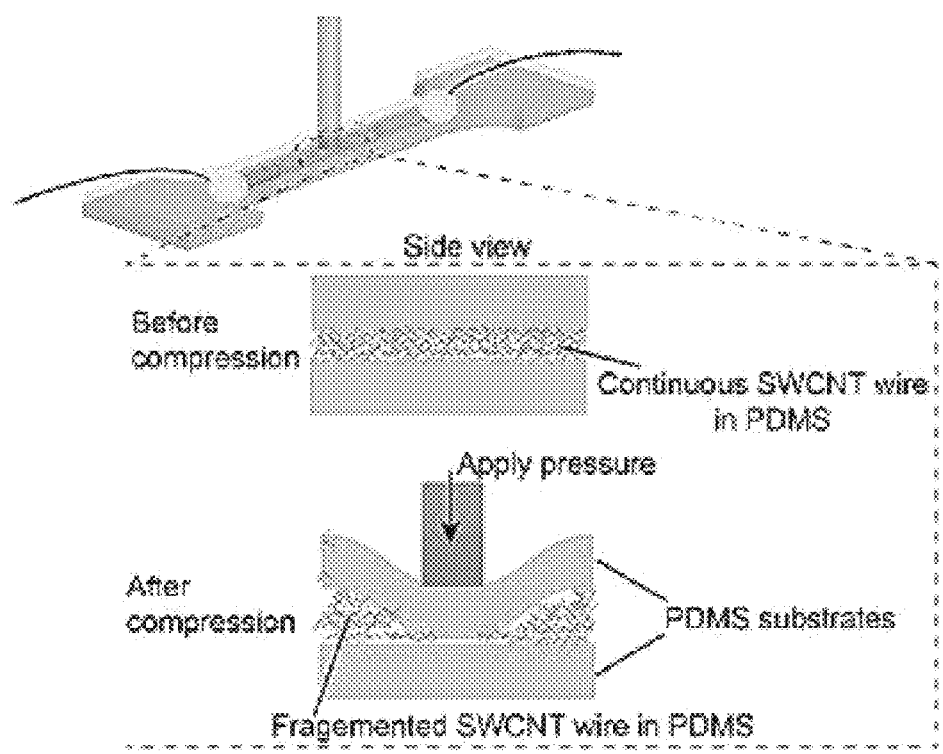
FIG. 22C is a schematic diagram of the pressure sensing mechanism of an embodiment of the present disclosure.

The response of the sensor to different mechanical loadings was then monitored: pressure, torsion and bending. This will help to clarify the sensitivity and selectivity of the mechanosensor to different deformation modes (FIGS. 22A-22F). Multiple test cycles were performed by repeated loading/unloading using a 1.25-mm-radius pressure head. FIG. 22A shows a resistance recoverable pressure sensing capability with an ON-OFF switching from connected circuit to a break circuit in a reversible manner. FIG. 22B shows evolution of relative resistance change and pressure sensitivity of an embodiment of the present disclosure with respect to the pressure. At a larger pressure (typically 1.1 to 1.5 MPa), the electrical circuit can turn into an OFF state due to the breakage of the SWCNT wire. After releasing the pressure, the resistance almost can recover to its initial value. It is surprising to see that the pressure sensor can exhibit a wide resistance change (340Ω to 10 MΩ), which is similar to the resistance recoverable function as a in-plane unidirectional strain sensor. Upon pressing, the Poisson effect can induce in-plane stretching of the wire. This can result in an extremely high pressure sensitivity (up to $4\times10^5$ $MPa^{-1}$ at 0.9 MPa). The attained sensitivity can be several orders magnitude than recently reported high performance pressure sensors based on piezoelectric sensing mechanism. The mechanism of the pressure sensing before circuit breakage is ascribed to upper PDMS layer induced fragmentation of the SWCNT wire, followed by the disconnection of SWCNT networks in the transverse crack, as show in FIG. 22C. Thus, the SWCNT wire in PDMS can be used as highly sensitive pressure sensors for realization of e-skins, human-machine interfaces, and health monitoring. It is also important to know that the resistance of the sensor can be recovered after release of the pressure.

Figure 22D:
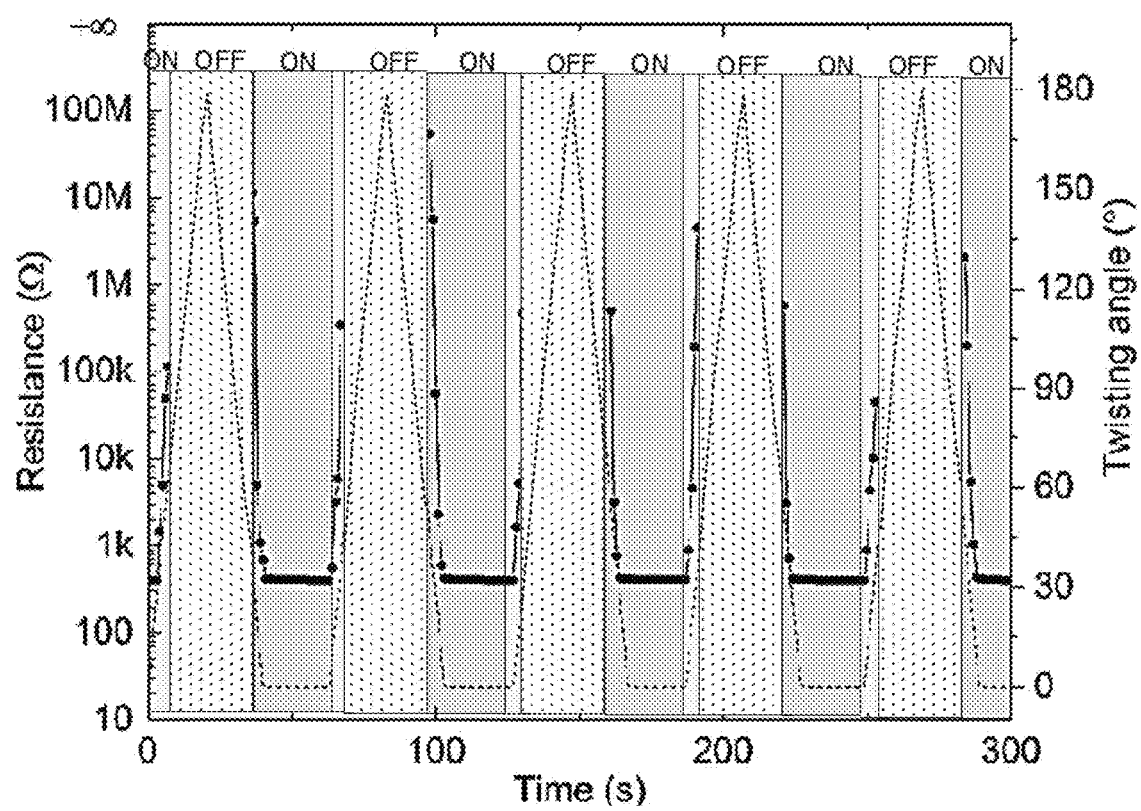
FIG. 22D shows resistance and applied twist angle vs time under twisting/untwisting deformation of an embodiment of the present disclosure.
Figure 22E:
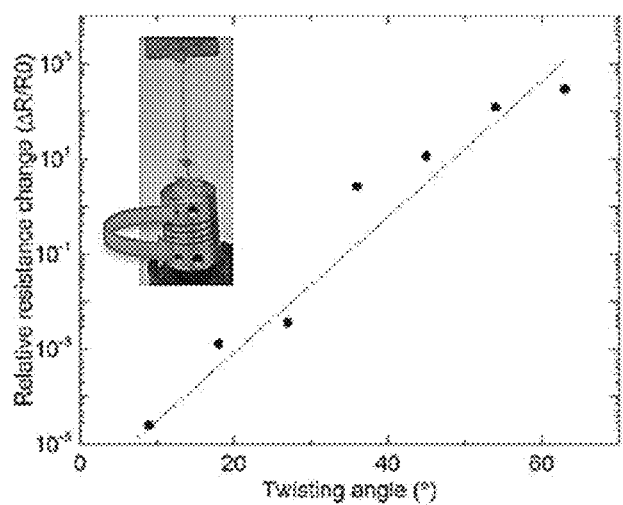
FIG. 22E depicts relative resistance change vs twist angle of an embodiment of a sensor of the present disclosure. The inset image shows torsion sensor in testing.
Figure 22F:
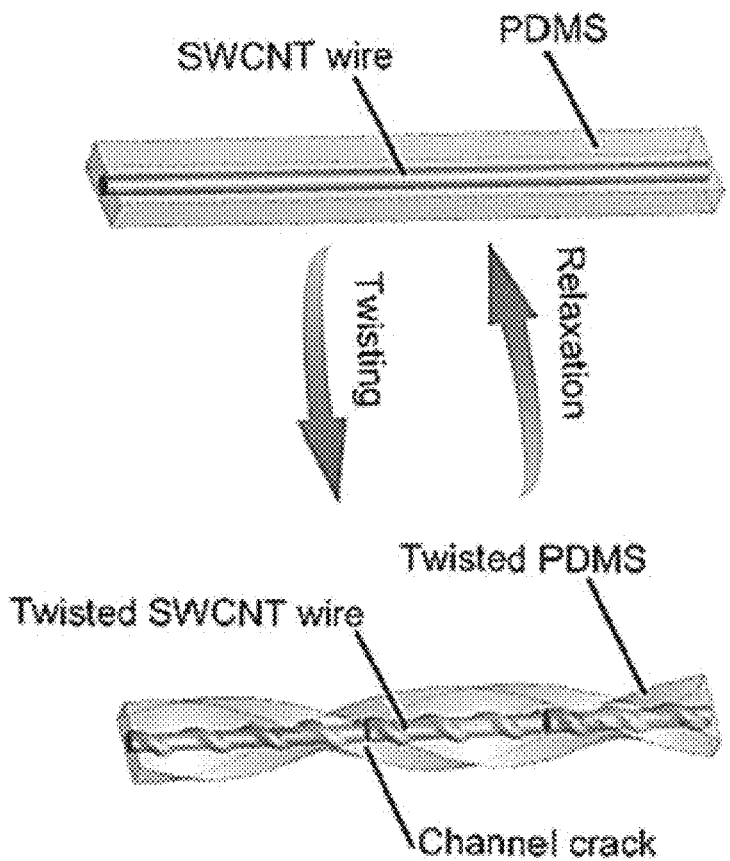
FIG. 22F is a schematic diagram of the torsion sensing mechanism.

The sensor was also twisted while measuring the electrical resistance with respect to the twisting angle, φ. FIGS. 22D and 22E clearly displays two regimes during twisting: (1) At 0°≤φ≤60°, it shows a dramatic increase in resistance after from 360Ω to tens of MO. An average torsion sensitivity of 860 was obtained at 60°; (2) φ>60°, the resistance of the wire increase to infinity due to the breakage of the SWCNT wire induced by over twisting. It was noted that the twisted sample can show a resistance recoverability after release the sample to original state (FIGS. 22D and 22F). This can be ascribed to the reconnection of the SWCNT networks after relaxation of the PDMS substrate.

Figure 28:
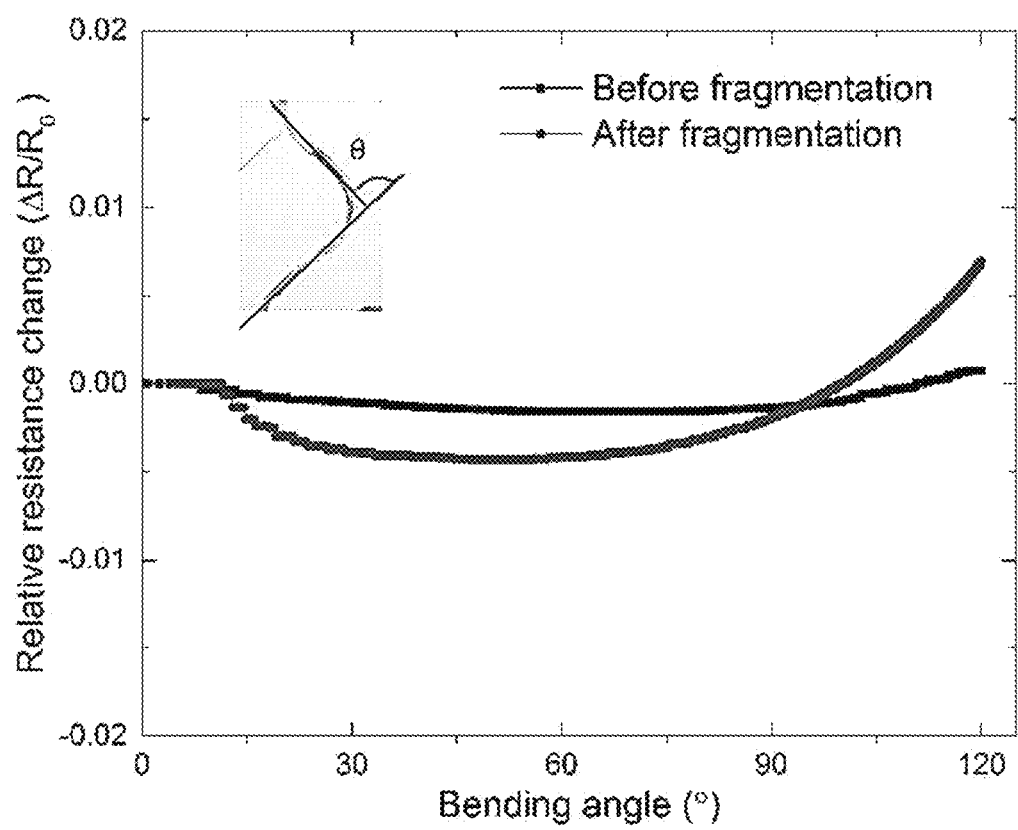
FIG. 28 depicts the relative resistance change vs bending angle of an embodiment of SWCNT wire before and after fragmentation by using the method of FIG. 19A. Inset image shows the definition of bending angle.

Finally, the bending test was performed as show in FIG. 28 and the bending angle θ was defined in the inset of FIG. 28. It revealed that samples before and after fragmentation can show stable electrical properties. Even for the samples with cracks, it can only show $\Delta R/R_0$ less than 0.01 at a bending angle of 120°. The low sensitivity can be ascribed to the fact that SWCNT wire in the present design can be in the neutral axis of the sample. The bending sensitivity could be improved by engineering the thickness difference of the PDMS substrates.

Application in Human Motion Detection

Figure 23A:
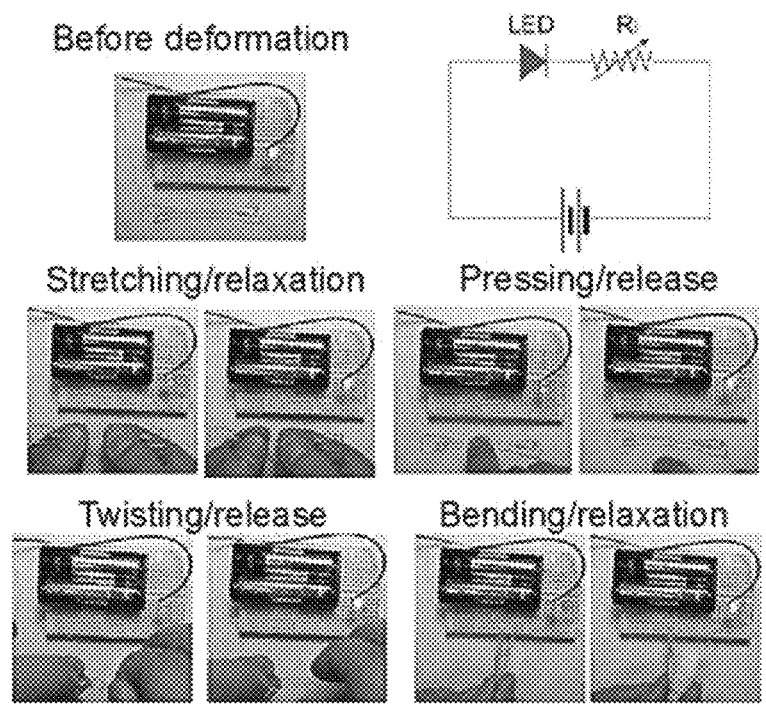
FIG. 23A demonstrates resistance recovery of an embodiment of a sensor at different mechanical deformations in an electrical circuit connected to a light-emitting diode (LED). $R_i$ in the circuit represents a variable resistance due to deformation.
Figure 23B:
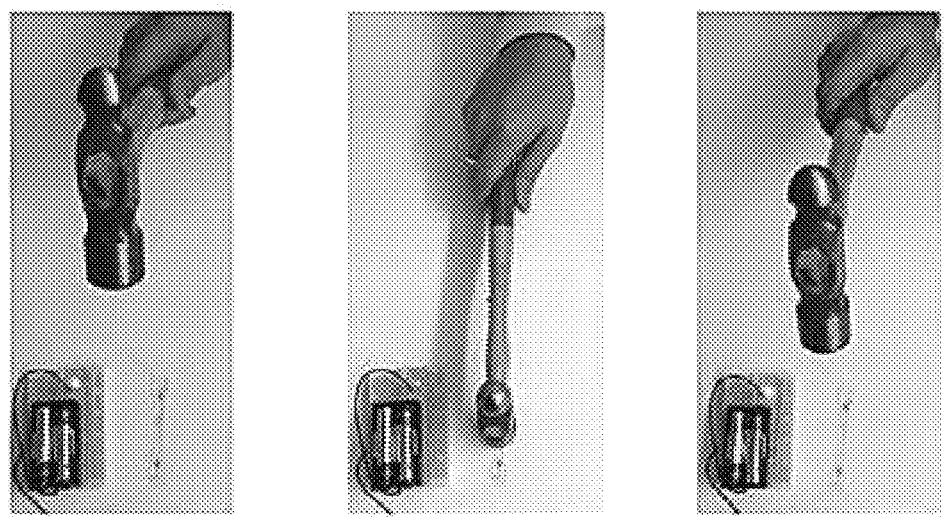
FIG. 23B demonstrates resistance recovery of an embodiment of a sensor after hammering in an electrical circuit connected to a LED.
Figure 27A:
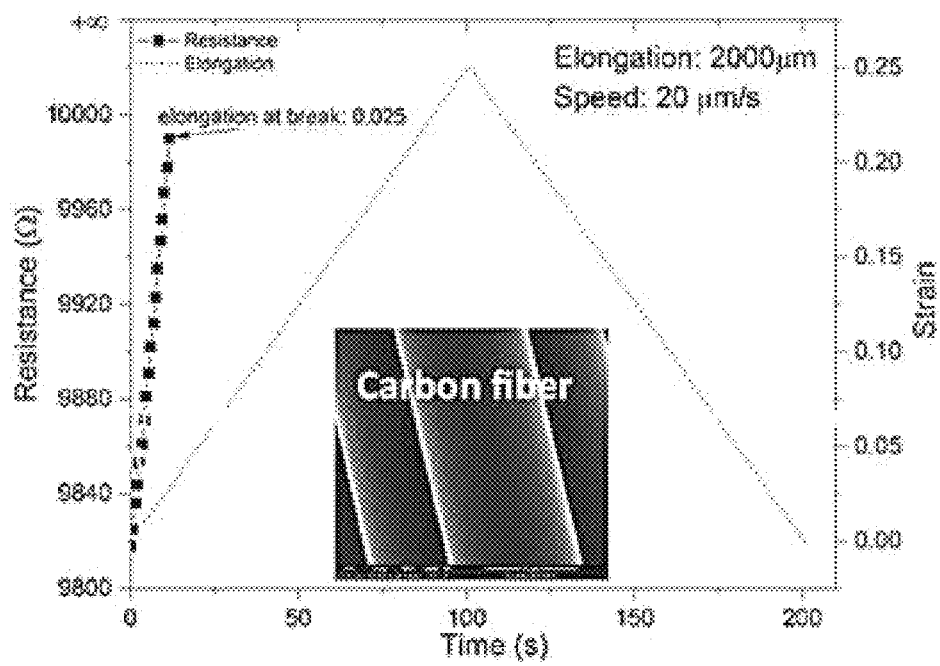
FIGS. 27A-27B shows the electromechanical response of carbon fiber in PDMS.
Figure 27B:
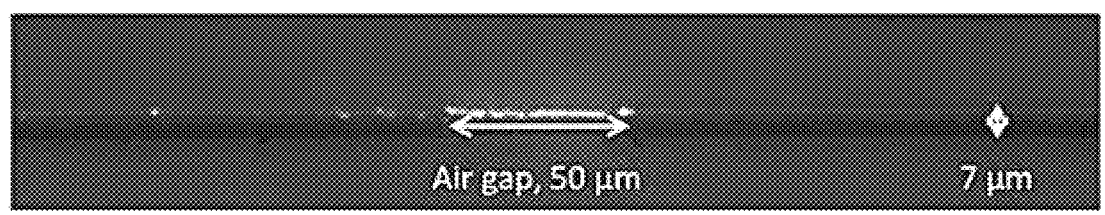

The electrical recoverability of our sensors is demonstrated herein by wiring a light-emitting diode (LED) with the sensor. Before any mechanical deformation, the SWCNT wire resistance was low enough to light the LED at 3 V, as shown in FIG. 23A. The sensor shows a good electrical recoverability after larger mechanical deformation (stretching, pressing, twisting and bending), demonstrating that the LED had negligible degradation in light intensity after release from these larger deformations. Extreme mechanical deformation was then applied to the sensor by stretching to 50 or 100% of strain, and it was observed that the LED was turned off, which can confirm the fragmentation and conductive pathway disconnection of SWCNT wire at large strains. After relaxation from 50 or 100% strains, the LED was lighted on automatically, proving that the open circuit was connected due to the automatic recovery of resistance after relaxation (FIGS. 29B1-29B6). Extreme impact was further applied to the sensor by hammering. The LED went off at the impact of the hammer, but light readily recovered as soon as the hammer takes off from the sample (FIG. 23B). These results illustrated that the mechanosensors shown here differ from conventional ones which cannot restore the sensing functions after electrical disconnection by large deformations. For instance, the electrical properties of carbon fiber embedded in PDMS is not recoverable after relaxation of the substrate from stretching beyond its strain limit (FIGS. 27A-27B).

The excellent resistance-recoverable properties after large deformation beyond the elongation or pressure at break of SWCNT wire can be attributed to the fact that: (1) SWCNT wire has a good adhesion with PDMS due to an excellent capillary surface of SWCNT and therefore, by immersing diluted PDMS around SWNT wires, PDMS was attached firmly to SWCNT wire; (2) after the fragmentation of the wires, high density of the single SWCNTs and SWCNT bundles will be formed on the surface of the crack slips, the inherent self-recovery ability of PDMS can bring the SWCNT networks back to ensure a good electrical contact; and (3) low stiffness of SWCNT wire can make it easily fragmented and recovered.

Figure 23C:
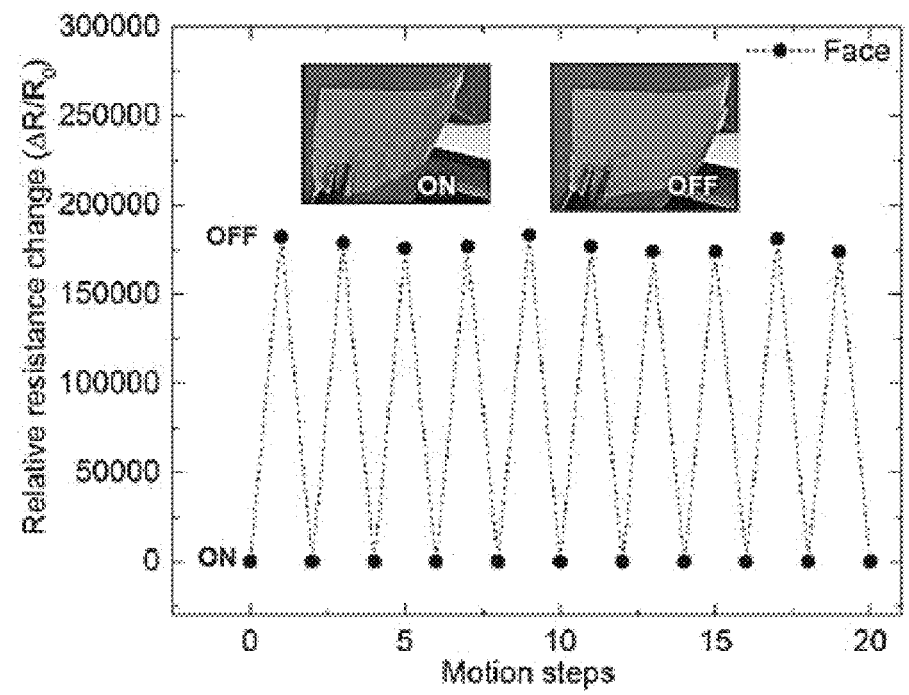
FIG. 23C shows the motion-dependent response and relative resistive change of an embodiment of a sensor due to an air blow/unblow motion (facial motion).
Figure 23D:
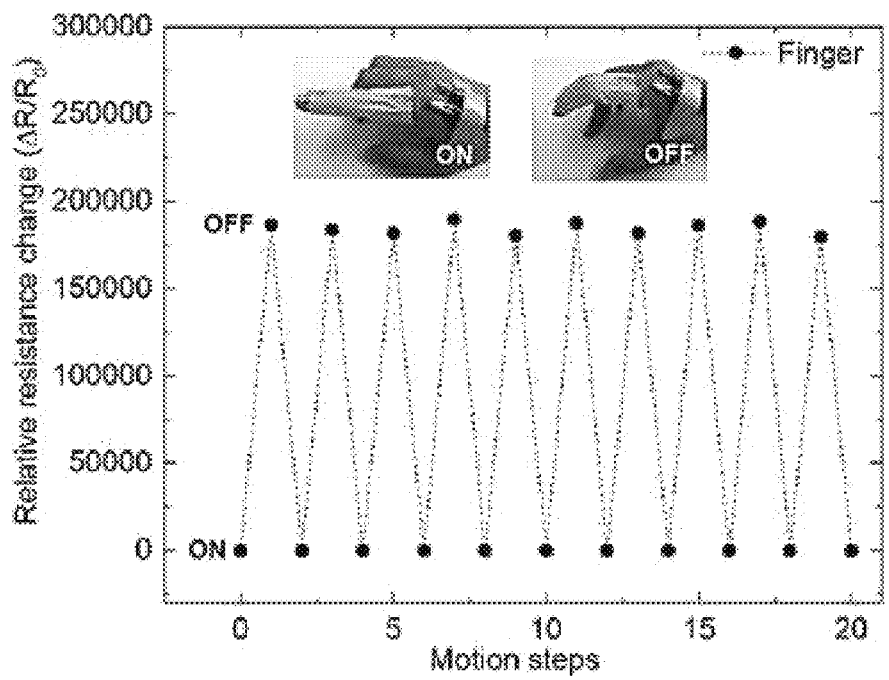
FIG. 23D shows the motion-dependent response and relative resistive change of an embodiment of a sensor due to a finger bending motion.
Figure 23E:
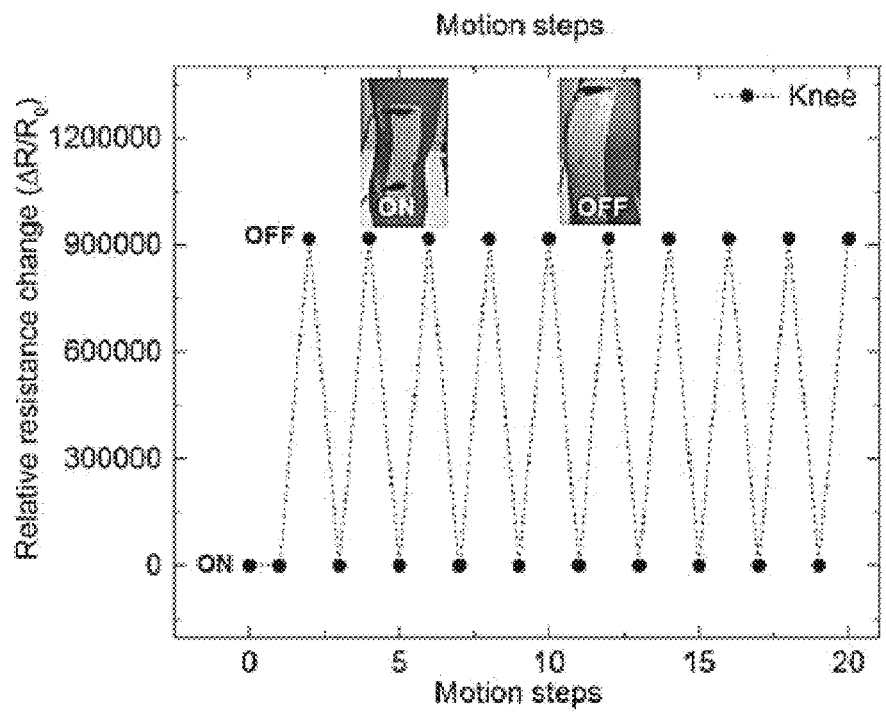
FIG. 23E shows the motion-dependent response and relative resistive change of an embodiment of a sensor due to a knee bending motion.
Figure 23F:
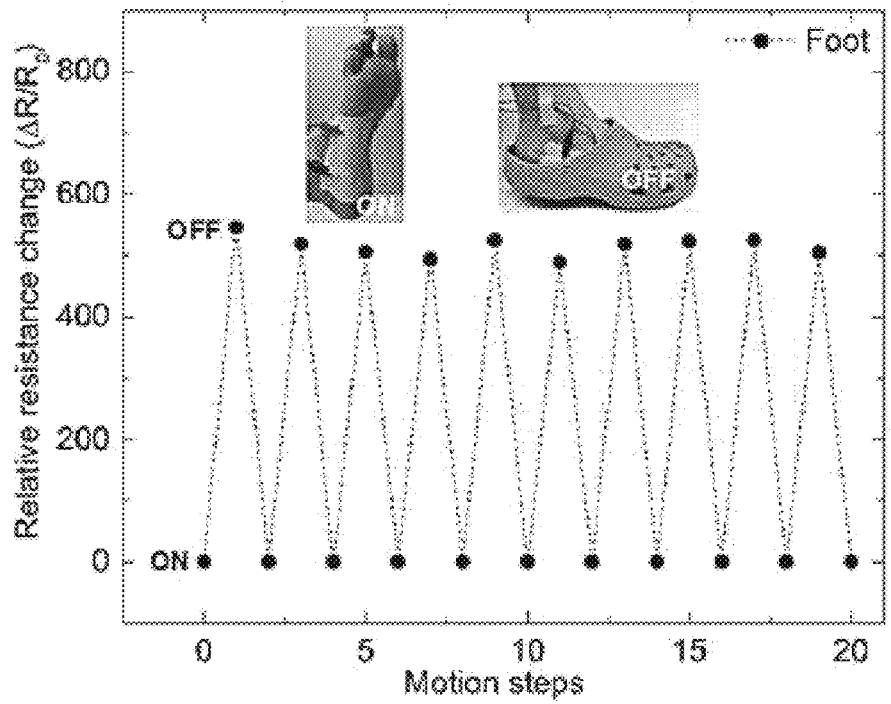
FIG. 23F shows the motion-dependent response and relative resistive change of an embodiment of a sensor due to a foot bending motion.

Evidenced by above-mentioned facts, machine/human interface interactions were further demonstrated by using the present sensors, as shown in FIGS. 23C-23F. Sensors were attached to skin through adhesive tapes at different location of body (face, finger, knee and foot) and the present sensor shows a reproducible ON/OFF switching to larger deformations. FIG. 23C shows the $\Delta R/R_0$ response of a sensor attached to face. $\Delta R/R_0$ can increase to almost infinity with expansion of muscle and can decrease again by the opposite movement of facial muscle. Each expansion of the muscle will result in electrical disconnection of the wire, thus each step of facial muscle movement can be detected in a repeatable manner. When attaching the sensor to a finger, the sensor is able to detect its bending motion (FIG. 23D). It is interesting to see that the present sensor attached to knee or foot can be used as a pedometer, which can accurately record the number of pace during walking (FIGS. 5e and f). The mechanism of the sensor as a pedometer can lie in stretching/relaxation and pressing/relaxation for the sensor on the knee and foot, respectively. In the basic motion of human body, stretches and contracts are as much as 55%, which exceeds the limits of conventional metallic gauges (5%). The resistance recoverable characteristics of the present sensor enables their use deformable electronics which can have additional functionality of recovery after large mechanical deformation. It can also provide unprecedented opportunities for them to be used as deformable mechanosensors with resistance recoverable properties exceeding the wire deformation limit (<5%).

CONCLUSION

Although the sensor configuration present herein is very simple, a route to realize multiple mechanical stimuli detection has been shown by a mechanosensor based on wet-spun SWCNT wires embedded in PDMS elastomer. The sensor can have an extremely high sensitivity to different mechanical stimuli including stretching, pressing and torsion. More importantly, it has an additional function of resistance recoverability after electrical disconnection induced by large deformation compare with conventional mechanical sensors. These sensors can find a wide range of applications in wearable and deformable mechanosensors.

EXPERIMENTAL SECTION

Materials.

SWCNTs functionalized with 2.7% carboxyl groups were purchased from CheapTubes, Inc., with over 90 wt % purity and containing more than 5 wt % of MWCNT. The true density of these SWCNTs was 2.1 g cm$^{-3}$. Methanesulfonic acid (MeSO$_3$H) and SYLGARD 184 PDMS was purchased from Sigma Aldrich.

Preparation of Highly Spinable SWCNT Inks.

2 wt. % SWCNT dope was prepared by adding 0.2 g of SWCNTs into 9.8 g of MeSO$_3$H and stirred for 2 min, followed by bath sonication using a Brason 8510 sonicator (250 W) (Thomas Scientific) for 60 min. Then the mixture was further stirred for 24 hours and followed by passing through a 30 µm syringe filter (Pall corporation) to remove aggregates.

Wet Spinning of CNT Wires.

The SWCNT ink was loaded into a 5 ml syringe and spun into water bath though a stainless steel needles with different gauges (23G and 34G). The flow rate of the ink was controlled to 58 and 5 µl/min by using a Fusion 200 syringe pump (Chemyx. Inc.) for 23G and 34G needles, respectively. The SWCNT wires or meshes were spun onto sticky PDMS substrates (5.3 g, 10×10 cm), which were made by mixing PDMS base and curing agent with a ratio of 2.5 to 1 and cured at 70 degree for 12 min.

Figure 25A:
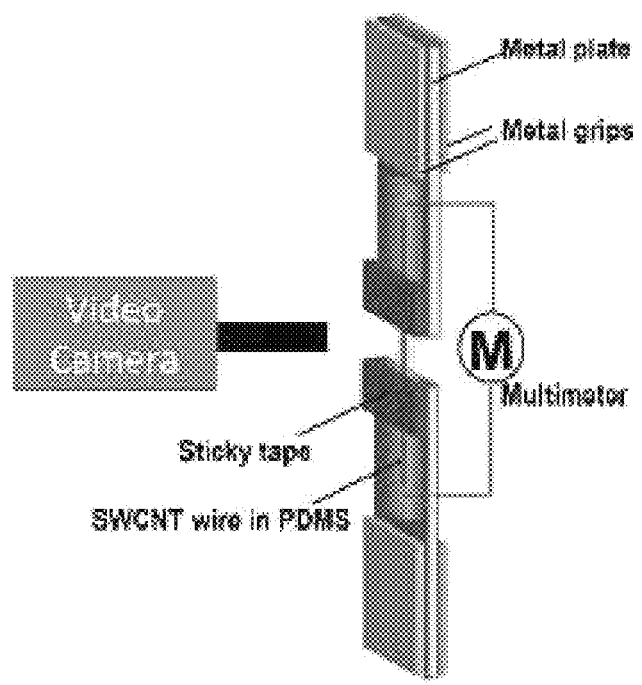
FIG. 25A shows an embodiment of a setup for sample fragmentation and electromechanical testing according to the present disclosure.

The wet-spinning of SWCNT wires was controlled by using a MD-P-821 autodrop x-y-z stepping motors (accuracy: 1 µm) (Microdrop Technologies). The nozzle was immersed in water and the distance between nozzle and substrate is controlled by the z stepping motor to 3 mm. The setup of the wet-spinning system is shown in FIG. 25A. The wire spinning speed, $u_W$, is determined by $$u_W = 2\times 10^5 u_S / 3\pi D^2 \tag{1}$$

where, $u_S$ in (µl/min) is the ink dosing speed, D, (µm) is the nozzle diameter. $u_m$, is the substrate moving speed kept constant at 10 mm s$^{-1}$). To generate continuous SWCNT wires, $u_W$ (10.8 mm s$^{-1}$), is kept slightly higher than that of $u_m$.

After spinning, the wires were dried at 70° C. over night to remove residue water. Then two ends of SWCNT wires were connected with copper wires and painted with silver epoxy. Then the SWCNT wires were sealed with the 5.3 g of PDMS precursor, which was cured at 70° C. for 2 h. The effective length of the wires between the silver paste is about 4±0.2 cm. In this study 60 μm-SWCNT and 32 μm-SWCNT represent SWCNT wires spun from 23G and 34G needles, respectively. (FIG. 24). For comparison, encapsulation of carbon fiber samples (diameter: 7 μm) are prepared by the same method.

Characterizations.

Scanning electron microscopy (SEM) on SWCNT wires was performed using a Quanta 3D (FEI Company).

Strain sensing. The setup for electromechanical test of the specimen was illustrated in FIG. 25A. The loading/unloading of the sample is controlled by a 5944 instron machine. The dog-bone specimen was glued to two metal plates which are clamped by Instron machine. The distance between the metal plates was 4 mm, which is also the effective length of the sample. The electrical resistance change of the wires was monitored by using an U1252B digital multimeter. Generally, a stretching process was applied to each sample by a 50% of strain with a speed of 0.4 mm min$^{-1}$. Then a cyclic stretching/relaxing program was applied to the wire with a maximum strain of 30% and 5% at each cycle. The resistance data were recorded every 1 s during the test. Stretching/relaxing of the SWCNT wires in PDMS was captured by a commercial video camera. To measure the sensitivity of a mechanical strain sensor, we define a gauge factor (GF) as:

$$GF=(\Delta R/R_0)/\varepsilon \quad (2)$$

where $R_0$ is the initial resistance, $\Delta R/R_0$ is the relative change in resistance and e is the applied strain.

Pressure sensing. Loading/unloading compression cyclic test were performed by using a 1.25 mm-radius pressure head at 0.1 mm min$^{-1}$ (Inset in FIG. 22B) on 60-μm SWCNT sample. The maximum displacement of the pressure head was 0.3 mm. The resistance was also recorded by using an U1252B digital multimeter. The pressure sensitivity, PS, is defined by $$PS=(\Delta R/R_0)/P \quad (3)$$

where P is the applied pressure.

Torsion sensing. Cyclic twisting/untwisting torsion motion was controlled by a motor at a speed of 18° s$^{-1}$ with a maximum twisting angle of 180° (Inset in FIG. 22E). The torsion sensitivity, TS, is defined by $$TS=(\Delta R/R_0)/\theta \quad (4)$$

where θ is the twisting angle in rad.

Additional Information for Example 2

Fabrication and Sample Information

Figure 25B:
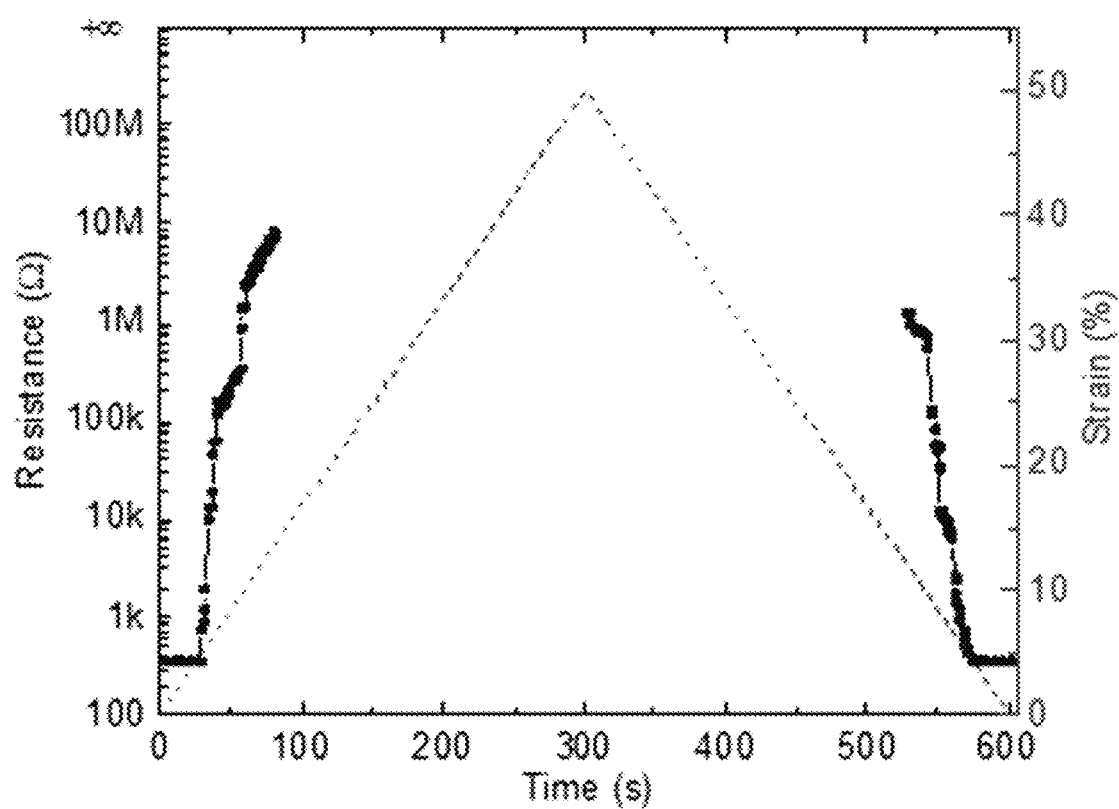
FIG. 25B shows the evolution of resistance and strain with time during the fragmentation of an embodiment of the present disclosure.
Figure 25C:
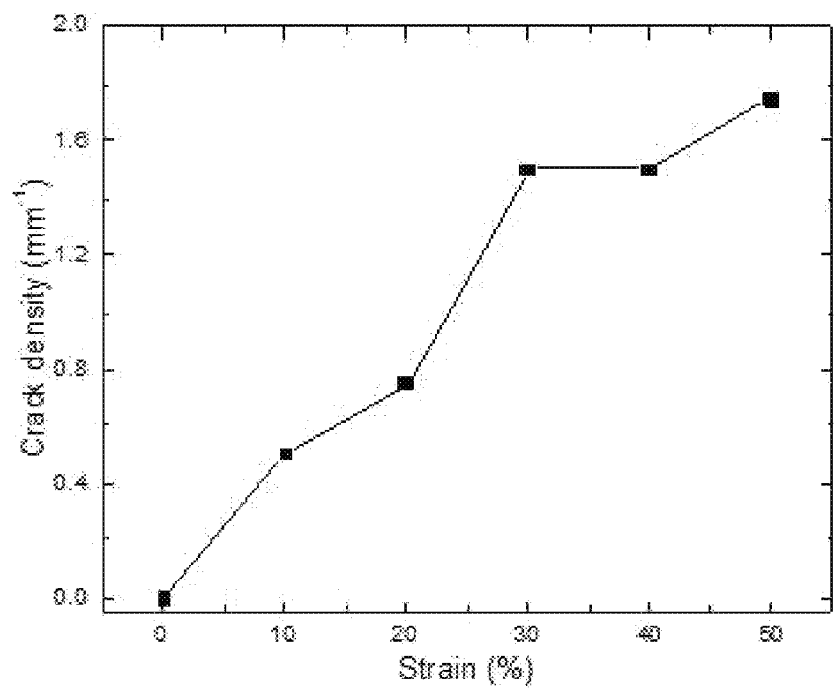
FIG. 25C depicts the evolution of crack density with strain during fragmentation.
Figure 25D:
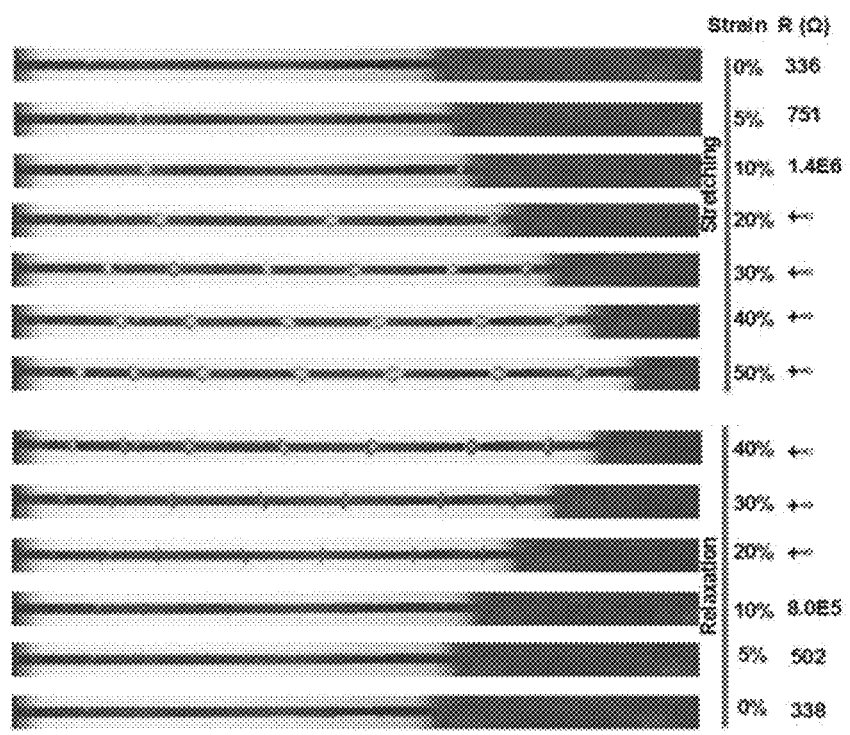
FIG. 25D shows optical images of embodiments of SWCNT wire in PDMS during stretching and relaxation processes.

The first fragmentation process on 23 μm-SWCNT sample was monitored by applying strain and relaxation (0 to 50% and 50 to 0%). FIG. 25B presents the evolution of resistance change as a function of time of this sample. FIG. 25C presents the evolution of crack density with strain during the fragmentation. During this process, crack number and size increased with strain, but the resistance didn't change continuously due to the propagation of the cracks. In detail, the resistance remains 336Ω before ε<4%. The resistance increased from 336 to 751Ω, when the first crack appears at a strain of 5%. It is important to know that the crack opening distance is roughly 10 μm and 100 μm at strain of 5% and 10%, respectively, indicating that CNT bundles and networks are existing in the same crack. Then the resistance increased to infinity at a strain of 15%, indicating that the CNT networks in the cracks are completely disconnected. At a strain of 50%, we were able to create seven cracks in the wire. During the relaxation process of the wire, it was found that the cracks gradually disappeared by decreasing the strain from 50% to 0% and the final resistance after relaxation is almost equal to the initial resistance (FIG. 25D).

Characterization of SWCNT Fibers

Self-standing SWCNT fibers were also prepared to estimate the mechanical properties of SWCNT wires. The spinning formulation was loaded into a 5 mL plastic syringe and spun into a water coagulation bath though a 34G metal needle. The flow rate of the ink was controlled to 20 μL min$^{-1}$ by using a syringe pump. The fibers were collected vertically onto a 50 mm winding spool, which gives a line speed of 2 to 4 m min$^{-1}$. The air temperature along the path of the fiber was controlled to 90° C. by two vertically located hot-plates and was monitored by a thermocouple.

The mechanical behavior of the fibers was measured by a 5944 Instron universal testing machine at a strain rate of 0.4 mm min$^{-1}$. The tests were performed inside an enclosure to protect the fibers from environmental disturbances. 2 cm long fibers were prepared and fixed on a paper card. The average values of tensile strength, Young's modulus and elongation were based on measurements from at least 10 samples.

Comparison Study Based on Carbon Fibers

It can be seen that fragmentation can be important for the SWCNT wires in PDMS to achieve high sensitivity compared with other CNT based strain sensors. With the help of PDMS, the resistance of the wire can have an excellent reversibility after relaxation. It is important to point out the present SWCNT wires/fiber in PDMS has a very low stiffness (0.77 GPa) compared with the results in literature, moreover, the SWCNT wire have a very rough surface which can increase the adhesion with the PDMS. To support the analysis herein, SWCNT wire was replaced by a smooth carbon fiber (diameter: 7 μm) and encapsulated by PDMS with the same method. FIG. 27A shows that the resistance of the carbon fiber increased from 9800 to nearly 10000 at a strain of 2.5% with irreversible mechanical and electrical failure. The carbon fiber was pulled out and obvious debonding was observed from the video. The break point of carbon fiber cannot reconnected like SWCNT wires even after waiting for 20 min (FIG. 27B). This can be due to the fact that (1) the high stiffness of the carbon fiber with respect to the PDMS result in the development of only one crack, that strongly reduce the elongation at break (2) the cracked surface cannot be matched perfectly during unloading which prevents recovery in electrical properties.

Additional Characterizations of SWCNT Wire Mechanosensor

The electrical properties of the sample after large mechanical deformation was further demonstrated in a electrical circuit, in which the sample was connected to a 3 V battery and a LED (FIGS. 29B1-29B6). At the initial state, the LED is light up, indicating the SWCNT wires can be used as interconnects in the circuit. During the stretching to 50 or 100% of strain, it can be observed that the LED was turned off, which can confirm the fragmentation of SWCNT wire at large strains. After relaxation from 50 or 100% strains, the LED was lighted on automatically, proving that the open circuit was connected due to the automatic recovery of resistance after relaxation. The excellent resistance recoverable properties after fragmentation can be attributed to the fact that: (1) SWCNT wire has a good adhesion with PDMS due to an excellent capillary surface of SWCNT and therefore, by immersing diluted PDMS around SWNT wires, PDMS was attached firmly IQ SWCNT wire; (2) PDMS has an inherent self-recovery behavior, so that it can bring back the CNT networks to the original locations; and (3) low stiffness of SWCNT wire can make it easily fragmented. The resistance recoverable characteristics enable one to use them in stretchable electronics which can have additional functionality of recovery after larger strain up to 100%. It can also provide novel opportunities for them to be used as stretchable strain sensors with resistance recoverable properties exceeding their strain limit.

Ratios, concentrations, amounts, and other numerical data may be expressed in a range format. It is to be understood that such a range format is used for convenience and brevity, and should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1% to about 5%, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figure of the numerical value. In addition, the phrase "about 'x' to 'y'" includes "about 'x' to about 'y'".

Unless defined otherwise, all technical and scientific terms used have the same meaning as commonly understood by one of ordinary skill in the art to which this disclosure belongs. Although any methods and materials similar or equivalent to those described can also be used in the practice or testing of the present disclosure, the preferred methods and materials are now described.

All publications and patents cited in this specification are incorporated by reference as if each individual publication or patent were specifically and individually indicated to be incorporated by reference and are incorporated by reference to disclose and describe the methods and/or materials in connection with which the publications are cited. The citation of any publication is for its disclosure prior to the filing date and should not be construed as an admission that the present disclosure is not entitled to antedate such publication by prior disclosure. Further, the dates of publication provided could differ from the actual publication dates that may need to be independently confirmed.

As will be apparent to those of skill in the art upon reading this disclosure, each of the individual embodiments described and illustrated has discrete components and features which may be readily separated from or combined with the features of any of the other several embodiments without departing from the scope or spirit of the present disclosure. Any recited method can be carried out in the order of events recited or in any other order logically possible.

Embodiments of the present disclosure will employ, unless otherwise indicated, techniques of molecular biology, microbiology, nanotechnology, organic chemistry, biochemistry, botany, which are within the skill of the art. Such techniques are explained fully in the literature.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A sensor, comprising:
    a substrate;
    one or more fragmented nanomaterial compositions embedded in the substrate, wherein the fragmented nanomaterial compositions include one or more nanoparticles;
    one or more delaminated areas in which a portion of the embedded fragmented nanomaterial compositions has delaminated from the substrate, and in which a portion of the nanoparticles from the delaminated portion of the fragmented nanomaterial compositions remains attached to the substrate; and
    one or more conductive devices affixed to one or more sides of the fragmented nanomaterial compositions with an affixation agent.

2. The sensor of claim 1, wherein the substrate is a thermoplastic elastomer.

3. The sensor of claim 1, wherein the one or more fragmented nanomaterial compositions are paper or a wire.

4. The sensor of claim 1, wherein the affixation agent is silver epoxy.

5. The sensor of claim 1, wherein the sensor is cut from an ISO 527-2 type 1BA specimen die.

6. The sensor of claim 1, wherein the sensor has a longest dimension with a length of about 75 mm, wherein the sensor has two ends on opposing sides of the longest dimension with an outer width of about 10 mm each, wherein the sensor has a middle segment along a longitudinal axis of the longest dimension in between the two opposing ends, wherein the middle segment has an inner width of about 5 mm.

7. The sensor of claim 6, wherein the one or more fragmented nanomaterial compositions are embedded in the middle segment, wherein the one or more fragmented nanomaterial compositions have a longest dimension with a longitudinal axis aligned in parallel with the longitudinal axis of the longest dimension of the sensor.

8. The sensor of claim 1, wherein the substrate is PDMS.

9. The sensor of claim 1, wherein the one or more nanoparticles include one or more carbon nanotubes.

10. The sensor of claim 9, wherein the one or more carbon nanotubes are single-walled carbon nanotubes, multi-walled carbon nanotubes, or both.

11. A method of fabricating a sensor, comprising:
    embedding a nanomaterial composition in a substrate, wherein the nanomaterial composition includes one or more nanoparticles; and
    fragmenting the nanomaterial composition, wherein the fragmenting forms one or more delaminated areas in which a portion of the embedded nanomaterial compositions has delaminated from the substrate and in which a portion of the nanoparticles from the delaminated portion of the nanomaterial compositions.

12. The method of claim 11, wherein the nanomaterial composition is one or more of a paper and wire.

13. The sensor of claim 11, wherein the one or more nanoparticles include one or more carbon nanotubes.

14. The method of claim 13, wherein the one or more carbon nanotubes are single-walled carbon nanotubes, multi-walled carbon nanotubes, or both.

15. The method of claim 13, wherein one or more fragments of the fragmented nanomaterial composition is bridged by the one or more carbon nanotubes and/or by the one or more delaminated areas.

\* \* \* \* \*